(12) United States Patent
Vats et al.

(10) Patent No.: US 9,542,067 B2
(45) Date of Patent: Jan. 10, 2017

(54) PANEL SYSTEM FOR USE AS DIGITAL SHOWROOM DISPLAYING LIFE-SIZE 3D DIGITAL OBJECTS REPRESENTING REAL PRODUCTS

(71) Applicants: Nitin Vats, Meerut (IN); Gaurav Vats, Meerut (IN)

(72) Inventors: Nitin Vats, Meerut (IN); Gaurav Vats, Meerut (IN)

( * ) Notice: Subject to any disclaimer, the term of this patent is extended or adjusted under 35 U.S.C. 154(b) by 126 days.

(21) Appl. No.: 14/224,242

(22) Filed: Mar. 25, 2014

(65) Prior Publication Data

US 2015/0220244 A1 Aug. 6, 2015

(51) Int. Cl.

| G06F 15/00 | (2006.01) |
|---|---|
| G06F 3/0481 | (2013.01) |
| G06F 3/0484 | (2013.01) |
| G06F 3/01 | (2006.01) |
| G06F 3/03 | (2006.01) |

(52) U.S. Cl.
CPC ........... *G06F 3/04815* (2013.01); *G06F 3/011* (2013.01); *G06F 3/017* (2013.01); *G06F 3/0304* (2013.01); *G06F 3/04842* (2013.01); *G06F 3/04845* (2013.01); *G06F 2203/04802* (2013.01)

(58) Field of Classification Search
CPC ........................... G06F 3/04815; G06T 19/006
USPC 715/850, 851–853, 700, 741, 761–765, 771
See application file for complete search history.

(56) References Cited

U.S. PATENT DOCUMENTS

| 2012/0069051 A1* | 3/2012 | Hagbi | G06T 19/006 345/633 |
|---|---|---|---|
| 2015/0220244 A1* | 8/2015 | Vats | G06F 3/04815 715/850 |

* cited by examiner

*Primary Examiner* — Kevin Nguyen
(74) *Attorney, Agent, or Firm* — Crose Law LLC; Bradley D. Crose

(57) ABSTRACT

Electronic panel system, an arrangement and methods for providing enriched visualization possibilities and user-controlled interaction experience with life-size and real-looking 3D models of real objects are provided. The arrangement comprising a virtual product assistant sub-system and the electronic panel system facilitates receiving real-time product information related to current state of 3D model representing real object displayed on the electronic panel system. Advanced user-controlled interactions with the displayed 3D model is made possible to perform deletion interaction, addition interaction, immersive interactions, linked movement interactions, interaction for getting un-interrupted view of internal parts using transparency-opacity effect, inter-interactions, liquid and fumes flow interactions, extrusive and intrusive interactions, time bound changes based interactions, environment mapping based interactions and engineering disintegration interactions with the displayed 3D model. The 3D model displayed is preferably a life-size 3D model, which can be further zoomed to view detailing without any blurring.

74 Claims, 40 Drawing Sheets

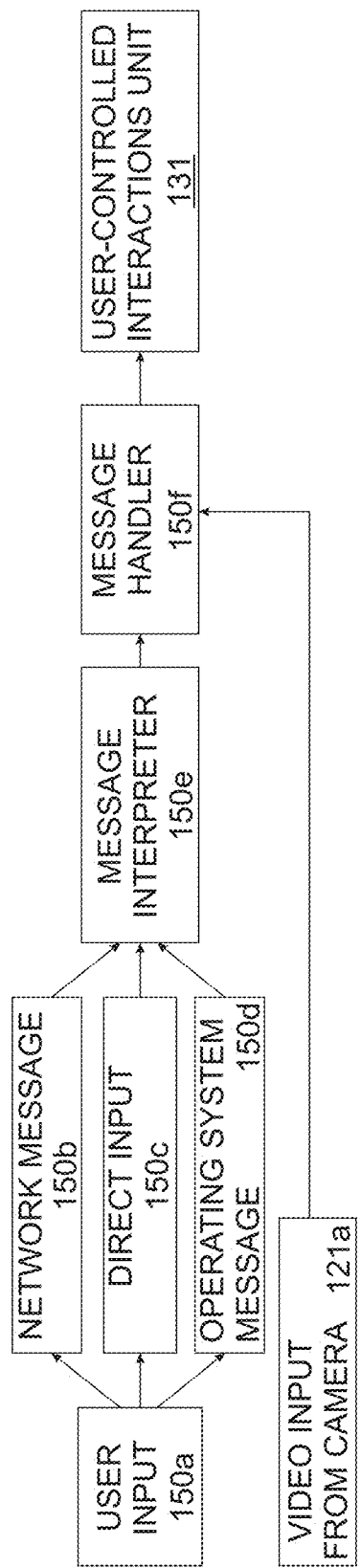

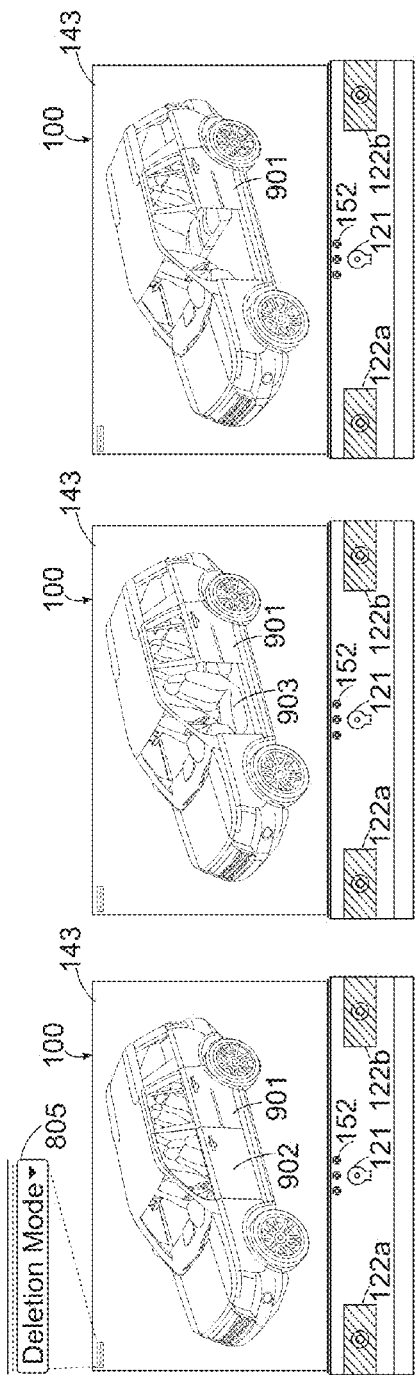
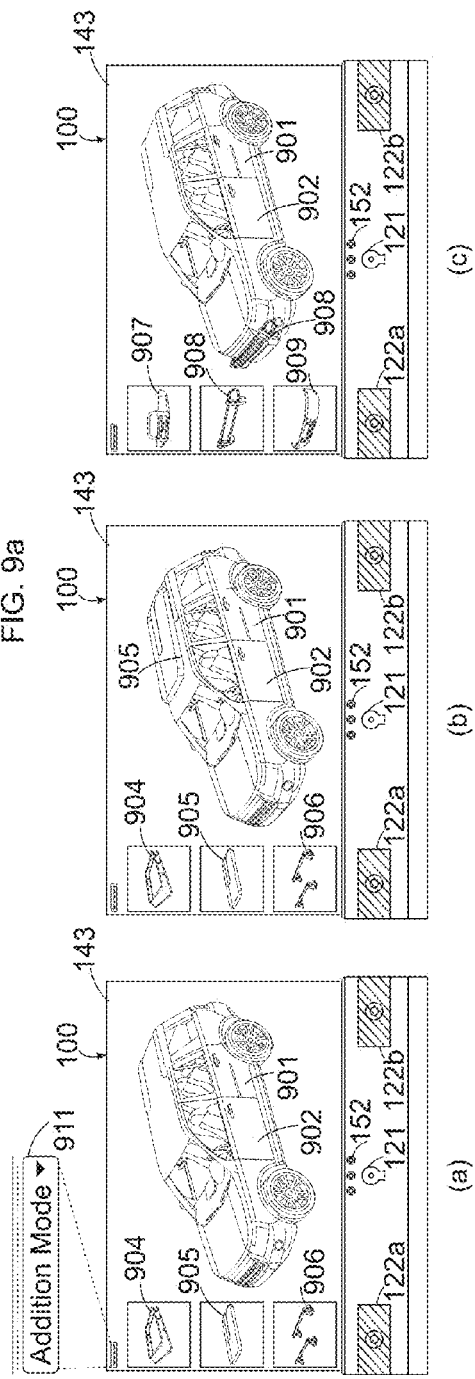
FIG. 9a
FIG. 9b (a)

(b)

(c)

(d)

(a)

(b)

PANEL SYSTEM FOR USE AS DIGITAL SHOWROOM DISPLAYING LIFE-SIZE 3D DIGITAL OBJECTS REPRESENTING REAL PRODUCTS

FIELD OF THE INVENTION

The present invention relates to the field of electronic panels and three dimensional (3D) computer graphics, particularly to an electronic panel system, an arrangement, methods and techniques for providing enriched visualization possibilities and user-controlled interaction experience with life-size 3D models of real objects. The electronic panel system and/or the arrangement can be used as digital showroom.

BACKGROUND OF THE INVENTION

A typical brick and mortar establishment requires a lot of space in displaying different versions or models of a product and not all variety are usually displayed due to space or cost constraint. People usually like to see and interact with multiple products of different size, models, quality and design to check suitable options not only in terms of features, appearance and comfort as per choice, but also to get active information about the product or its components in real time, and also as soon as the product is launched. However, there is often a time gap or delay between actual product launch date and availability in various physical showrooms. Further, a manufacturer may desire to anticipate user responses or get feedback before actual launch of a new high-value product.

Efforts have been made in this regard to display the real products digitally with the help of images, videos, animations, or 3D models with some forms of pre-defined and/or limited interactivity with the displayed digital 3D object to overcome above problems. However, life-size, near life-size or greater than life-size 3D view of real products is limited to car. Current electronic systems displaying life-size digital representations of car are limited to using either video of car, an animation in pre-defined sequence, and/or a 3D computer model with very limited interactivity, and are very costly. In some implementation, 3D computer models of car is displayed with artificial texture, with pre-defined and/or very limited interactions possibilities available for users with the 3D models of car in real-time such as opening a few external parts such as door of 3D model of car, 360 rotations of 3D computer model of car in one plane, where internal parts like engine are shown by using images of engine separately which gives an artificial effect. Further, in conventional systems, interior of car is displayed in the form of panoramic video, where displayed internal parts are not interactive as they are just images. The textures displayed on 3D model of car in conventional systems are not realistic, and usually artificial textures of colour is used, and the view of the displayed life-size digital 3D object such as the 3D model of car looks artificial or like cartoons. Further, on zooming the displayed object or 3D model to visualize in life-size or on further zooming the life-size 3D model for detailing, texture becomes pixelated or blurred. In other words, current systems find it difficult to handle realistic images for every parts of displayed object or 3D model, that do not pixelate while zooming and provide user-controlled interaction.

Additionally, users cannot get active information about the product or its components as per choice. The users cannot get their query solved in real time in absence of a human representative near the life-size electronic panels, which aids in user frustration while using such conventional electronic systems.

In some implementations, such as in pending U.S. patent application Ser. No. 13/946,364, PCT application PCT/IN2013/000448, and Indian patent application 2253/DEU2012 filed by the same inventors and applicants as of this application to make available realistic 3D-model/s carrying similar properties of real object, where performing user-controlled realistic interactions selected from extrusive interaction, intrusive interactions, time-bound changes based interaction and real environment mapping based interactions was made possible as per user choice and with negligible loading time of the realistic 3D-models even over web-page. However, to display real products of large dimensions such as automotive vehicle, complex machineries, large home appliances in its original size or life-size as displayed in life-size in physical showrooms, and simultaneously perform user-controlled realistic interactions instantly with life-size 3D models by real-time rendering, an advanced form of system is needed for realistic interaction in exterior and interior region of a detailed 3D model in real time, where quality for life-size or greater than life-size 3D models is maintained even on zooming to visualize detailing. Further, a need arises to present or view one or more 3D models at the same time, and capability to perform some advanced user-controlled interactions to understand the displayed object/product, as mentioned below, to understand the displayed product and its features quickly and in improved manner.

In some implementation as discussed in U.S. Pat. No. 5,999,185 and other prior art systems, methods and techniques in addition to above also lack one or more of the following:

a. Existing systems display unrealistic 3D model with unreal or artificial looking texture. Technique to interact with life-size 3D model textured using real photographs and/or video, which provides detailed, factual and realistic view, is unaddressed in the art.

b. Existing techniques, methods and systems can rotate 3D model in 360 degree in only one plane with either no or limited interactivity from one or a few field of view. Mostly Adobe Flash based applications are used for displaying images of products in specific sequence. If a life-size 3D computer model representing a real object can be rotated in real-time on a soft-copy display device in 360 degree in all planes, a better view of the object can be attained from all angles. Further, to interact with such 3D computer model in real-time from any point of view in any angles is a further challenge.

c. Removal of some parts from a 3D computer model, addition of new parts in the 3D computer model such that the part, also displayed as sub 3D model gets attached to the 3D computer model in a user-controlled interaction and displayed in real-time rendering of 3D computer model is not known. For example, attaching accessories such as bumper in 3D model of car in an interaction and viewing the 3D model of car with attached bumper from all angles by real-time rendering of the 3D model of car as per user input is not known.

d. For the purpose of this invention, and as used in this description and the appended claims, immersive interactions can be defined as interactions where users can visualize their own body performing user-controlled interactions with a 3D computer model, which appears as if the users are interacting with real physical object. A part of a 3D model can start moving, continuously move within the 3D-model, and stop moving as per user input, where the movement and interaction of user with the part and entire 3D model emulates real physical interaction. For example, a belt part moving over roller part in a 3D-model of a treadmill on pressing of start button by user in the 3D-model of the machine, and when the user provides another input of pressing the stop button on the 3D-model of the treadmill, the belt part stops moving gradually as in real machine. In such interactions, user can also see himself running over the belt, while the user runs physically standing before the system. Usually existing techniques, methods and systems use animations or video to display such functioning of parts of an object. The above-mentioned immersive interactions are lacking in existing systems.

e. It is difficult to represent functioning of electronic devices, electronic parts of a real 3D object or digital displays, which require an operating system, embedded operating system or the like in reality to run its hardware, such as a laptop or digital music system of a car, through display of 3D model of such objects, or display of a 3D model comprising such parts. A virtual operating system makes possible representing such functioning in a life-size 3D model or greater than life-size 3D model which is not known in art.

f. Liquid And Fumes Flow Interaction—Existing techniques showing liquid and fumes flow in real-time rendering is not realistic, and provides an artificial look and feel.

g. In modern vehicle lighting devices are very complex. Now-a-days vehicles have designer lights emitting light of different intensity at different section. Existing system, display such lights in real-time rendering just as light emitting source, but find difficult to display light which resemble real light in real-time rendering.

h. In real object some parts of the object are linked such that, when one part is moved, another linked part also moves consequently. This movement can be termed as linked movement. Current systems displaying 3D model lack such linked movement interaction in the 3D model, which is more realistic. An example of linked movement interaction can be an interaction with a 3D model of dustbin, where moving down pedestal of the 3D model of dustbin, lifts upper lid of the dustbin in linked movement as in real scenario (see FIG. 10).

i. Existing systems displaying life-size 3D models do not provide information by way of visualization of properties of softness, pressure, temperature of real products in a real-time interaction and viewing as per user choice. For example, displaying softness of seat in an easy to understand visualisation in a user interaction. Further, time bound changes such as visualising temperature change or wear and tear change in a real object over a period of time using a life size 3D to represent such time-bound changes is lacking.

j. Transparency-opacity effect for performing interaction of un-interrupted view of inaccessible internal parts using transparency-opacity in real-time is lacking.

k. Mirror effect provides a reflection of face, live background scene captured by camera or user's own body captured by a camera integrated with a system. This reflection can be seen in a mirror part of displayed 3D computer model even in life size 3D model, where the reflection is generated and displayed in real time like in real scenario with vivid and extremely realistic texture of both reflection and the displayed 3D model. The mirror effect is lacking in 3D models in real time interaction in existing electronic systems.

l. In physical establishment or real product showroom, usually a human representative is present to assist user in replying to user queries related to product/s considered or viewed by the user. An intelligent virtual product assistant for two-way voice communication to gain product information displayed on a soft-copy display device is desirable to make digital showroom more real. Such arrangement is lacking, where information about product cannot be obtained in real time in a human-like voice to voice two way communication in natural language, leading to user frustration. A real human representative is mandatorily required to be present near conventional electronic display systems.

m. Disintegrating parts one by one from a 3D model of real object in real-time over a soft-copy display device in an interaction as per user input such as of window part, or engine part while visualizing parts moving or disintegrating as per input of user can provide a better understanding of the object. Even such interactions may be prohibited in physical establishment. This kind of interactions are lacking in existing systems displaying 3D model.

In real scenario, a user first interacts with the real car with sight of outer body and features from different angles, opening the doors, viewing interior of life-size car experiencing moving steering, experiencing smoothness of seats, internal features, operating electronic parts to understand functionalities, etc, and again such interaction differs from user to user as per the needs and interest of user. Further, a user can ask different queries to a human representative and receive replies to gain active information about the product, the car.

What is needed is an electronic panel system, and an arrangement for enriched realistic viewing and interaction with displayed, real-looking life-size 3D-models representing real products, where information about displayed product can be obtained in real time, and where user can perform enhanced interactions with realistic 3D model as per user choice for visualizing and hearing effects produced in extrusive and intrusive interactions, liquid and fumes flow interactions, time bound changes based interactions, environment mapping based interactions, deletion interaction, addition interaction, immersive interactions, linked movement interactions, interaction for getting un-interrupted view of internal parts using transparency-opacity effect, inter-interactions, and engineering disintegration interactions.

The present invention is also directed to overcoming or reducing one or more deficiencies and other problems set forth above.

SUMMARY OF THE INVENTION

One or more described implementations provides an electronic panel system and a method implemented on the electronic panel system, for enriched viewing and interacting with 3D computer graphics models of real objects on a soft-copy display device of the electronic panel system. The 3D model displayed on the soft-copy display device is a real-looking 3D computer graphics model representing a real object, preferably in life-size providing a realistic view and interaction possibilities as in physical establishment or real showroom. In one implementation, an electronic panel system is provided comprising a user-controlled interactions unit, a 3D-rendering engine, a user-controlled interaction support sub-system, which in combination with a database of texture data, 3D model data and audio produces and displays real-time rendering of interactive view of the 3D model with synchronized sound output, as user-controlled interaction response to user input. The user-controlled interactions unit comprises functionalities for handling user-controlled interactions. The present invention makes possible carrying out advanced interactions with the displayed 3D model by a user of the electronic panel system.

In one preferred embodiment of the present invention, an arrangement for facilitating viewing and real-time interaction with a 3D computer graphics model representing a physical object, and for facilitating real-time two-way voice communication between a human user and a virtual product assistant for receiving product information in real-time, is provided. The virtual product assistant works, and replies to queries in tandem with the 3D model displayed in the electronic panel system in a synergistic manner. The arrangement is tailored to the human visual system in characteristics such as ergonomic ease of use, and ease of performing interactions. The interactions possible in the electronic panel system, and the arrangement comprising the electronic panel system and a virtual product assistant sub-system includes extrusive and intrusive interactions, liquid and fumes flow interactions, time bound changes based interactions, environment mapping based interactions, deletion interaction, addition interaction, immersive interactions, linked movement interactions, interaction for getting un-interrupted view of internal parts using transparency-opacity effect, inter-interactions, and engineering disintegration interactions as described in details and summarized in TABLE-I and TABLE-II in the latter part of the detailed description.

In another aspect of the present invention, a method for gaining product information in real-time by two-way voice-to-voice communication in natural language between a human user and a virtual assistant sub-system is provided. The product information received by a user is in synchronization to current 3D model representing real product displayed on a soft-copy display device of the electronic panel system.

In yet another aspect of the present invention, robust intuitive gesture commands interpretation capability is provided for performing product-specific and product-independent user-controlled interactions with displayed 3D model of real object by customizing a sensor unit to understand the user-controlled interactions commands.

It is still another aspect of the invention to further enhance visualization of 3D effect during performing user-controlled interactions using an inclined transparent electronic visual display, and an inclined transparent electronic visual display with virtual grid.

The 3D rendering engine and user-controlled interaction unit of the electronic panel system is designed to provide realistic experience while viewing, and interacting with digital 3D objects or 3D models such that interaction with even the life-size or greater than life-size 3D models can be performed very quickly where the texture on the 3D models displayed in—and during—user-controlled interactions is highly realistic and factual as of real object. The life-size 3D models are rendered and displayed in real-time without any breakage of polygons at curves and edges of displayed 3D models even on further zooming of the displayed 3D models for viewing detailing. The electronic panel system and the arrangement of present invention can be used as digital showrooms for display of products virtually which are not is stock, in product demonstration to consumers or technical audience, and further can be used in active learning, and pre-sales or product advertisement.

BRIEF DESCRIPTION OF THE DRAWINGS

The invention and many advantages of the present invention will be apparent to those skilled in the art with a reading of this description taken in conjunction with the accompanying drawings, in which like reference numerals identify like elements, and in which:

FIG. 1c illustrates a block diagram depicting exemplary user inputs transmitting mechanism in one example to a user-controlled interaction unit of the electronic panel system of FIG. 1b;

FIG. 9a, illustrates, through illustration (a)-(c) deletion interaction with a realistic 3D model of a car in real-time in one example;

FIG. 9b, illustrates, through illustration (a)-(c) addition interaction with a realistic 3D model of a car in real-time in one example;

Figure 1A:
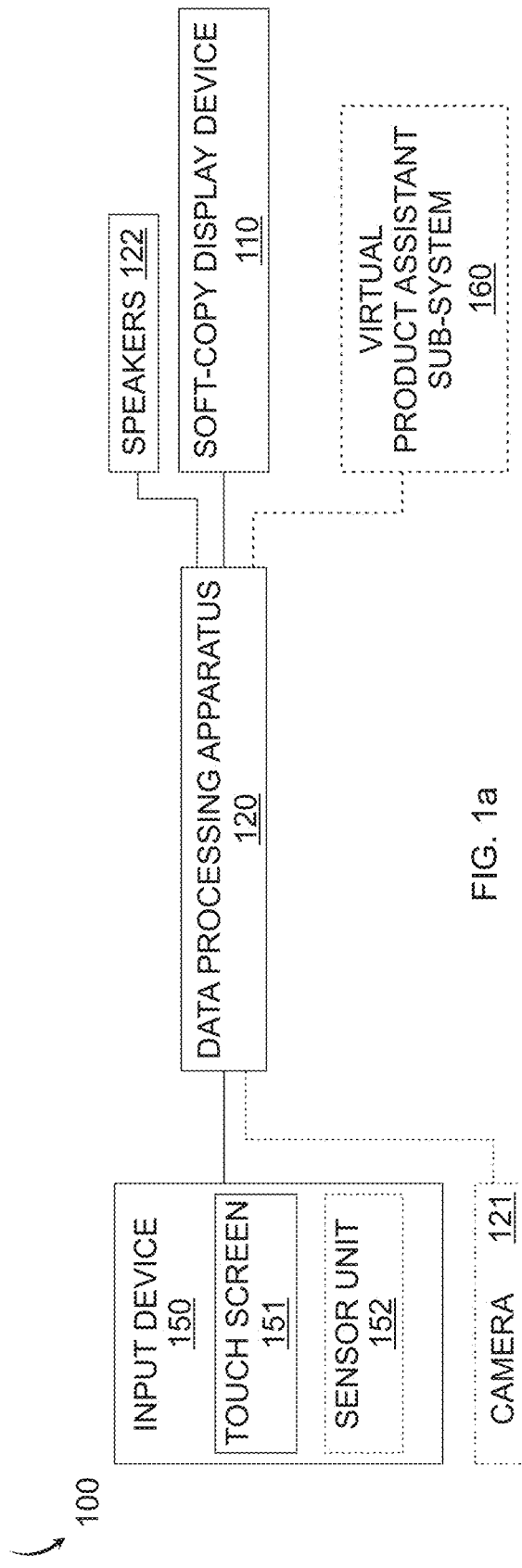
FIG. 1a illustrates a block diagram of an exemplary electronic panel system.

While the invention is susceptible to various modifications and alternative forms, specific embodiments thereof have been shown by way of example in the drawings and are herein described in detail.

DETAILED DESCRIPTION

Illustrative embodiments of the invention are described below.

Figure 14:
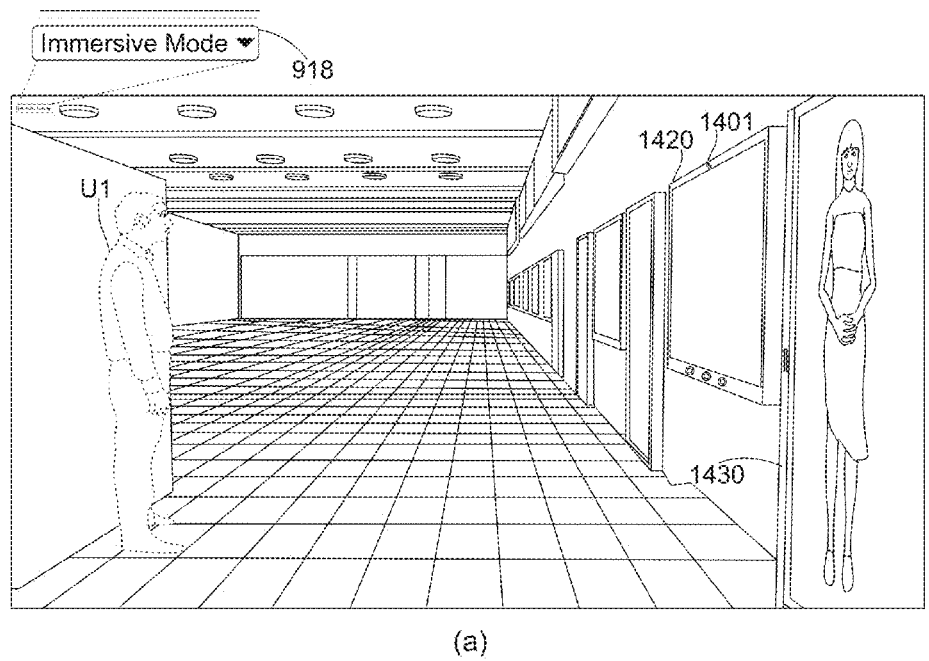
FIG. 14 illustrates, through illustration (a)-(d), immersive interaction in an electronic panel system in one example.
Figure 14:
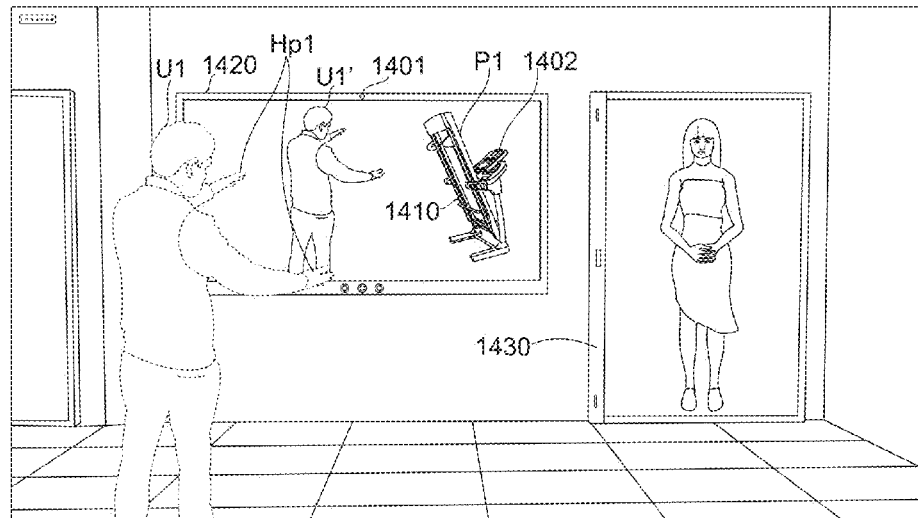
Figure 14:
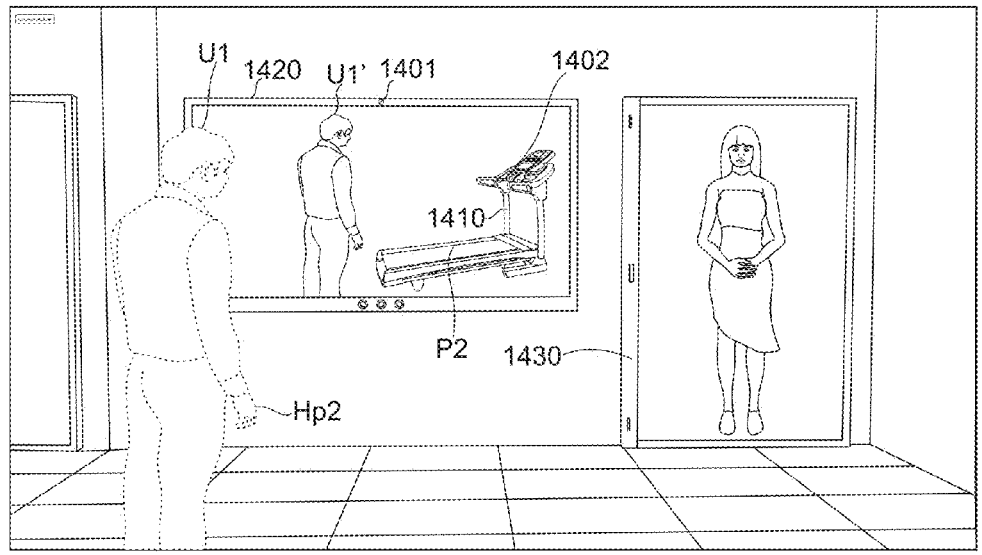
Figure 14:
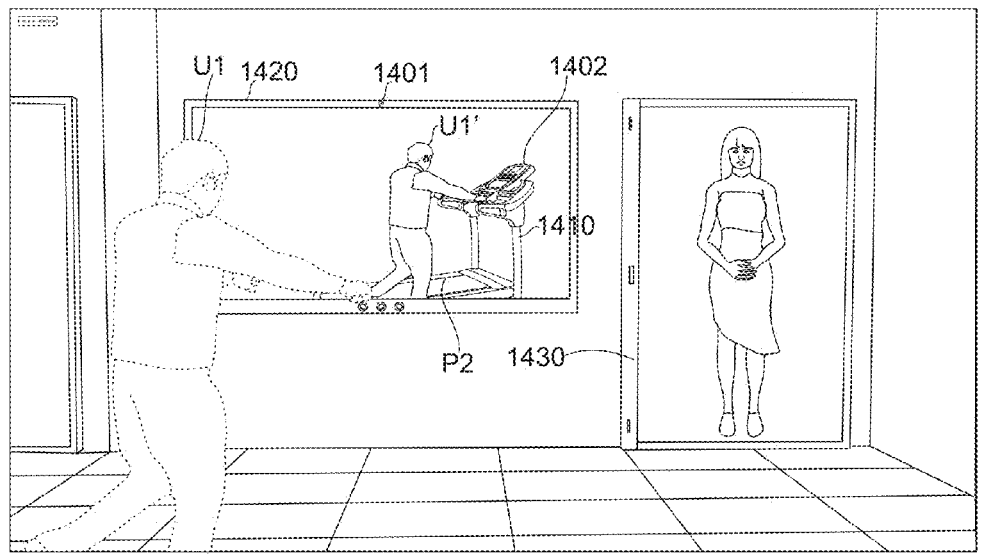
Figure 23:
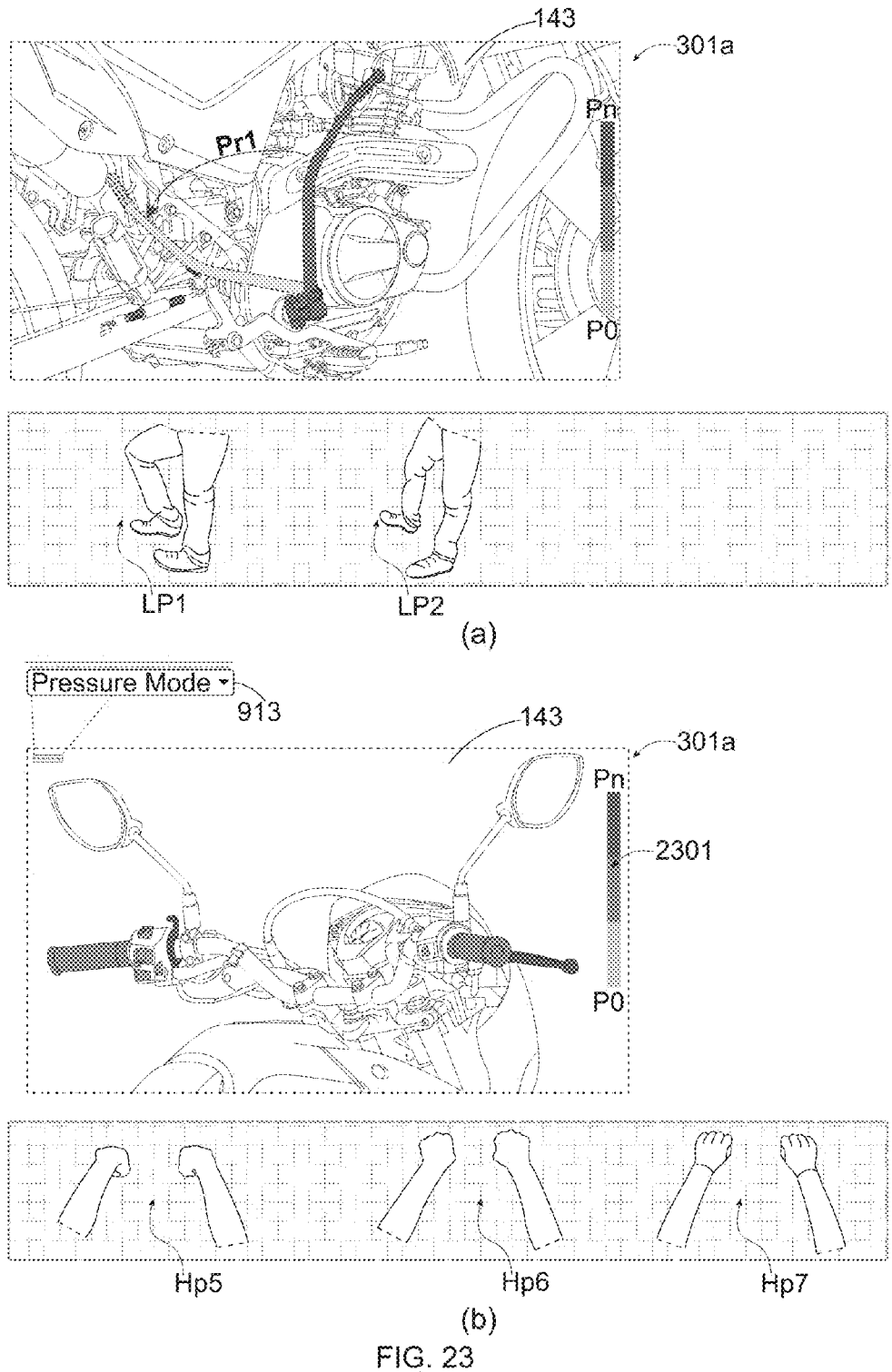
FIG. 23 illustrates in an example judging pressure and checking acceleration using intuitive gesture input.

Referring now to FIG. 1a, a block diagram of an exemplary electronic panel system 100, is illustrated. In one embodiment, the electronic panel system 100 includes a soft-copy display device 110 for displaying a 3D computer graphics model representing a real object, one or more hardware input devices 150, a camera 121 for capturing image and video of user for use in immersive interactions and environment mapping based interactions, a data processing apparatus 120, and one or more sound output devices, such as speakers 122 for providing synchronized sound output. The 3D computer graphics model is hereinafter referred to as 3D model for clarity and consistency. In one embodiment, the input device 150 is a touch screen 151 for receiving touch input using a Graphical User Interface (GUI) 143 displayed on the touch screen 151, as shown in illustration (a) of FIG. 1i and FIG. 3. In another embodiment, the input device 150 is a sensor unit 152 configured for receiving gesture input as shown in illustration (c) of FIG. 1i and FIG. 4. In an alternative embodiment, both the touch screen 151 and sensor unit 152 can be integrated as input devices 150 in the electronic panel system 100 as shown in illustration (d) of FIG. 1i and FIG. 4. In one embodiment as illustrated in illustration (b) of FIG. 1i, the soft-copy display device 110 can be touch screen capable of receiving touch input through the GUI 143, along with virtual product assistant 191 displayed on another soft-copy display device 173. It is apparent that other known input devices or means such as a keyboard, pointing devices such as mouse, a trackball, a track pad, Wireless remote, and the like can be used by an ordinary person skilled in the art for providing input. The touch screen 151 and sensor unit 152 allow a user to operate and control the 3D model on the soft-copy display device 110. For the purpose of this invention, and as used in this description and in the appended claims, the soft-copy display device 110 is an electronic visual display, a see through display, a wearable display or a projection based display. The projection based display can be a holographic display or any other projection based display. The electronic visual display can be a non-inclined electronic visual display 110 or an inclined transparent electronic visual display (601a, 611a). It is apparent that a liquid crystal display (LCD), a plasma screen, a LED display, an OLED, a curved screen, and the like, can be used as electronic visual display. It is to be appreciated that other known display devices can be used. The soft-copy display device 110 is of variable dimension depending on 3D model displayed on the soft-copy display device 110. The 3D model displayed is of variable size, preferably a life-size or near life-size 3D-model. It is to be appreciated that the 3D model of the real object displayed can be less than life-size, life-size, or greater than life-size 3D model of the real object, although a life-size provides a real-like feel. The sensor unit 152 can be an infrared-based sensors, voice-based sensors for voice input or camera-based sensors for receiving gesture input. The gesture input can be provided using known gesture receiving devices or sensor units in one implementation. In another implementation, sensor units can be customized to recognize additionally intuitive gestures specifically related to a product or a similar category of products. Examples of category of products include but are not limited to automotive vehicles, mobiles, refrigerators etc. The intuitive gestures increase realism while interacting with the displayed 3D model on the soft-copy display device 110. Some intuitive gestures related to automotive vehicles as an example are shown in FIG. 14 for providing interaction command for performing immersive interactions, FIG. 19 for zoom-in and zoom-out interaction, kick gesture as shown in FIG. 23. for operating kick in extrusive interaction in pressure view mode, and closed hand intuitive acceleration check gestures for checking acceleration, lights ON-OFF gesture FIG. 24 for performing extrusive interaction of lighting effects and FIG. 25 for performing extrusive interaction of rotating the displayed 3D model in 360 degree in all planes. The present invention should not be deemed as limited to a specific embodiment of the sensor unit 152. It should be understood that number of sensor units, number of sensors in each of the sensor units, and the positioning of sensor units may vary.

Figure 1B:
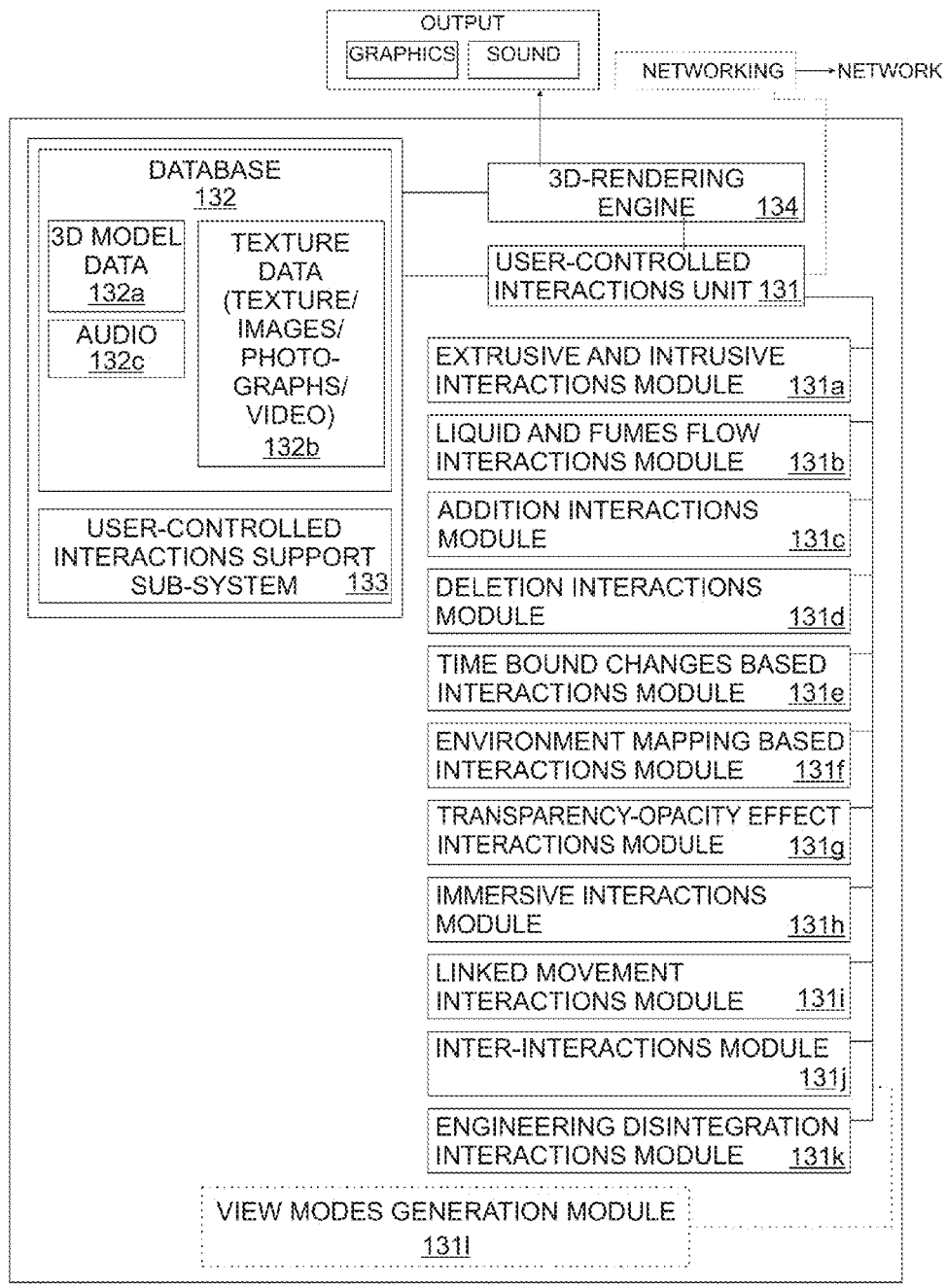
FIG. 1b illustrates a block diagram of an exemplary electronic panel system depicting working of the electronic panel system according to present invention.
Figure 3:
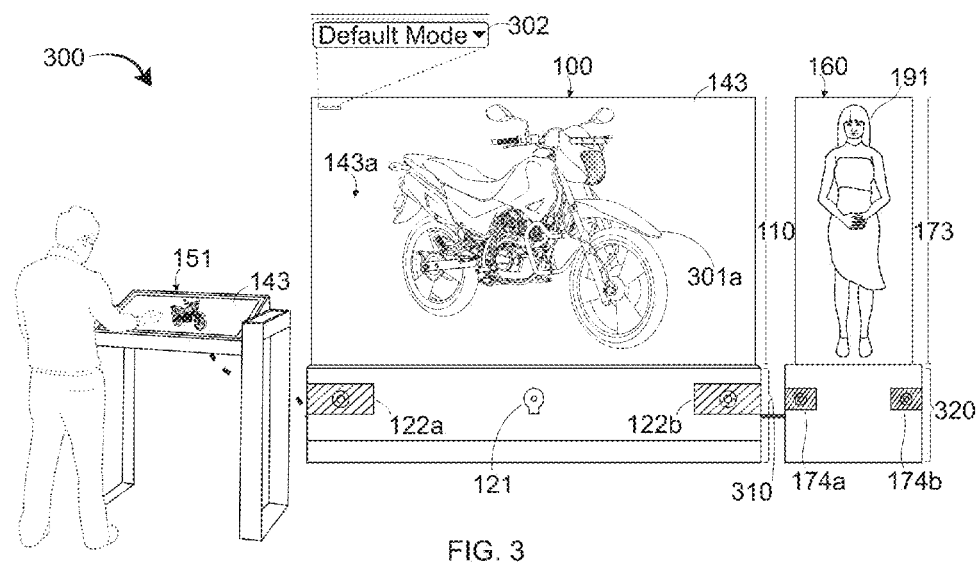
FIG. 3 shows a schematic view of an example arrangement comprising an electronic panel system displaying a life-size 3D object and a virtual product assistant sub-system displaying a virtual product assistant, according to an embodiment of the present invention.
Figure 4:
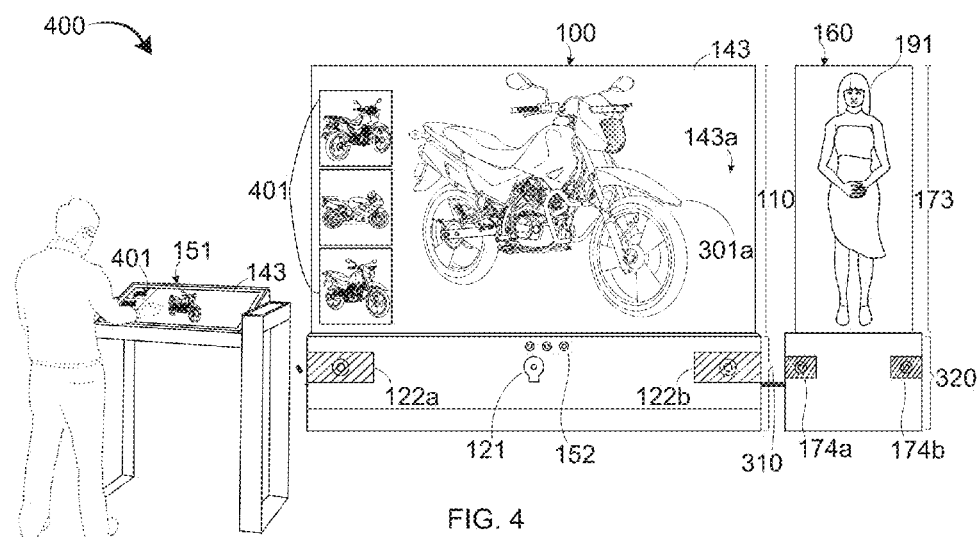
FIG. 4 shows a schematic view of an example arrangement according to preferred embodiment of the present invention.
Figure 5:
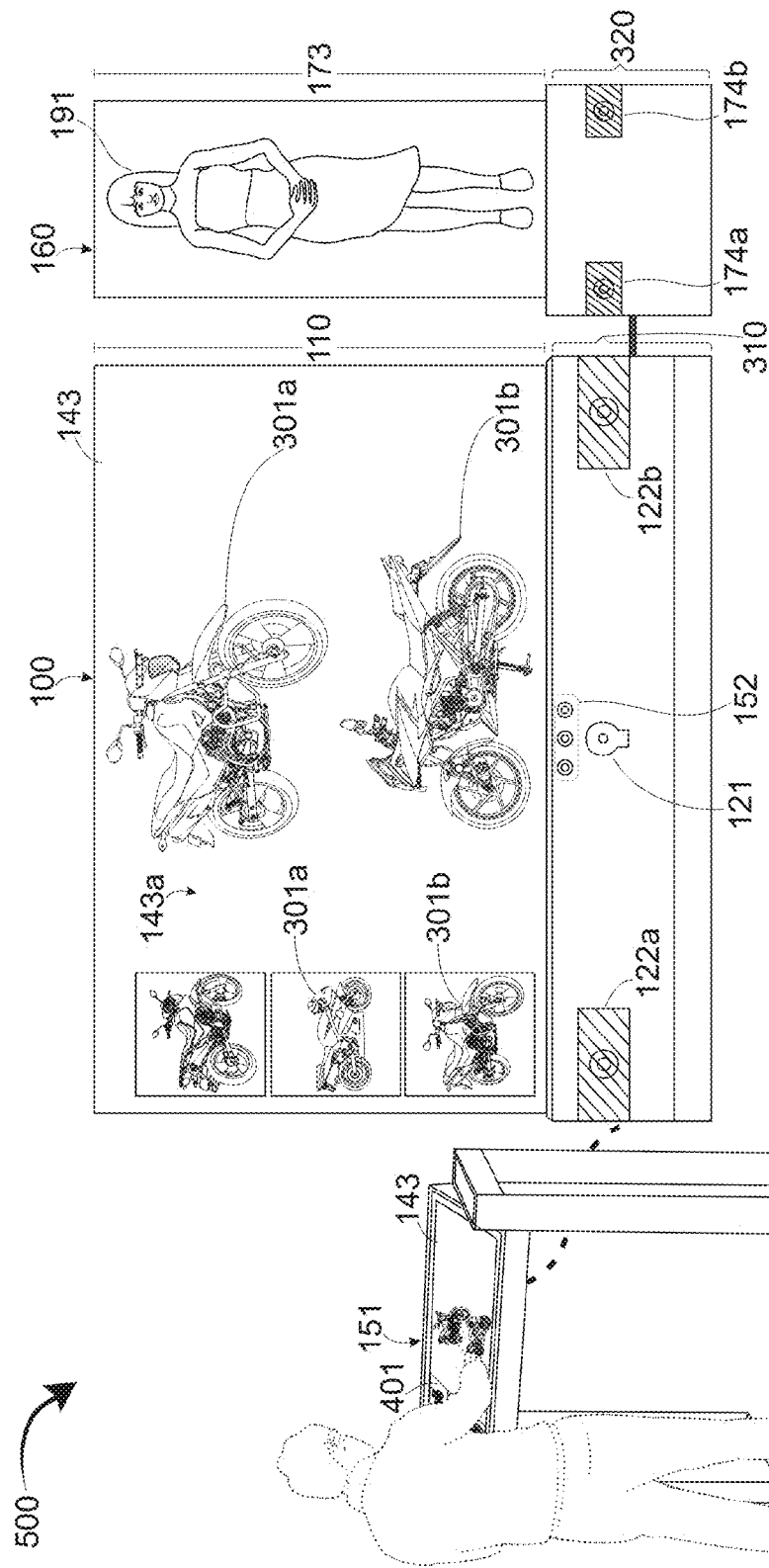
FIG. 5 shows a schematic view of an example arrangement with electronic panel system displaying two life-size 3D object at the same time and a virtual-assistant sub-system, according to yet another embodiment of the present invention.

Now coming to FIG. 1*b*, a block diagram of an exemplary electronic panel system for depicting working of the electronic panel system according to present invention, is illustrated. A user input is processed by a user-controlled interaction unit 131 and final output of graphics (different or transformed view of 3D model) with synchronized sound is generated by a 3D rendering engine 134 in association with the user-controlled interaction unit 131, and finally displayed by a GUI 143 on the soft-copy display device 110. In some implementation, synchronized sound may not be provided. A non-transitory computer readable storage medium may be provided for storing instructions executable by the data processing apparatus 120 that upon such execution cause the data processing apparatus 120 to perform operations comprising:

(a) presenting a first view of at least one 3D model by a Graphical User Interface (GUI) 143 (as shown in FIGS. 3, 4 and 5), using one or more processors, where the GUI 143 comprises one or more interactive 3D space 143*a* adapted to display one or more 3D models;

(b) receiving a user input, the user input are one or more interaction commands provided using one or more input device 150 that is integrated with the electronic panel system 100, where one or more interaction commands are provided for performing each user-controlled interactions in real-time;

(c) identifying one or more interaction commands, using one or more processors, by user-controlled interaction unit 131;

(d) in response to the identification, invoking a corresponding user-controlled interaction functionality of the user-controlled interaction unit 131, using one or more processors;

(e) in response to the invoking, producing real-time rendering of corresponding interactive view of the 3D model with synchronized sound output, as user-controlled interaction response using a database 132 comprising 3D model data 132*a*, texture data 132*b*, audio 132*c*, a user-controlled interaction support sub-system 133 and a 3D rendering engine 134, using one or more processors, by the user-controlled interaction unit 131; and (f) displaying the rendered user-controlled interaction response in one interactive 3D space 143*a* of the GUI 143 through the soft-copy display device 110 in real-time with synchronized sound output, using one or more processors, in response to the input. The texture data 132*b* includes textures obtained from photographs, video, color or images. The texture obtained from video and photographs may be calibrated textures obtained from the novel texturing methods as discussed in Indian patent application 3840/DEL/2013, U.S. patent application U.S. Ser. No. 14/214,697 and PCT application PCT/IN2014/000177, all now pending filed by the same applicants as of this application. Video is used as texture in the 3D model only for that surface/s which corresponds to functioning part such as light-emitting parts in the real object. The use of video enhances reality in displaying dynamic texture changes for function part for lighting effect (one of extrusive and intrusive interactions). Multiple textures pre-calibrated on 3D model UV layouts can be stored as texture data for one/same surface in the database 132, which are called for or fetched dynamically by the user-controlled interaction unit 131 during the user-controlled interactions.

Figure 1D:
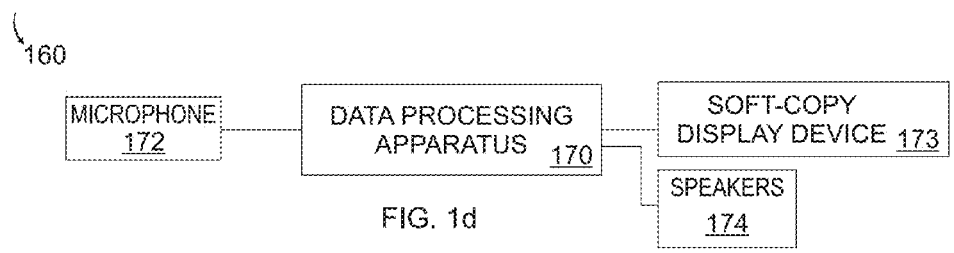
FIG. 1d shows a block diagram of an exemplary virtual product assistant sub-system.
Figure 1E:
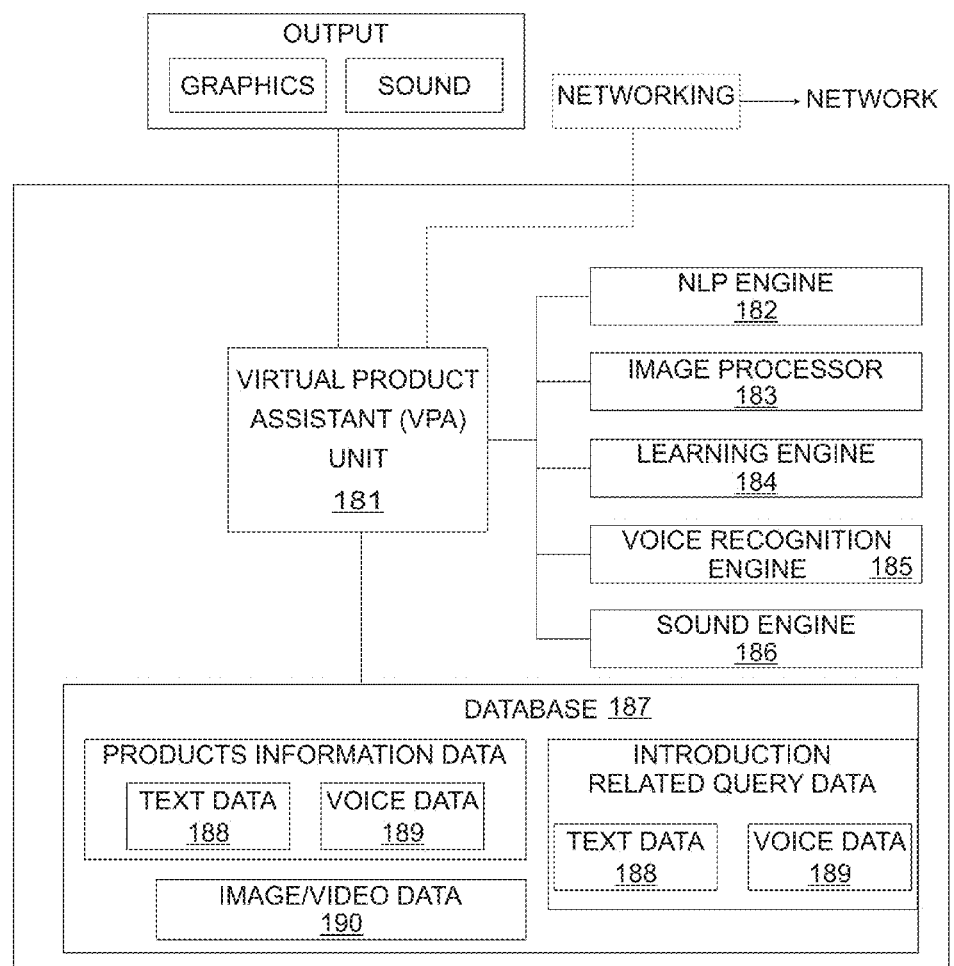
FIG. 1e shows a block diagram of an exemplary virtual product assistant sub-system depicting working of the exemplary virtual product assistant sub-system according to present invention.
Figure 1F:
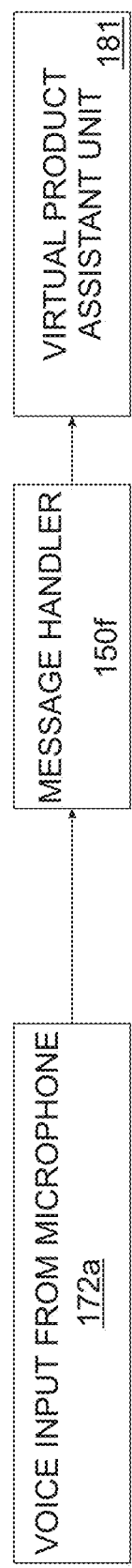
FIG. 1f shows a block diagram depicting an exemplary transmitting mechanism of voice input from a microphone to a virtual product assistant unit in the virtual product assistant sub-system of FIG. 1e.
Figure 1G:
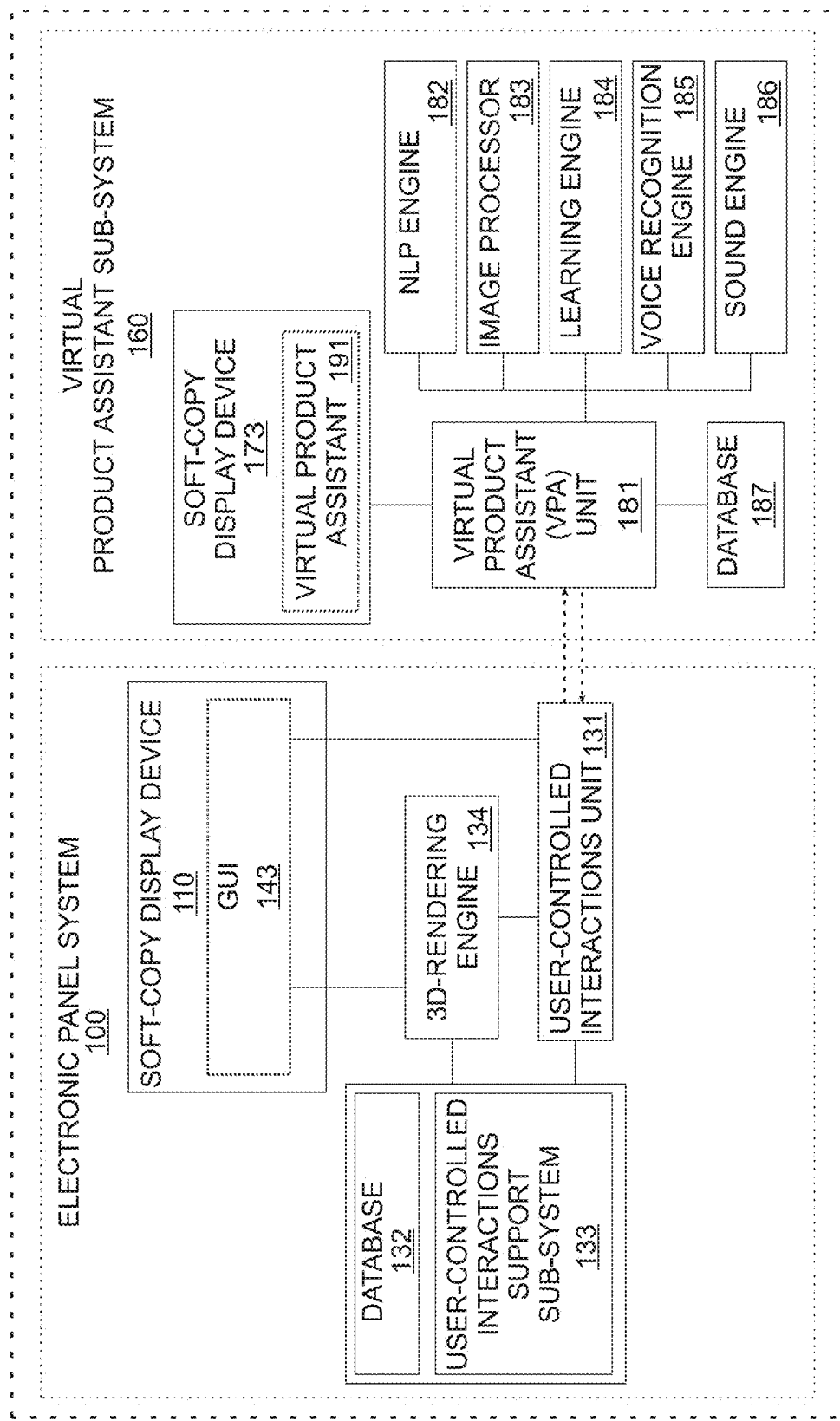
FIG. 1g shows a block diagram of message passing between the electronic panel system and the virtual product assistant sub-system in an arrangement in one embodiment according to present invention.
Figure 1H:
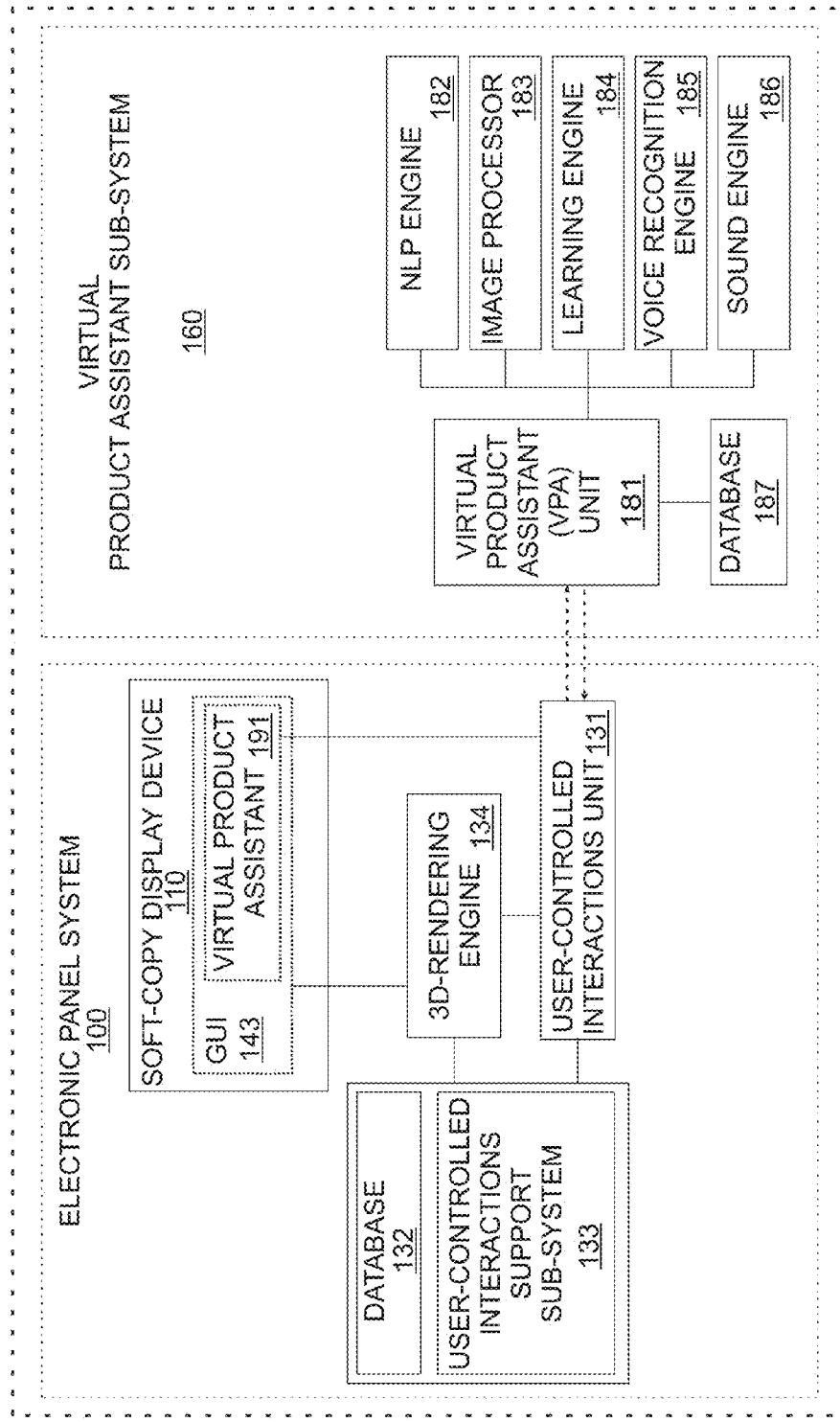
FIG. 1h shows a block diagram depicting both virtual product assistant and 3D model rendered in same Graphical User Interface in an arrangement in another embodiment according to present invention.
Figure 1I:
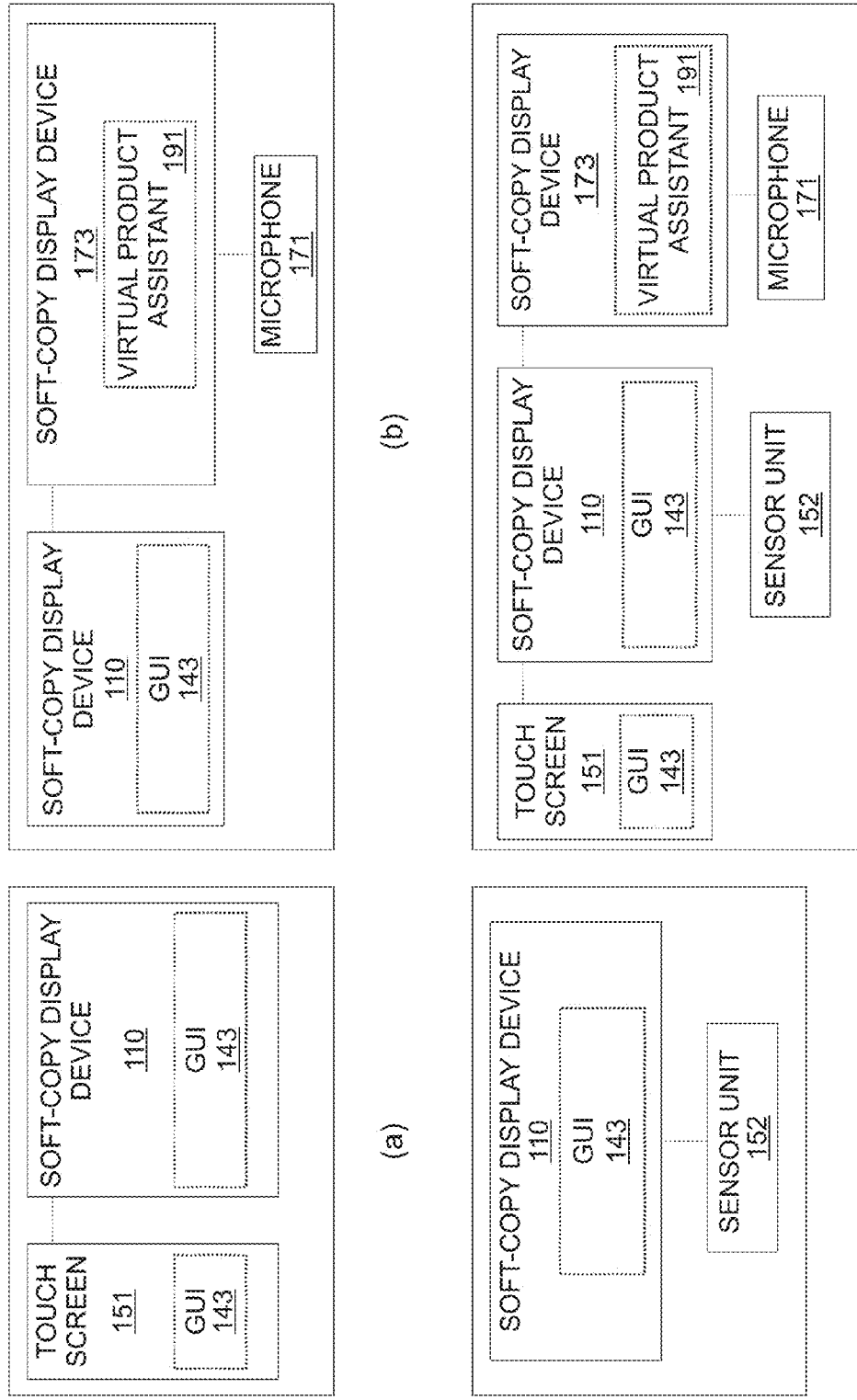
FIG. 1i illustrates, through illustrations (a)-(d), block diagrams of user interfaces as provided in different embodiments of electronic panel system according to present invention.
Figure 9C:
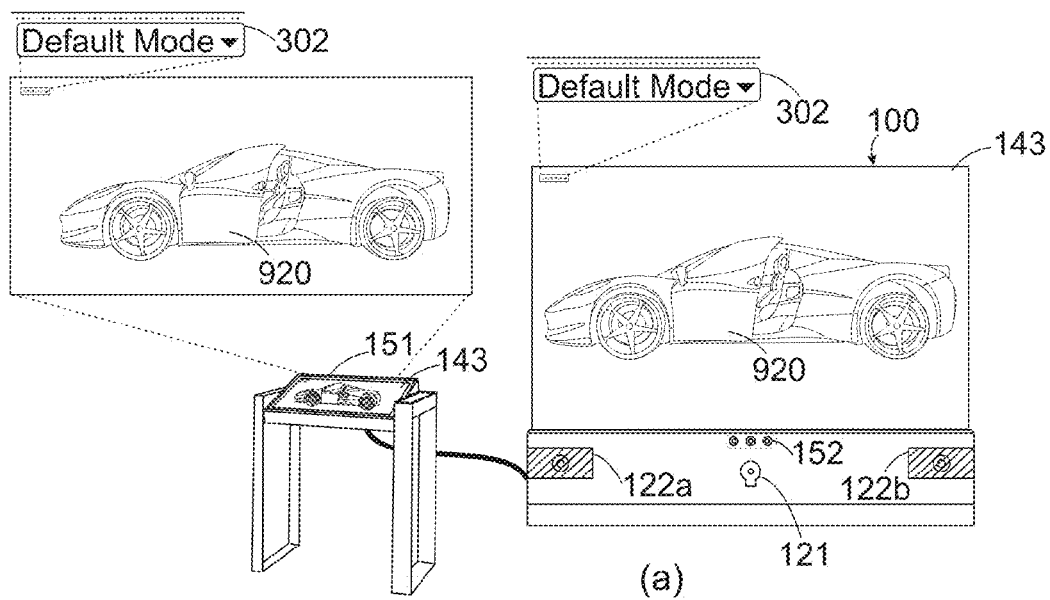
FIG. 9c, illustrates, through illustration (a)-(b) selection of view modes in one example.
Figure 9C:
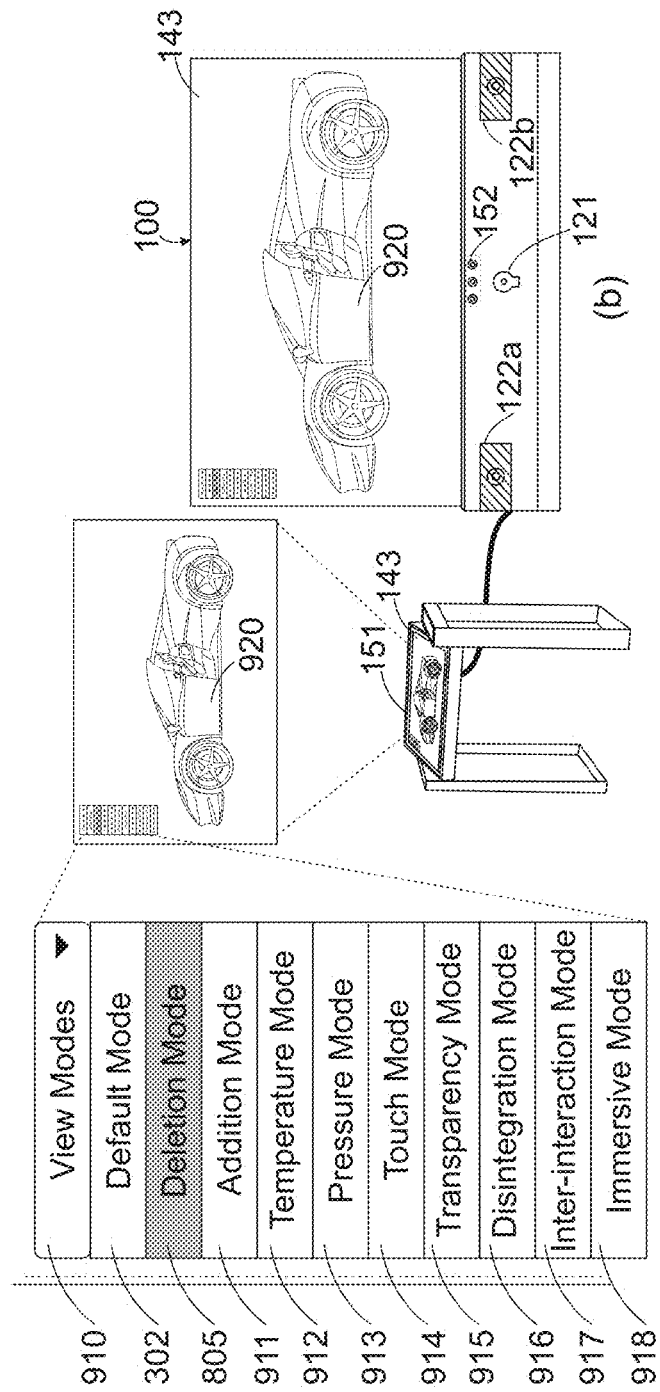
Figure 11:
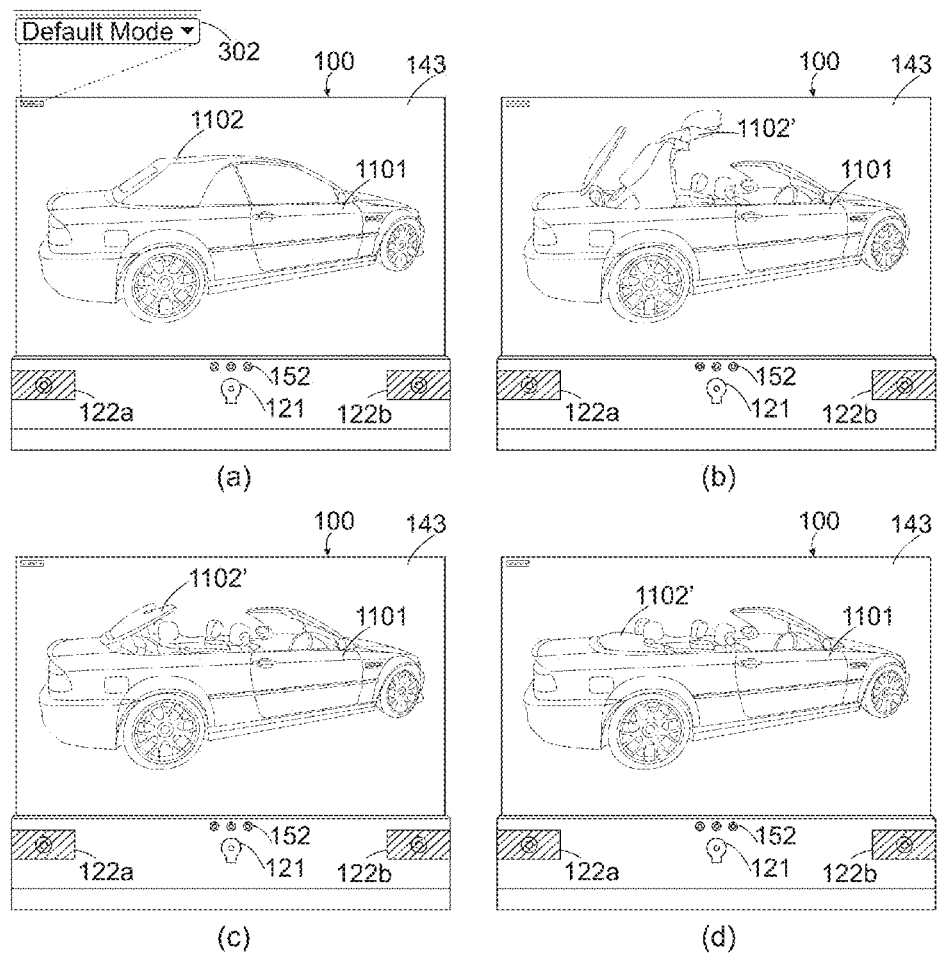
FIG. 11 illustrates, through illustration (a)-(d) folding motion interaction to operate external movable parts in an advanced extrusive interaction with realistic 3D model in real-time.
Figure 16:
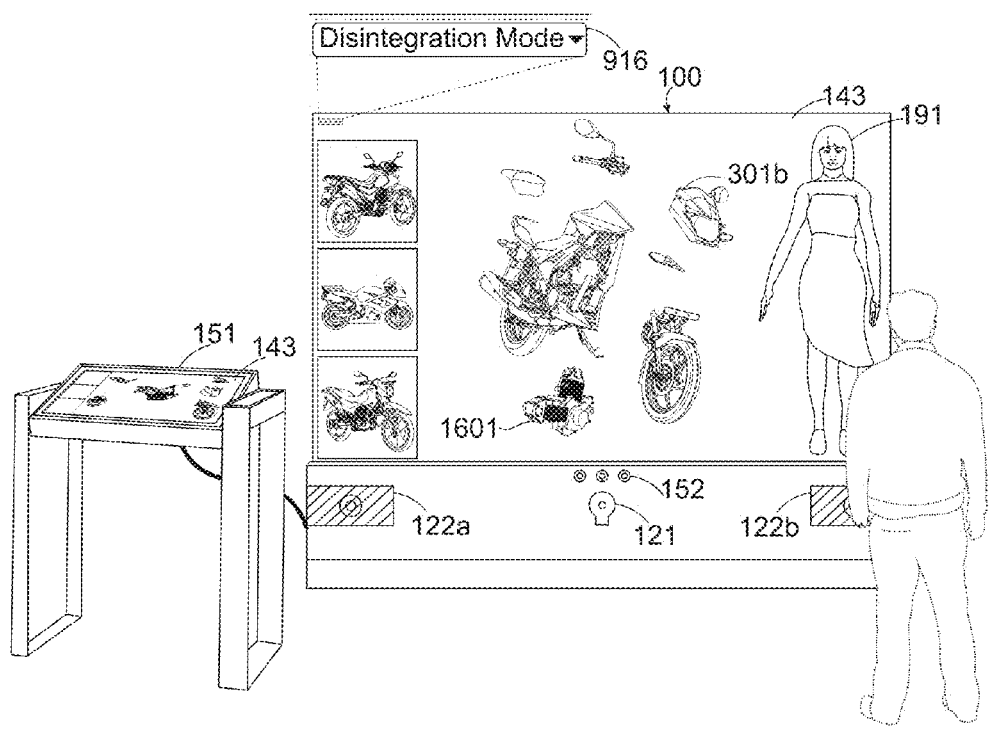
FIG. 16 illustrates an example exploded view interaction of life-size 3D-model of motor bike depicting an example extrusive and intrusive interaction in the electronic panel system in one embodiment.

The user-controlled interaction support sub-system 133 includes a sound engine for producing sound as per user-controlled interaction, a motion library responsible for animation of the virtual product assistant in one embodiment as shown in FIGS. 1*i* and 16, or animation of one or more parts in the 3D model such rotating the wheel continually for some time, a virtual operating sub-system for providing functionality of operation of electronic or digital parts in the displayed 3D-model/s depending on the characteristics, state and nature of displayed object, an Artificial Intelligence (AI) engine for decision making and prioritizing user-controlled interactions response, a scene graph for primarily for putting more than one 3D object in scene say more than two 3D model of bikes, one bike or one 3D model etc, a terrain generator for generating surrounding, in case say 3D model of car is placed in some environment, lighting and shadow for generating the effect of light of 3D model, a shader for providing visual effects such as colour shades, and a physics/simulation engine for generating simulation effect, for example folding the roof of car as shown in FIG. 11 and generating wrinkles. The user-controlled interactions unit 131 further comprises view modes generation module 131*l* for generating different view modes as shown in FIG. 9*c*. The user-controlled interactions unit 131 includes user-controlled interactions functionalities for performing each user-controlled interaction. The user-controlled interactions modules of the user-controlled interactions unit 131 includes extrusive interaction and intrusive interactions module 131*a* for performing extrusive and intrusive interactions, liquid and fumes flow interactions module 131*b* for performing liquid and fumes flow interactions, addition interaction module 131*c* for performing addition interactions, deletion interaction module 131*d* for performing deletion interactions, time-bound changes based interaction module 131*e* for performing time-bound changes based interactions, environment mapping based interaction module 131*f* for performing environment mapping based interactions, transparency-opacity effect module 131*g* for performing interaction for getting un-interrupted view of internal parts using transparency-opacity effect, immersive interaction module 131*h* for performing immersive interactions, linked movement interaction module 131*i* for performing linked movement interactions, inter-interaction module 131*j* for performing inter-interactions, and engineering disintegration interactions module 131*k* for performing engineering disintegration interactions with the displayed 3D model. The different interactions are described in details below and also summarized in TABLE-I and TABLE-II provided at latter part of this specification. The user control interaction unit 131 is the main logic that utilizes different sub-system 133, database 132, and according to user input 150*a* generates output using modules (131*a*-131*u*) and a corresponding scene or user-controlled interaction response is rendered using a 3D rendering engine 134 in real time.

Now referring to FIG. 1*c*, a block diagram depicting exemplary different user input transmitting mechanism to a user-controlled interaction unit 131 in the electronic panel system is illustrated. User input 150*a* can generate a network message 150*b*, an operating system message 150*d*, or is direct input 150*c*. The network message 150*b* means a command or event generated by the user input 150*b* which is sent by server software to client software in same machine or any host connected through network for an action by the client. The operating system message 150*d* is a command or event generated by user input by a device handler to the client software via operating system inter process communication/message queue/or an action by the client device. In the direct input 150*c* or direct messaging, the device handler and the client software are a single application, hence commands or event are directly bound to the device handler. A message Interpreter 150*e* interprets the message (command/event) based upon the context and calls the appropriate handler for an action. Message handler 150*f* or event handler are logic blocks associated with an action for controls. User input 150*a* can be provided using infrared based sensor, voice command based sensor, camera based sensor, or touch based screens. During mirror effect and immersive interactions, the user-controlled interactions unit 131 uses live video input from camera 121*a*, which is directly passed to message handler 150*f*. The message handler further transmits the input or interaction command to the user-controlled interactions unit 131 for identification and further processing as discussed above.

FIG. 1*d* shows a block diagram of an exemplary virtual product assistant sub-system 160. The virtual product assistant sub-system 160 comprises a soft-copy display device 173 for displaying virtual product assistant 191, a voice input device such as microphone 172, a data processing apparatus 170, and speakers for providing synchronized sound output. The working of the exemplary virtual product assistant sub-system is illustrated, using a block diagram of the virtual product assistant sub-system as shown in FIG. 1*e*.

The virtual product assistant sub-system 160 further comprises:
instructions stored in a non-transitory computer readable storage system executable by the one or more processors that upon such execution cause the one or more processors to perform operations comprising:
receiving messages of one or more 3D model representing physical object displayed by the GUI 143 on the soft-copy display device 110 of the electronic panel system 100, using one or more processors, by a virtual product assistant unit 181, where the first message is received on presenting the first view of the 3D model, and consequent updated messages are received on providing each interaction command by the user;
activating corresponding product information data set (188,189) in a database 187 on receiving the first message, and continually updating the product information data set (188,189) in accordance to the current 3D model display state on the GUI 143 of the electronic panel system 100 in response to received messages;
receiving a user input 172*a*, the input 172*a* is in the form of at least one natural language speech such as in English language provided using a hardware voice input device that is in communication with the virtual product assistant sub-system 160, where the user voice input 172*a* is either a product information query for gaining product information in real-time or an introduction related speech for introduction and salutation;
processing voice-based input 172*a* to retrieve relevant information as per received product information query or introduction related speech;
outputting reply in the form of natural language speech with lip-synchronization of spoken words displayed in graphics accordance to the current 3D model display state displayed on the electronic panel system, wherein the lip-synchronization occurs dynamically in image or video 190 of displayed virtual product assistant 191, using one or more processors, by an image processor 183. During outputting reply in the form of natural language speech, the output speech is customizable for pronunciation, masculine and feminine voice using a sound engine 186. The processing voice-based input to retrieve relevant information further comprises:
performing speech recognition using voice recognition engine 185 to transcribe spoken phrase or sentence into text acceptable by said virtual assistant sub-system 160;
ascertaining meaning of the text to differentiate between introduction query and product information query using a Natural Language Processing (NLP) engine 182, to aid in matching of input with corresponding product information data set;
if input is a product information query, matching the input with active product information data set relevant to the product displayed on the soft-copy display device 110 of the electronic panel system 100;
if input is introduction related query, matching the input with introduction related query data (188,189) set relevant to the introduction query.

The output is precise as per the query with synchronized graphics. The voice input 172*a* from a microphone 172 is transmitted to the message handler 150*f* and then passes to the virtual product assistant unit 181 as shown in FIG. 1*f* for further processing as described above.

In one preferred embodiment, the electronic panel system 100 is connected to the virtual product assistant sub-system 160 in an arrangement (300,400,500) as shown in FIG. 1*g*, FIG. 3, FIG. 4 and FIG. 5. Now referring to FIG. 1*g*, the electronic panel system 100 remains in data connection to the virtual product assistant sub-system 160 through the user-controlled interactions unit 131 and the virtual product assistant unit 181 as shown in FIG. 1*g*. A first view of the 3D model when presented on the GUI 143 on the soft-copy display device 110, a first message is passed by the user-controlled interactions unit 131 informing the virtual product assistant unit 181 about the product being displayed on the electronic panel system 100. Further, when user provides an interaction command in the form of input to the electronic panel system 100, consequent updated messages are passed by the user-controlled interactions unit 131 to the virtual-assistant sub-system 160 through the virtual product assistant unit 181, which makes the virtual-assistant sub-system 160 aware of the product view displayed on the soft-copy display device 110 of the electronic panel system 100, and accordingly the virtual-assistant sub-system 160 gets configured to reply to queries with respect to current specific product displayed on the soft-copy display screen 110.

For example, a user may ask following queries using the microphone 172 when a 3D model of bike of a particular model, say model X is displayed on the soft-copy display device 110 of the electronic panel system 100 and receive corresponding replies from the virtual product assistant 191:
Query-1: What is the mileage of this bike?
Reply-1: Mileage of this bike is 65 km per liter of petrol.
Query-2: What is the special feature about this bike?
Reply-2: It has an excellent suspension system and a sports bike-like looks.
Query-3: In how many variants is it available?
Reply-3: There are two variants and 6 colors available for each variant.
Now, when a different bike is displayed on the soft-copy display device 110, or user changes the bike displayed to a different bike model, say Y having different features and mileage, the same query asked to the virtual-assistant sub-system receives updated reply as per the current product or current state/view of same product displayed on the GUI 143 on the electronic panel system 100, as given below.
Query-1: What is the mileage of this bike?
Reply-1: Mileage of this bike is 72 km per liter of petrol.
Query-2: What is the special feature about this bike?
Reply-2: It has advanced braking system.
Query-3: In how many variants is it available?
Reply-3: There are 4 variants and 3 colors choices available for each variant.

Now coming to FIG. 3, an example arrangement 300 comprising an electronic panel system 100 displaying a life-size 3D object 301a and the virtual product assistant sub-system 160 displaying a virtual product assistant 191, is illustrated according to an embodiment of the present invention. A first view of the life-size 3D model of bike 301a is shown. All user-controlled realistic interactions can be performed as mentioned in TABLE-I and TABLE-II (provided in latter part of this specification) with the 3D model by providing one or more interaction commands. Further, the related user-controlled interactions in one embodiment may be grouped or categorized in separate view modes (302,805, 910-918) as shown in FIG. 9c, where one or more user-controlled interactions is performed in one mode or by switching to another mode. For example in default mode 302 extrusive and intrusive interactions such as rotating 3D-model of object in 360 degree in different planes, lighting effect for light-emitting parts of 3D-model of object, interacting with 3D-models having electronic display parts for understanding electronic display functioning, moving movable external parts such as sliding fuel tank door, moving mirrors, hood or folding simulation interaction as shown in FIG. 11 can be grouped. The interactions with the 3D model are performable from any projected angles of the 3D model during 360 rotations either in one plane or all planes in varying background environment. The arrangement 300 facilitates viewing and real-time interaction with the 3D computer graphics model 301a representing a physical bike, and also facilitates real-time two-way voice communication between a human user and a virtual product assistant 191 for receiving product information. The 3D model can be zoomed to any extent to view precise details without any blurring. The arrangement is arranged to provide real-time information related to displayed 3D model on the electronic panel system 100 based on user voice input using the voice input device. FIG. 4 shows a schematic view of preferred embodiment of an arrangement 400 with the touch screen 151, the virtual product assistant sub-system 160, and the sensor unit 152 integrated with the electronic panel system 100. FIG. 5 shows another alternative embodiment of the arrangement 500, where two life-size 3D objects are displayed at the same time on the GUI 143a using a virtual interactive 3D space 143a. The GUI 143 is always synchronized in touch screen 151 and the soft-copy display device 110.

Those skilled in the art will appreciate that the connections between the first data processing apparatus 120 and the second data processing apparatus 170 of virtual product assistant sub-system 160, and between the input devices and the data processing apparatus (120,170) can be by hard cabling, radio frequency signals, Bluetooth, or the like, infrared coupling, telephone lines and modems, or the like.

Figure 2:
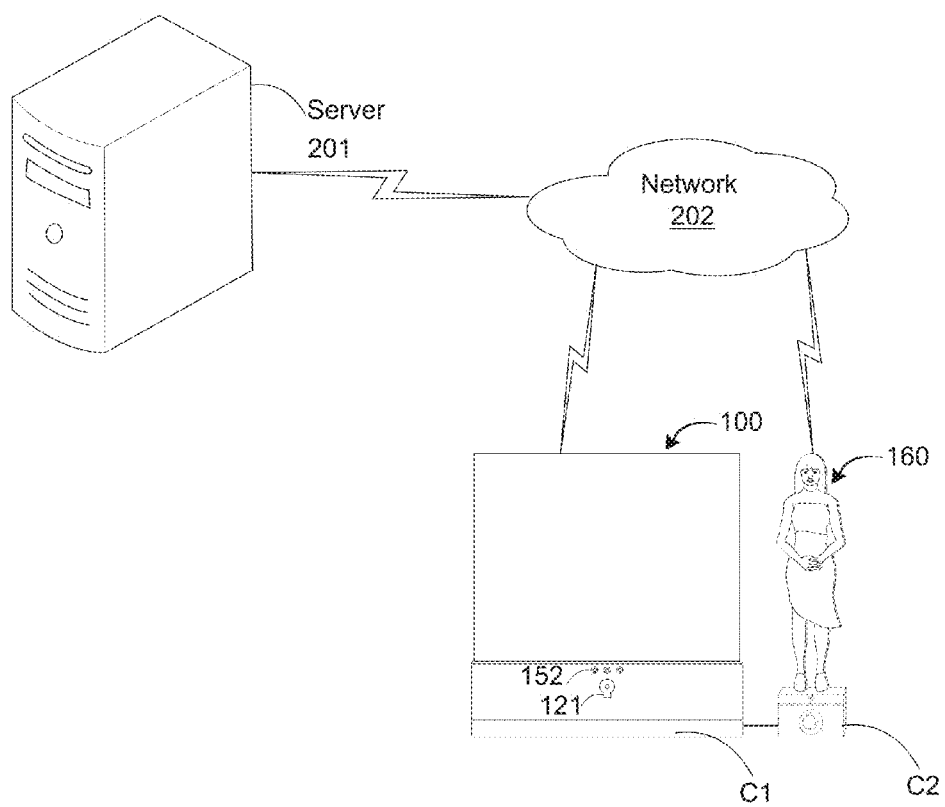
FIG. 2 illustrates exemplary diagram of an arrangement in a server-client architecture according to an alternative embodiment of the present invention.

For purposes of understanding the present invention, it is sufficient to recognize that additional conventional equipment/connections of this type may be useful in establishing and maintaining data and/or power connections among the input devices, the first data processing apparatus and the second data processing apparatus. For example, in an alternative embodiment as illustrated in FIG. 2, the electronic panel system 100 and the virtual assistant sub-system 160 may be further connected to a server 201 through a network 202 in a server-client architecture, where the electronic panel system 100 and the virtual assistant sub-system 160 behaves as client systems (C1,C2). Some of the components of FIG. 1b and FIG. 1e may be provided in the server 201.

Embodiments of the present invention may be implemented using any suitable apparatus. Such an apparatus may include, but is not limited, to data processing machines and devices, for example computers or server computers. The data processing apparatus can be one or more processors in one or more data processing machines. The processor can be a Central Processing Unit (CPU), a Graphics Processing Unit (GPU), or preferably both Central Processing Unit (CPU) and Graphics Processing Unit (GPU) in one embodiment. It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. The user-controlled interactions unit 131, the 3D-rendering engine 134, the user-controlled interaction supporting sub-system 133 and their components/modules are executable on single computer or multiple computer, or computing systems having more than one computers connected through network. Further, the user-controlled interactions unit 131, the 3D-rendering engine 134, the user-controlled interaction supporting sub-system 133, and software components of the virtual assistant sub-system 160 may be designed to be executed single-threaded using one or more processors or multi-threaded using multiple processors.

In various embodiments, hardwired circuitry may be used in combination with the software instructions to implement the present inventions. Thus, the techniques are not limited to any specific combination of hardware circuitry and software, or to any particular source for the instructions executed by the data processing systems. The present invention can also relate to an apparatus for performing one or more of the operations described herein. This apparatus may be specially constructed for the required purposes, or it may comprise a general-purpose computer selectively activated or reconfigured by a computer program or application stored in the computer. Such a computer program or application may be stored in a machine (e.g. computer) readable storage medium, such as, but is not limited to, any type of disk including floppy disks, optical disks, CDROMs, and magnetic optical disks, read only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus. A typical computer system will usually include at least a processor, memory, and a bus coupling the memory to the processor. It will also be appreciated that the computer system is typically controlled by an operating system, which includes a file management system, such as a disk operating system, which is part of the operating system software.

The virtual product assistant 191 in an embodiment can be displayed near the 3D model on the same GUI 143 displayed on the electronic panel system 100 as shown in FIG. 1h and FIG. 16. FIG. 1h illustrates a block diagram depicting both virtual product assistant 191 and 3D model rendered in real-time in same Graphical User Interface 143 in an arrangement, in another embodiment of the present invention. Here, the working of virtual product assistant subsystem 160 and the electronic panel system 100 is same expect that the final output of the virtual product assistant 191 is controlled by the user-controlled interaction unit 131, and a single user-controlled interaction response is rendered in real-time comprising both 3D model/s in one or interactive 3D space 143a and the virtual product assistant 191 in same GUI 143 using the 3D-rendering engine 134. Thus, a single soft-copy display device 110 is sufficient as shown in the FIG. 1h. The message passing and data connection is carried out in same manner as described in FIG. 1g. The virtual product assistant 191 can reply to queries asked by a user. For example, enquiring and receiving reply from the virtual product assistant 191 to understand motor bike functionality such as about engine power, pick-up speed, type of suspension, brake type, price, showing riding posture whether tilted or straight, seat height, fuel tank capacity, fuel efficiency, size and shape, weight, transmission etc or any parts of the bike, or demonstrate operating the 3D-model of bike with simultaneous sound effects as per operated part emulating real scenario to judge performance, practicality, handling, comfort, power, ergonomics, comfort, built quality, headlight, stability etc.

Figure 6:
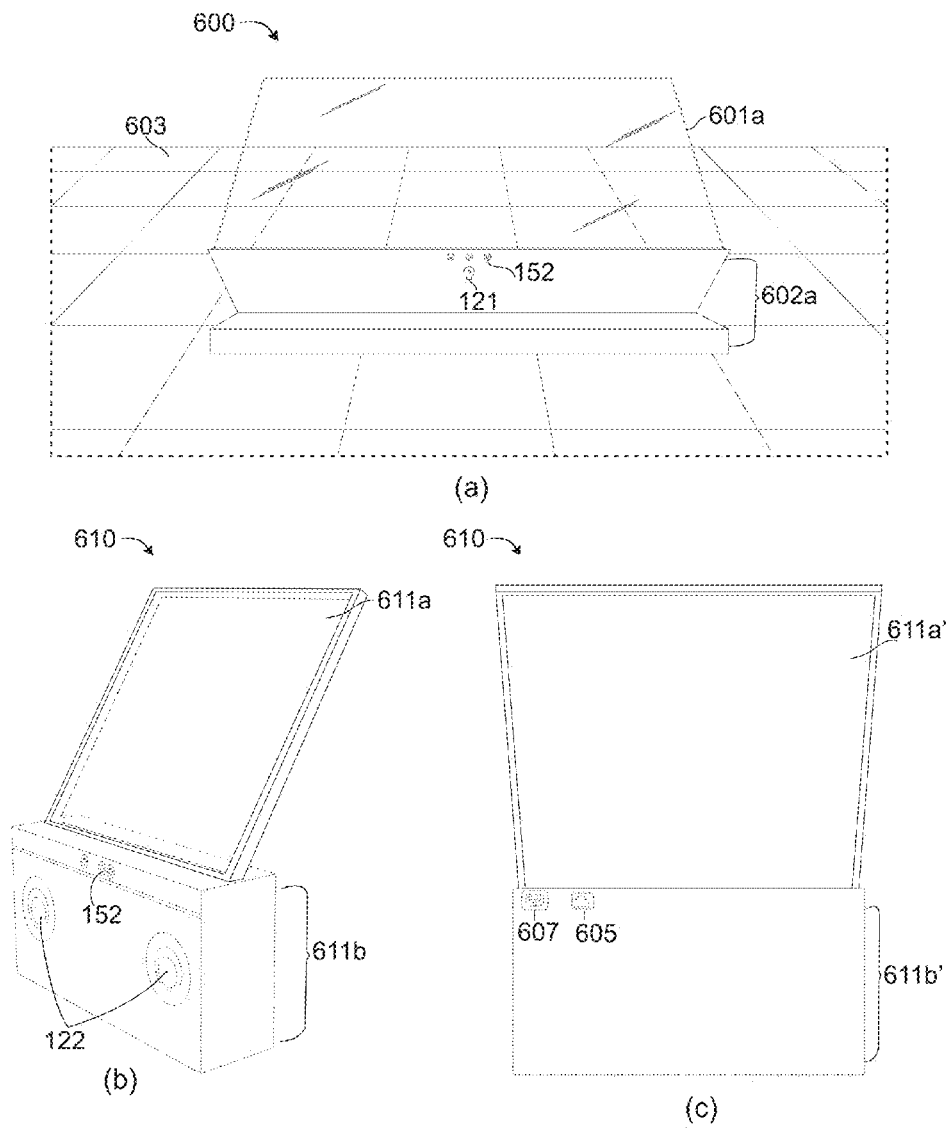
FIG. 6 illustrates, through illustration (a)-(c) examples of soft-copy display device of electronic panel system.

Now referring to FIG. 6, through illustration (a)-(c) examples of soft-copy display device of electronic panel system (600,610) is illustrated. Illustration (a) shows the inclined transparent electronic visual display (601a,611a) inclined at angle ranging from 20-75 degree, preferably 45 degree to further enhance 3D effect of scene displayed during performing user-controlled interactions. A base (602, 611b,611b') is provided housing the data processing apparatus 120. The base (602,611b,611b') can be of any size and shape depending on the object to be displayed. A floor 603 is shown visible through the inclined transparent electronic visual display 601a. A network port 607, a data connection port 605 is provided in the electronic panel system 610 as shown in illustration (c) of FIG. 6.

Figure 7:
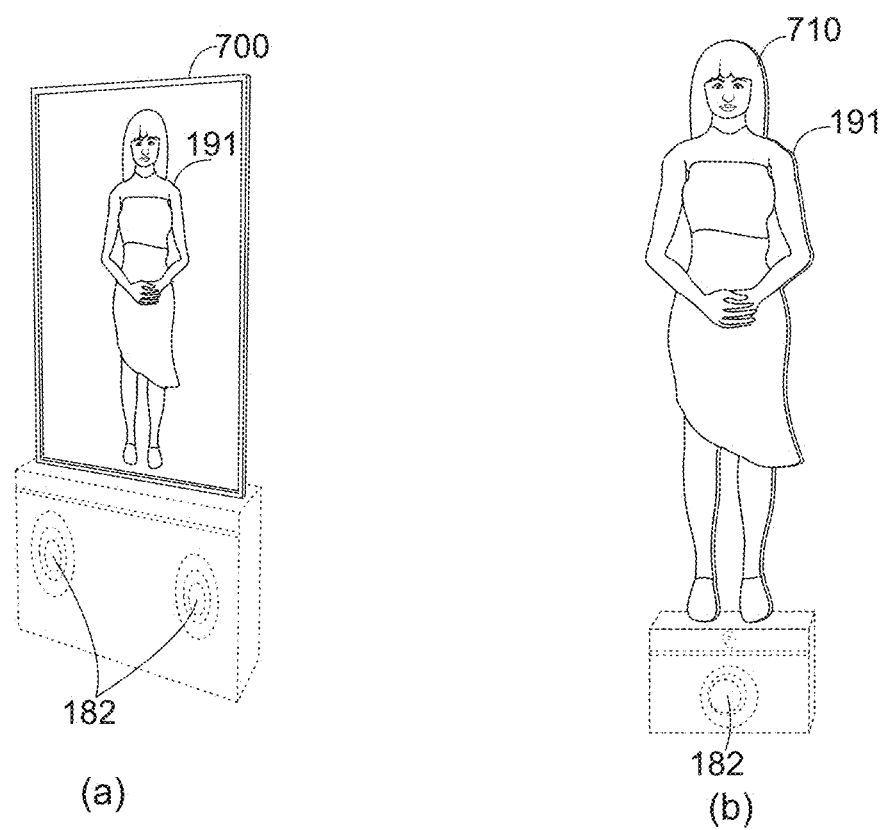
FIG. 7 illustrates, through illustration (a)-(b) examples of electronic visual display of virtual product assistant sub-system.

FIG. 7 illustrates, through illustration (a)-(b) examples of virtual product assistant sub-system 160 with some soft-copy display device (700,710) displaying virtual product assistant 191. Illustration (a) of FIG. 7 shows inclined transparent electronic visual display 700 for creating a 3D illusion of the displayed virtual product assistant 191. Illustration (b) FIG. 7 shows a cut-to shape electronic visual display 710 or cut-to-shape projection based display displaying image or video of virtual product assistant 191 for enhanced real-like visualization of displayed virtual product assistant 191. In some implementation, some body parts such as face part of the virtual product assistant can be displayed in electronic visual display or cut-to-shape projection based display while other parts can be a physical mannequin integrated with the electronic visual display.

Figure 8:
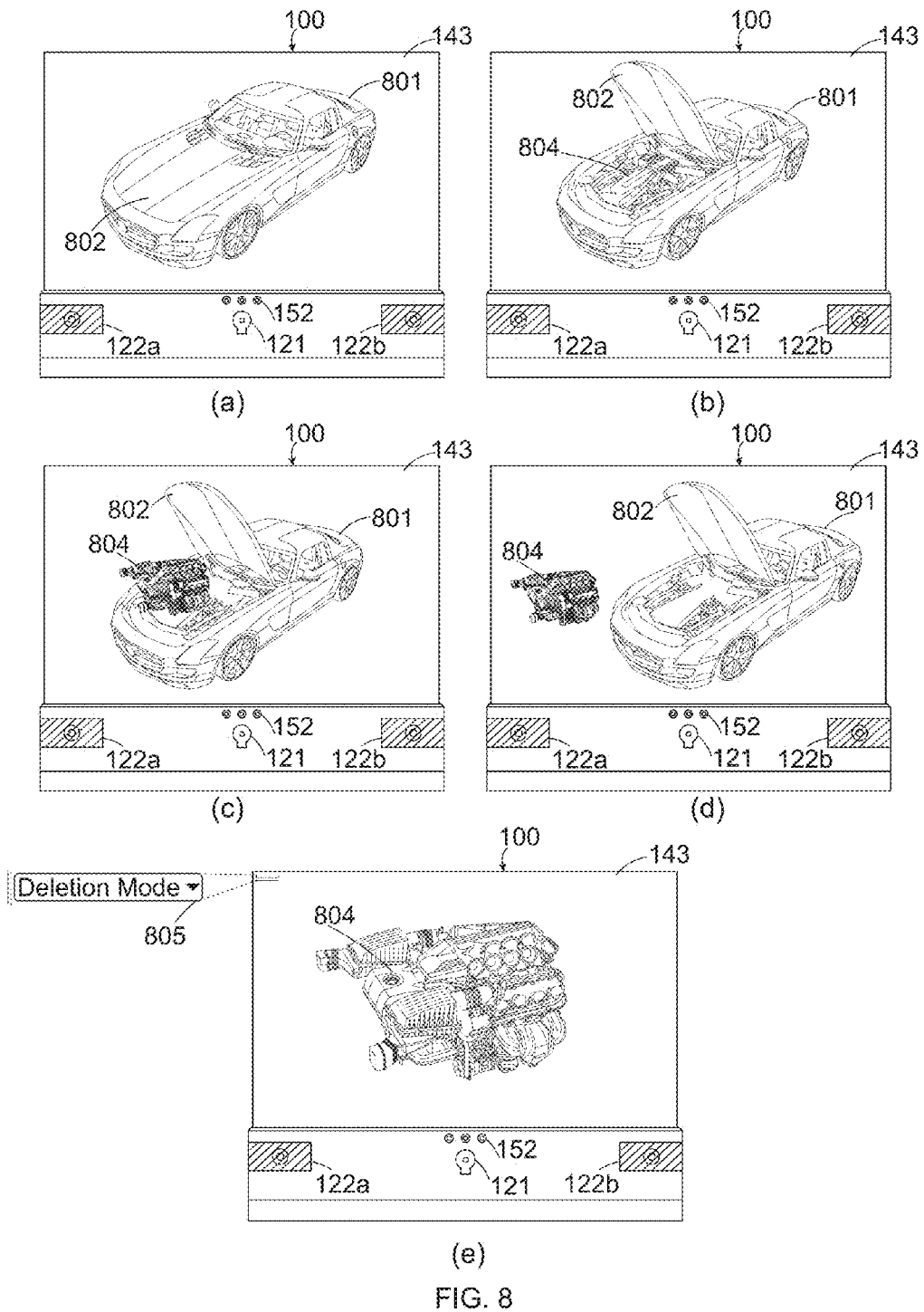
FIG. 8 illustrates, through illustration (a)-(e) real-time user interaction with external parts and internal parts of a realistic 3D model of a car in one example.

FIG. 8 illustrates, through illustration (a)-(e) real-time user interaction with external and internal parts of a realistic 3D model 801 of a car depicting an extrusive and intrusive interaction respectively in one example. Illustration (a) of FIG. 8 shows a life-size 3D model of car displayed on the soft-copy display device 110 in an electronic panel system 100. A user can provide an interaction command in the form of input on a car hood 802 for performing user-controlled interaction of opening movable external part, here the car hood 802. As per the interaction command, corresponding user-controlled interaction functionality, here extrusive and intrusive interactions module 131a of the user-controlled interaction unit 131 is invoked. A real-time rendering of corresponding interactive view of the life-size 3D model 801 with the car hood open 802 with synchronized sound output, is generated as user-controlled interaction response using 3D model data 132a, texture data 132b, audio 132c, sound producing functionality of the user-controlled interaction supporting sub-system 133, and a 3D rendering engine 134 by the user-controlled interaction unit 131. The rendered corresponding interactive view of the life-size 3D model 801 with the car hood open 802 is displayed in the interactive 3D space 143a of the Graphical user interface (GUI) 143 as shown in illustration (b) of FIG. 8. Internal parts including an engine 804 are visible after opening of the car hood. Further interaction can be performed with the last displayed corresponding interactive view of the life-size 3D model of car such as rotating the 3D model of car in 360 degree in all planes, closing back the opened car hood 802, or interacting with internal parts in an engineering disintegration interaction. A user can provide input on the car engine 804 using the touch screen 151 or a hand gesture pointing to the car engine 804, which disintegrates the car engine 804 part, also represented in 3D model, from the 3D model of car, as a real-time output in response to the interaction command provided as shown in illustration (c) of FIG. 8. The user can select the car engine and move freely in the interactive 3D space 143a as shown in illustration (d) of FIG. 8. The user can provide an input on the GUI 143 or use an intuitive hand gesture to zoom in the disintegrated car engine 804 to visualize fine details of the engine in real-time. Even on zooming, the quality of 3D model of engine part 804 is maintained and the texture displayed on the disintegrated car engine 804 does not become pixelated or blurred even in real-time rendering by the 3D rendering engine 134. The zoomed view of the disintegrated car engine 804 is shown in illustration (e) of FIG. 8. The user in an interaction can delete the entire 3D model of car 801 to visualize just the engine part 804 in isolation as per user choice. An interaction command may be provide to switch to deletion mode 805 for performing subsequent deletion interactions.

FIG. 9a, illustrates, through illustration (a)-(c) deletion interaction with a realistic 3D model 901 of a car in real-time in one example. In deletion interaction, user deletes or removes parts of 3D model to get un-interrupted view of interior or internal parts of displayed 3D model by providing an interaction command in the form of user input. A deletion mode 805 may be first selected for invoking deletion functionalities of user-controlled interaction unit 131 for performing deletion interaction to delete parts as per user input. Having different mode helps easy managing of functionalities flow on the same part of the 3D model, and provides an un-cluttered interactive 3D space 143a available for performing interaction. For example, the car hood part 802 in an input in default mode 302 gets opened as shown in illustration (b) of FIG. 8, whereas in deletion mode 805, on providing input on the same car hood part 802, the car hood is removed/deleted for un-interrupted view of interior.

Figure 22:
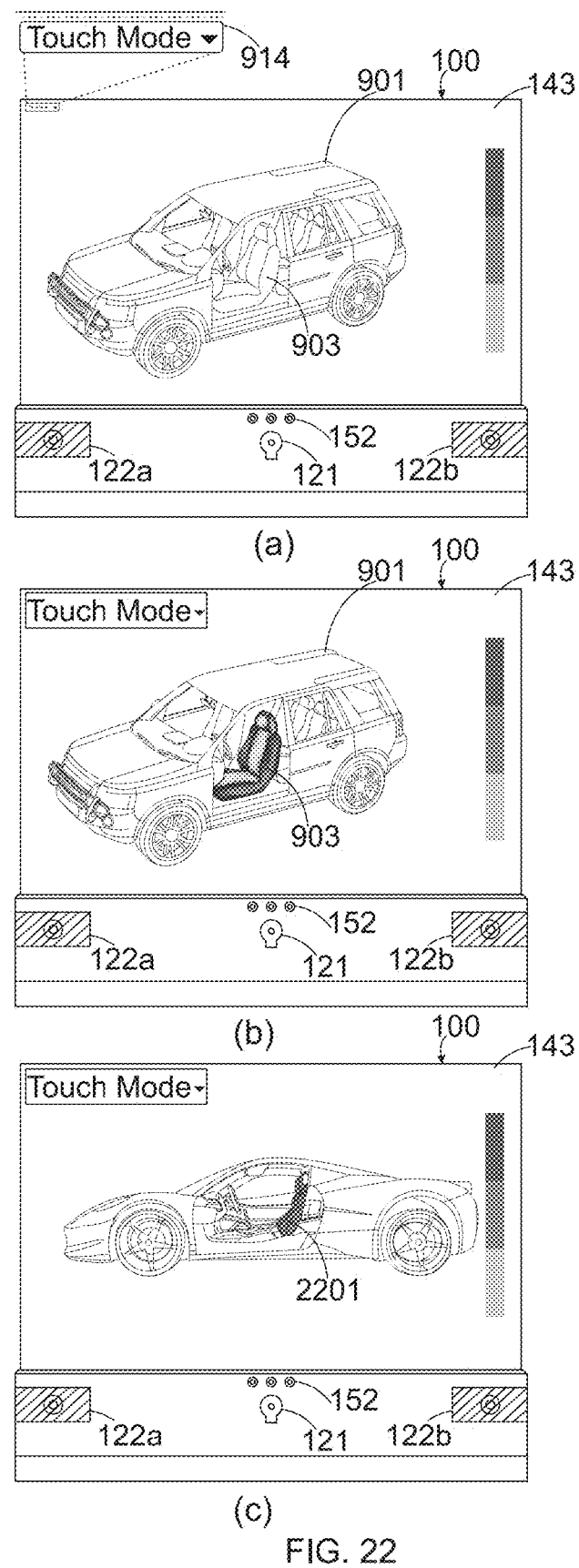
FIG. 22 illustrates, through illustrations (a)-(c) judging seat softness of a 3D model of car.

Alternatively, instead of providing view modes, any other input may be provided using the input devices 150 such as voice input or gesture input. The 3D model is controllable or interacted via host application or by direct user interaction with interactive 3D space through the input device/s. Illustration (a) shows an input provided by a user to delete parts such as a car door part 902 in the deletion mode 805, the car door part 902 get deleted, and an interior of realistic 3D model of car is displayed as shown in illustration (b) of FIG. 9a. A further input on a seat part 903 of the displayed 3D model 901, displays a corresponding view of 3D model with removed seat part as shown in illustration (c) of FIG. 9a in real-time rendering. A user desiring to know about softness of the seat part 903 can switch to touch mode 914 by selecting the touch mode 914 from the provided option in the GUI 143. The judging of seat softness of the 3D model of car 901 in touch mode 914 is illustrated, through illustrations (a)-(c) of FIG. 22, where on providing input on the seat part 903, a touch view for seat part 903 is displayed in real-time in the life-size 3D model of car 901 as shown in illustration (b) of FIG. 22. The touch view helps in ascertaining softness and hardness through colour representations making available another parameter of judgment available for comparison such as shown in illustration (d) of FIG. 22, where another seat part 2201 of different 3D model of car or car model is compared with the seat part 903 for softness property through easy visualization through colour difference at different regions of seat parts, say light colour region for soft regions and dark colour regions for hard regions. The properties of different pressure, temperature, softness or hardness are distinguished at different sub-parts of said 3D-model or entire 3D-model in different colours.

In FIG. 9b, real-time addition interaction with the realistic 3D model of a car 901, is illustrated in one example. The addition interaction makes possible attaching accessories/additional parts to displayed 3D model such that attached accessories becomes integral part of the displayed 3D model, and that all user-controlled interactions can be performed with the attached part in the interactive 3D space 143a in the GUI 143. In addition mode 911, user can select various accessories options such as car roof carriage (904, 905,906), bumper options (907,908,909) displayed in GUI 143 on the touch screen 151 and the soft-copy display device 110. In illustration (a) of FIG. 9b, when a user provides an interaction command to select car roof carriage 905, the car roof carriage 905 part gets attached to the 3D model of car 901, and becomes an integral part of it as shown in illustration (b) of FIG. 9b. A user can further provide an input for selecting any other accessories such as bumper 908, which gets attached on the 3D model of car 901 in response to the input, as shown in illustration (c) of FIG. 9b. In one embodiment, an addition mode 911 may be first selected for performing addition interaction to add or attach parts as per user input.

Figure 9D:
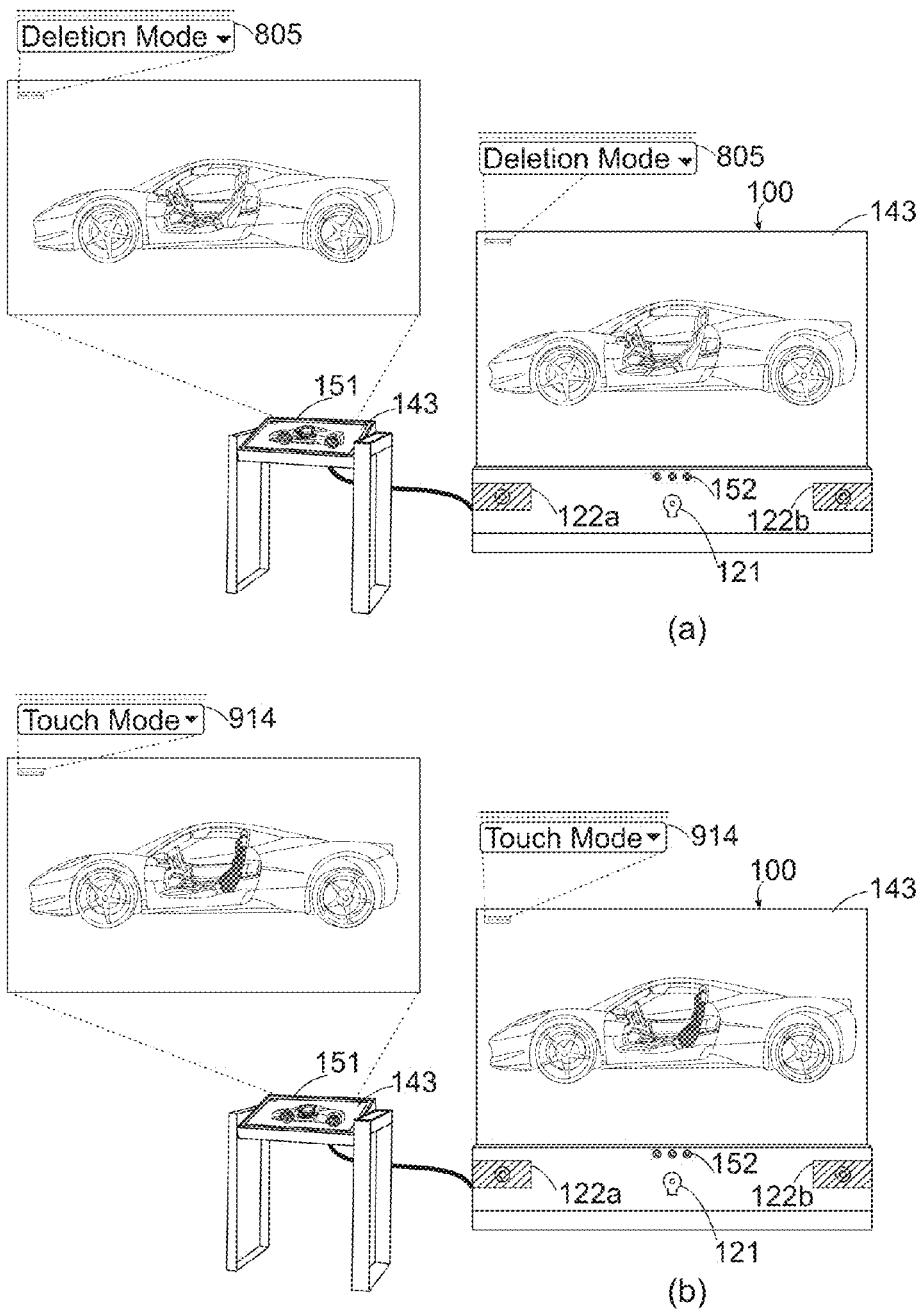
FIG. 9d illustrates, through illustration (a)-(b) deletion interaction in deletion mode and touch view through touch mode in one example.

In FIG. 9c, selection of view modes is illustrated, through illustration (a)-(b) in one example. The view modes is selected from default mode 302 for carrying out extrusive and intrusive interactions, deletion mode 805 for carrying out deletion interactions, addition mode 911 for carrying out addition interactions, temperature mode 912 for judging heating or cooling property and performing time-bound changes based interactions related to temperature, pressure mode 913 for judging operating pressure property through colour representation and performing time-bound changes based interactions related to pressure, touch mode 914 for judging softness and hardness property through colour representation and performing time-bound changes based interactions related to softness and hardness, transparency mode 915 for carrying out interaction for getting un-interrupted view of internal parts using transparency-opacity effect, disintegration mode 916 for carrying out engineering disintegration interactions by dismantling part/s from the 3D model, inter-interaction mode 917 for carrying out inter-interactions and immersive mode 918 for carrying out immersive interactions. The different view modes as mentioned above are generated using the view modes generating module 131l. Illustration (a) of FIG. 9c shows a pre-set default mode 302, where illustration (b) shows selection of deletion mode 805. Illustration (a) of FIG. 9d shows 3D model of car without door part 920 deleted from illustration (b) of FIG. 9c in selected deletion mode 805. Similarly, illustration (b) of FIG. 9d shows softness and hardness property depicted through colour representation on the seat part of the 3D model in the selected touch mode 914.

Figure 10:
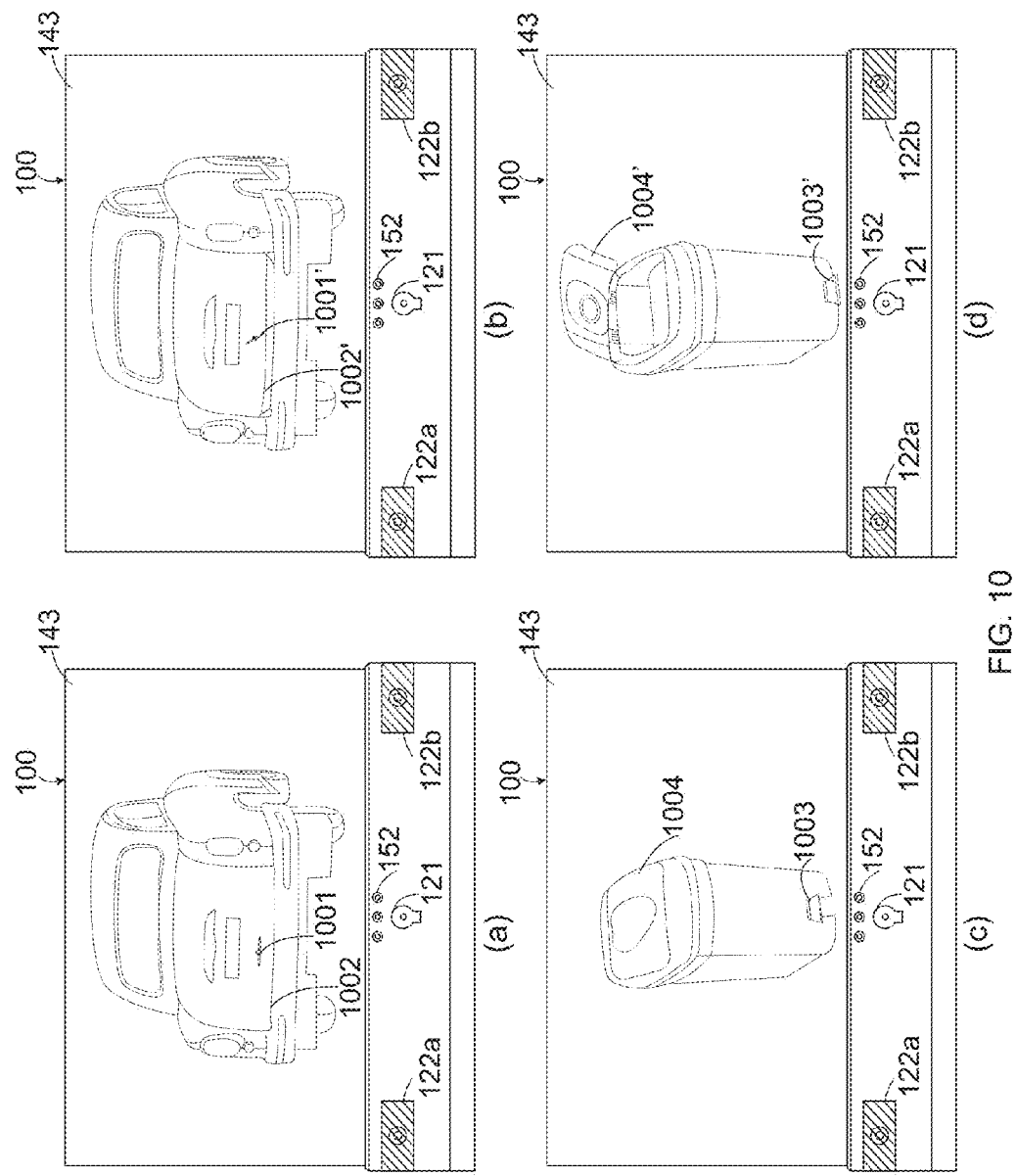
FIG. 10 illustrates, through illustration (a)-(d) examples of linked movement interaction with realistic 3D model in real-time.

In FIG. 10, examples of linked movement interaction with realistic 3D models in real-time are illustrated, through illustration (a)-(d). In illustration (a), a realistic 3D model of a car is displayed, where on providing input on a boot lid handle 1001 by turning the boot lid handle 1001 downwards 1001' in one movement, consequently a boot lid 1002 get opened in upward movement 1002' as shown in illustration (b) of FIG. 10, where the latter movement 1002' is linked to the first movement 1001'. Similarly, taking another example of a 3D model of a dustbin as shown in illustration (c) of FIG. 10, where on providing an interaction command in the form of input on a pedestal 1003 by pressing the pedestal 1003, the pedestal 1003 moves downwards 1003', where additionally the closed covering 1004 also moves upwards or gets opened 1004' consequently automatically in a linked movement interaction as shown in illustration (d) of FIG. 10.

FIG. 11, illustrates, through illustration (a)-(d) folding motion interaction showing operation of external movable parts as a further example of extrusive and intrusive interaction with a realistic 3D model of car 1101 in real-time. A user on providing input on a car roof part in closed position 1102 displayed over the interactive 3D space 143a of the GUI 143, the roof part 1102 folds 1102' in a folding motion interaction in a real-time, replicating a real scenario, as shown in illustration (b)-(d) of FIG. 11. The folds in the roof part 1102 is simulated and displayed in real-time as depicted in illustration (b) of FIG. 11. In illustration (d) of FIG. 11, a completely folded roof part 1102' of the realistic 3D model of car 1101 is shown. The simulation effect is generated using the simulation engine of the user-controlled interaction sub-system 133.

Figure 12A:
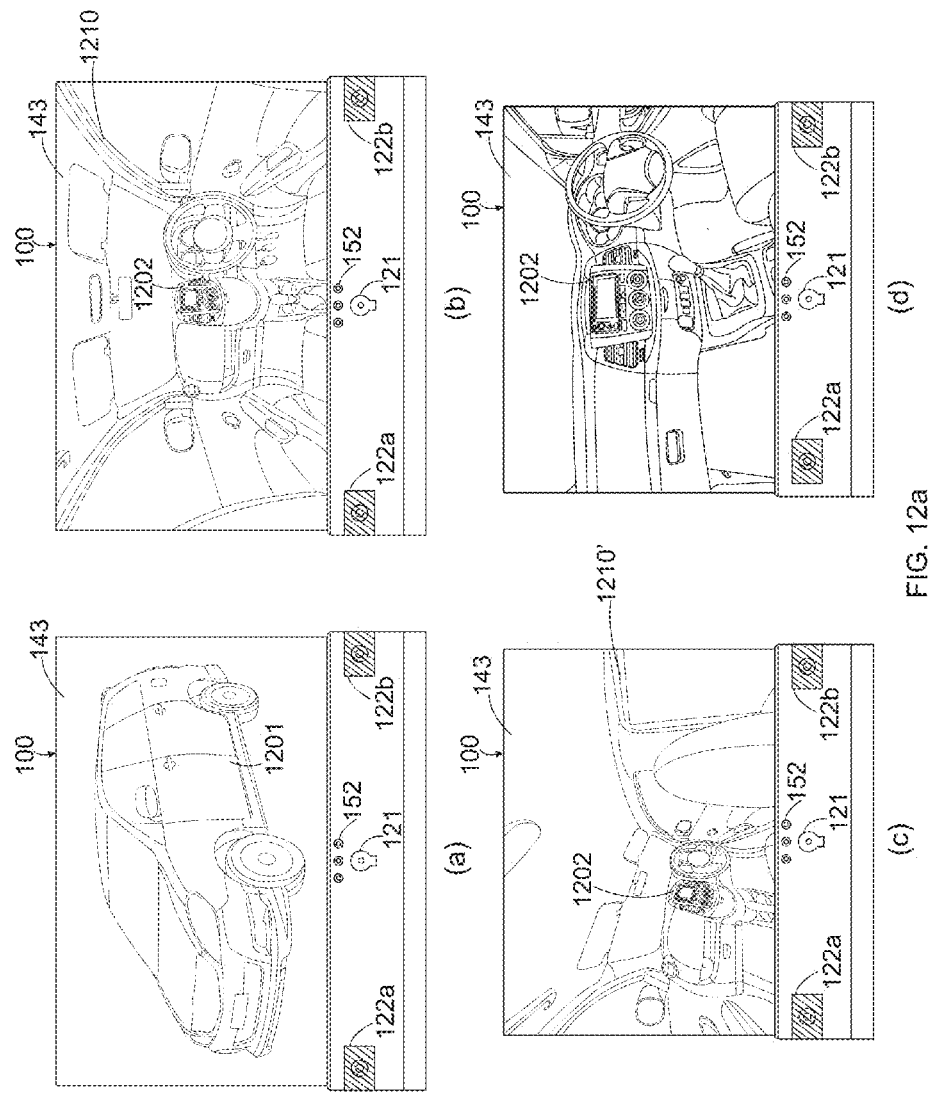
FIG. 12a illustrates, through illustration (a)-(d) an example intrusive interaction of getting interior view of a realistic 3D model of a car in real-time.

Now referring to FIG. 12a, which illustrates, through illustration (a)-(d) an example of getting interior view (1210, 1210') of a realistic 3D model of a car 1201 in real-time depicting extrusive and intrusive interactions. Illustration (a) shows an exterior view of the realistic 3D model of car 1201 displayed on the soft-copy display device 110. A user when provides an input for getting interior view, a corresponding real-looking interior view 1210 is displayed in real-time on the interactive 3D space 143a of the GUI 143, as shown (schematically) in illustration (b) of FIG. 12a. A further input can be provided to see different interior view 1210' in realistic texture of the 3D model 1201 as shown in illustration (c) of FIG. 12a. The input can be provided on the GUI 143 using one of the input devices (151,152). A user desiring to see any part in further details can zoom in by providing an input to get detailed view without any pixilation or blurring, as shown in illustration (c) and (d) of FIG. 12a, where an electronic display part, a music system 1202 is shown zoomed.

Figure 12B:
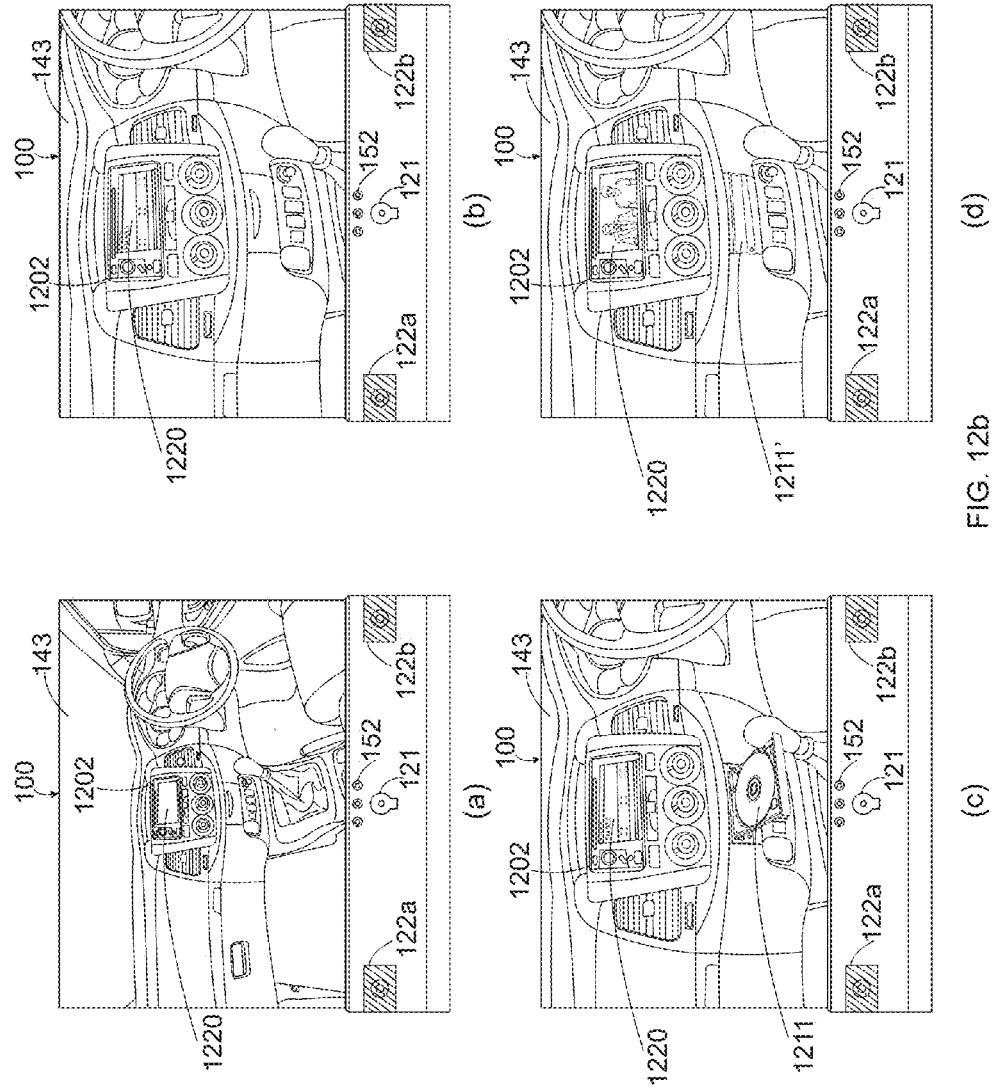
FIG. 12b illustrates, through illustration (a) zooming interaction to see detailed view of an internal part after getting interior view of the realistic 3D model of FIG. 12a, and through illustration (b)-(d) another example of intrusive interaction of checking functionalities of a music system in real-time while in zoomed state.

Zooming interaction to see detailed view of an internal part, the music system 1202 after getting interior view of the realistic 3D model 1201 of FIG. 12a is shown in illustration (a) and (b) of FIG. 12b. Illustration (b) of FIG. 12b shows further zoomed music system 1202. Another example of operating of electronic parts for checking functionalities of a music system in real-time while in zoomed state is discussed in illustrations (b)-(d) of FIG. 12b depicting example of extrusive and intrusive interactions. A user can understand functionality of the music system 1202, by operating the music system in the displayed 3D model using user-controlled interaction unit 131 in association with a virtual operating sub-system (VOS) of the user-controlled interaction sub-system 133 of the electronic panel system 100. A user on pressing an ON-button on the music system 1202, the music system 1202 starts and displays software features on a display 1220 of the music system 1202 as shown in illustration (b) of FIG. 12b replicating a real scenario as in physical cars music system. A further input on an open disk button, opens a disk loading tray 1211 in the 3D model 1201 (a mechanical movement) just like a real-set up as shown in illustration (c) of FIG. 12b. A further input to play the disk, displays a music video shown on the display 1220 of the music system 1202 as shown in illustration (d) of FIG. 12b with synchronized sound output of music through attached speakers 122a,122b in response to the provided input.

Figure 13:
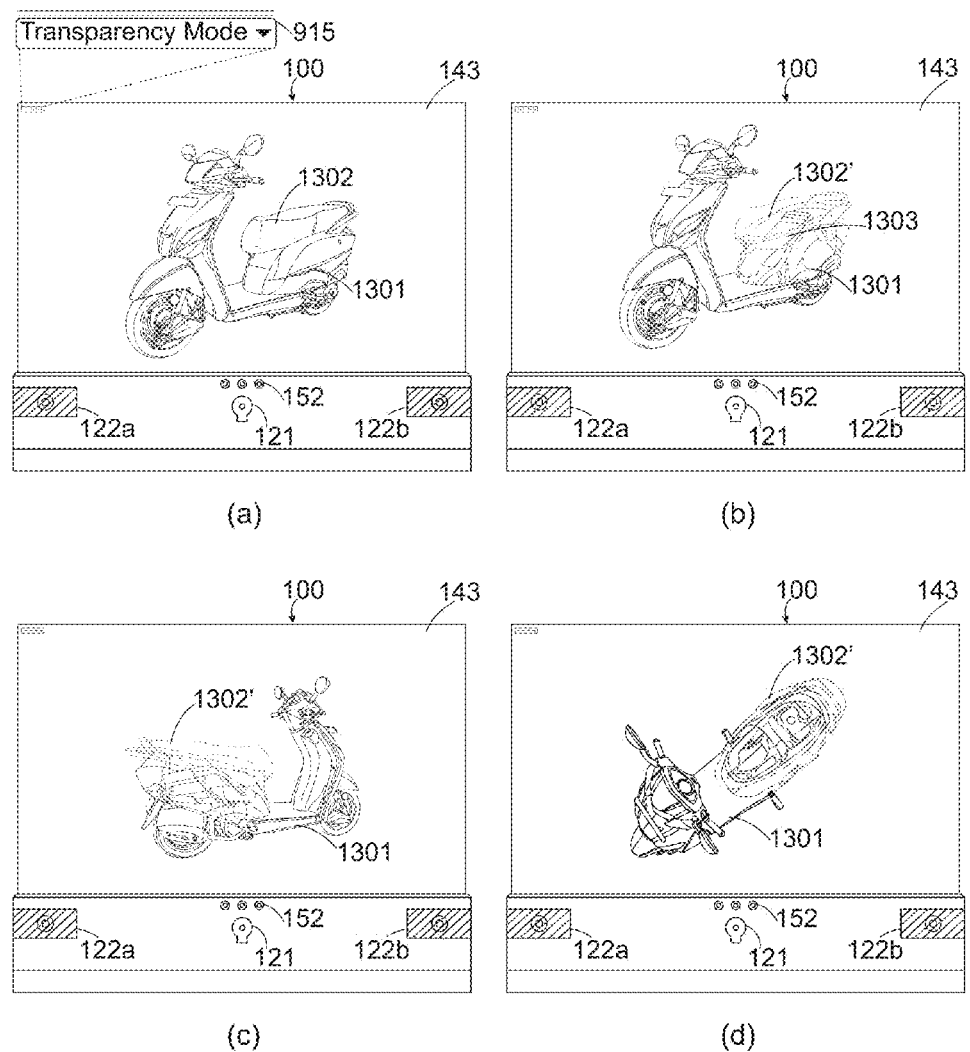
FIG. 13 illustrates, through illustration (a)-(d), interaction of un-interrupted view of inaccessible internal parts using transparency-opacity effect in an electronic panel system in one example.

Now in FIG. 13 interaction of un-interrupted view of inaccessible internal parts using transparency-opacity effect in the electronic panel system 100 of FIG. 3, is illustrated, through illustration (a)-(d) in one example. The transparency mode 915 may be first selected for invoking transparency-opacity effect functionalities/module 131g of user-controlled interaction unit 131e for performing interaction of un-interrupted view of inaccessible internal parts using transparency-opacity effect as per user input. All user-controlled interactions can be performed while the user is in transparency mode 915 such as rotating displayed 3D model in 360 degree in all planes for clear view of internal parts from different direction in realistic manner. A user in the transparency mode 915 when provides an input on a seat part 1302 of a 3D model of scooter 1301, a corresponding interactive view of the 3D model of scooter 1301 with transparent seat part 1302' and the underlying internal parts 1303 are displayed as shown in illustration (b) of FIG. 13. Alternatively, input can be provided using an option other than the view mode in the GUI 143 or via a host application for performing interaction of un-interrupted view of inaccessible internal parts using transparency-opacity effect. The user can provide further input on the displayed 3D model 1301, to rotate the 3D model 1301 to visualize parts from different field of view as shown in illustration (c) and (d) of FIG. 13, in response to the input interaction command of rotation as per user choice.

FIG. 14 illustrates, through illustration (a)-(d), immersive interactions in electronic panel system 100 in one example by a user U1 standing in front of the panel system 100 as shown in illustration (a) of FIG. 14, where in this embodiment of the panel system 100, a camera 1401 is positioned at the upper portion of a soft-copy display device 1420.

In illustration (b) of FIG. 14, a 3D-model of a treadmill 1410 in closed position P1 in a first view is displayed by the interactive 3D space 143a of the GUI 143 according to pre-set conditions, characteristics and state of the treadmill. The camera 1401 captures a video U1' of the user U1 on providing an input for performing immersive interaction, which is also displayed simultaneously near the 3D-model of the treadmill 1410. The user U1 can use bare hand gesture as shown in illustration (b) and (c) of FIG. 14 to interact with 3D-model of the treadmill 1410 to bring the treadmill in open position P2 in real-time as shown in illustration (c) of FIG. 14. Further while checking functionalities of treadmill, when a button is pressed on a treadmill console 1402 of the 3D-model of the treadmill 1410 meant for starting the 3D-model of the treadmill 1410, a belt part of the 3D-model of treadmill starts moving in response to the input (pressing of button) as in real treadmill, where the User U1 can experience the treadmill functioning by mock jogging or walking before the camera 1401, which is displayed as virtual user U1' jogging or walking over the belt part of the 3D-model of treadmill in the soft-copy display device 1420 of the panel system 100 in an immersive interaction as shown in illustration (d) of FIG. 14, in immersive mode 918 using immersive interaction module 131h of the user-controlled interaction unit 131. The movement and interaction of user with the belt part and entire 3D model 1410 emulates real physical interaction. The user can enquire about the treadmill from a virtual product assistant 1430 of the virtual product assistant sub-system 11. When a user provides an interaction command in the form of input, an updated message is simultaneously passed to the virtual-assistant sub-system 160, which makes the virtual-assistant sub-system 160 aware of the product view displayed on the soft-copy display device 1420, and accordingly the virtual product assistant 191 gets prepared to reply to potential product queries.

Figure 15:
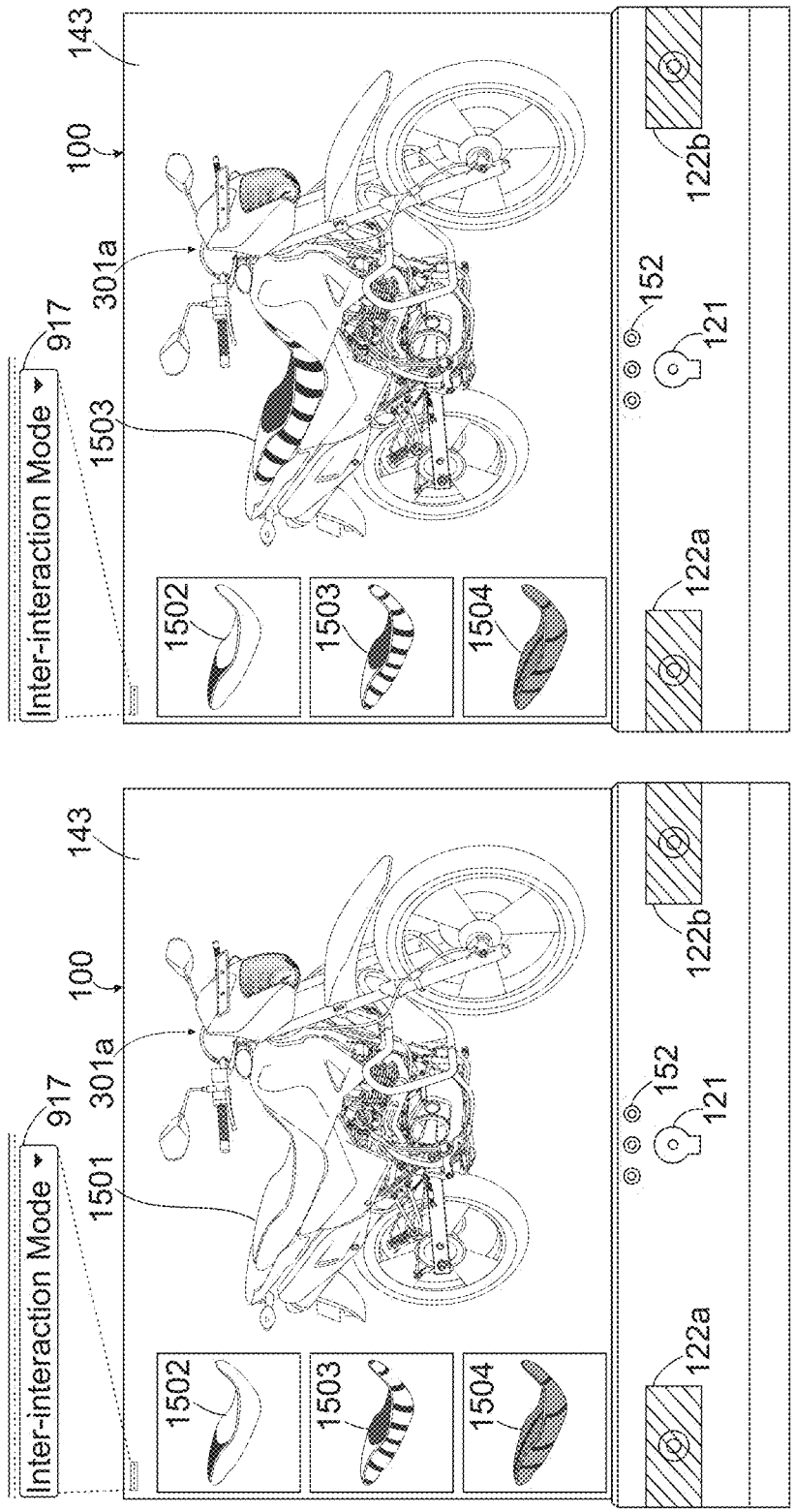
FIG. 15 illustrates inter-interactions between a seat part of life-size 3D-model of motor bike and another seat part for texture change in one example.

FIG. 15 illustrates inter-interactions between a seat part 1501 of life-size 3D-model of motor bike 301a and another seat part 1503 for texture change in one example depicting an inter-interaction. In inter-interactions user can exchange original parts of displayed 3D model with parts of different texture for visualizing aesthetics and making choices in real-time. In this example, a seating 1501 of one texture is replaced by another seating 1503 in inter-interaction mode 917 using user-controlled interaction functionality/module 131j for inter-interactions for texture change. The user can use single hand gesture to point to the chosen seating 1503 to be changed with attached seat 1501 of the 3D-model of bike 301a for 3D-model to 3D-model inter-interactions as per user's choice. In this case customized sensors of the sensor unit 152 receives interaction command as input and transmits the signal to user-controlled interactions unit 131 for identification, and further processing, where finally output is quickly displayed on the interactive 3D space 143a of the GUI 143 visible to the user on the soft-copy display device 110 of the electronic panel system 100.

Figure 21:
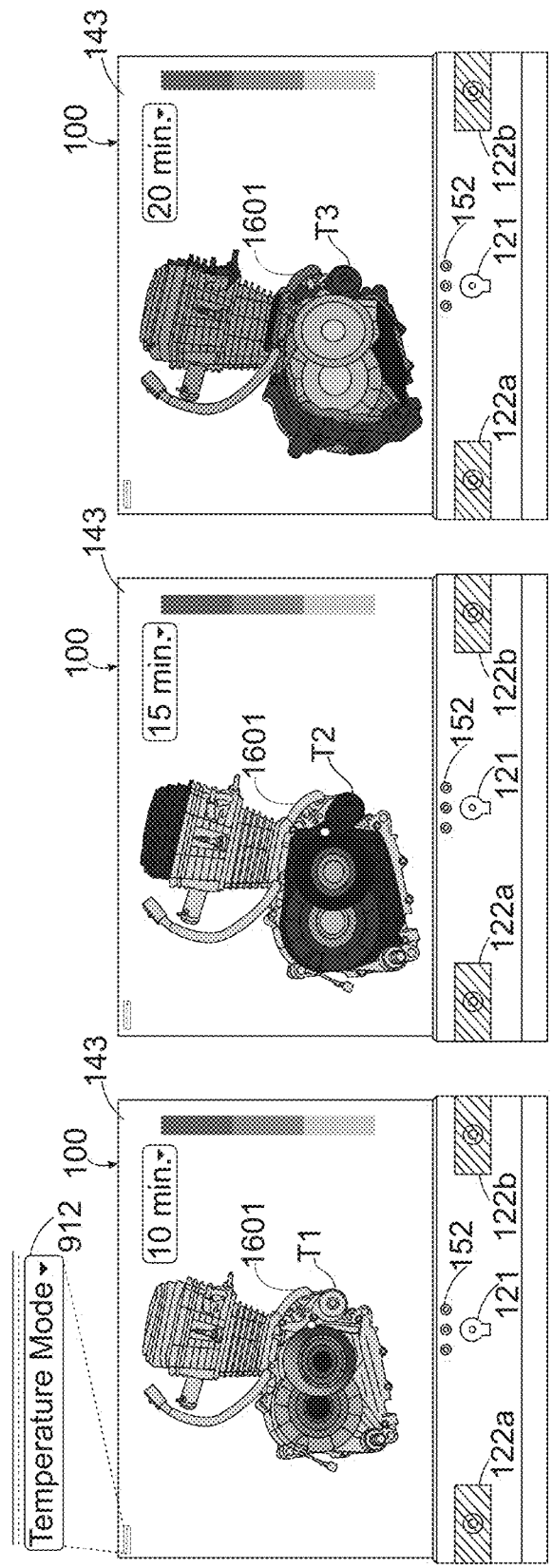
FIG. 21 illustrates temperature change in time bound changes based interaction according to one embodiment of the present invention.

In FIG. 16 an example of exploded view interaction of life-size 3D-model of motor bike 301b of FIG. 4 depicting another extrusive and intrusive interactions in the electronic panel system 100, is illustrated. The user can provide input, to visualize exploded view of the 3D model of motor bike 301b. On providing input, a corresponding user-controlled interaction response as shown in FIG. 16 is displayed in response to input in real-time. The user desiring to further gain information of displayed parts or interact with a disintegrated sub-part as per choice, such as engine part 1601. The disintegrated parts including engine part 1601 retains 3D nature and is displayed as 3D-model of engine 1601 in the interactive 3D space 143*a* of the GUI 143. The displayed disintegrated engine part 1601 can be viewed from any angle to get details by rotation in 360 in any plane/angles. Referring now to FIG. 21, the user as per desire can zoom the engine part 1601, and check temperature change in time-bound changes based interactions in a temperature view generated by selecting temperature mode 912 as shown in FIG. 21 as one example. The user can visualize heating in the displayed 3D-model of engine 1601 after certain time-intervals. A user can choose time-intervals, T1-T3, say 10-30 minutes (min.) etc to visualize corresponding real-time changes in 3D model 1601 at different regions of the engine 1601 displayed on the GUI 143 as shown in FIG. 21. The real-time changes can be displayed as colour change on the engine part 1601 with or without metrics in SI (International System of Units) in real-time in the temperature mode 912.

Figure 17:
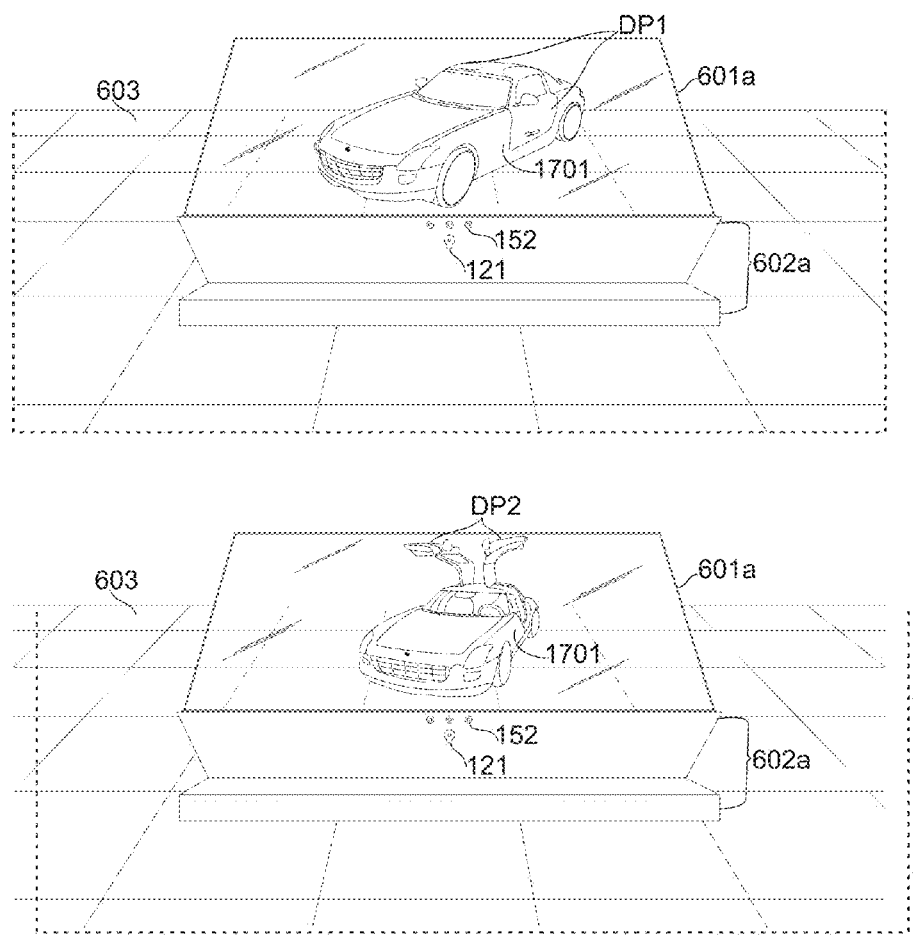
FIG. 17 illustrates an example extrusive interaction of opening of car door with a life-size realistic 3D-model of car in an electronic panel system with inclined transparent electronic visual display for enhanced 3D effect in one embodiment.
Figure 18:
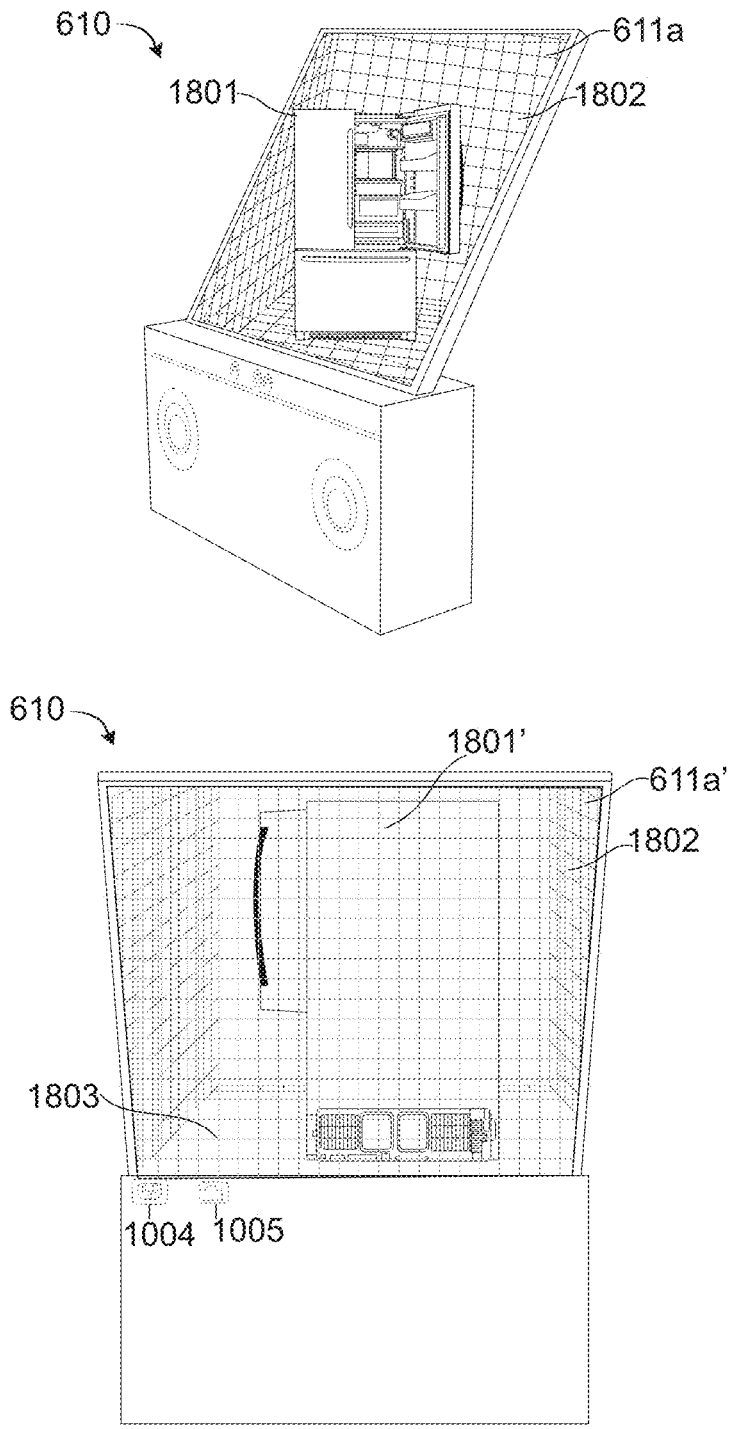
FIG. 18 illustrates a front view and rear view of an electronic panel system with inclined transparent soft-copy display device with virtual grid for enhanced 3D effect in one embodiment.

Now referring to FIG. 17, an example of extrusive and intrusive interactions of opening of car door with a life-size realistic 3D-model of car in the transparent inclined electronic visual display 601*a* of FIG. 6 for enhanced 3D effect in an alternative embodiment. The movable parts of the 3D-model of car for example doors, wheels, mirrors, car hood, boot lid etc, can be operated in user-controlled interactions using either touch screen 151, or gesture input. Side doors of the life-size 3D-model of the car is shown operated by providing input on the door part in default mode 302, where side door moves from position DP1 to position DP2. The transparent inclined electronic visual display 601*a* can be inclined at an angle ranging from 20-60 degree, preferably 45 degree for creating an enhanced 3D illusion of the displayed 3D model. FIG. 18 illustrates a front view and rear view respectively of the electronic panel system 610 with the inclined transparent electronic visual display (611*a*, 611*a'*) of FIG. 6 with virtual grid (1802,1803) displayed as background for further enhancing 3D effect in an alternative embodiment. The virtual grid (1802,1803) integrated with the GUI 143, further enhances the field of vision around displayed 3D-model of refrigerator 1801, bringing out 3D scene around the 3D-model 1801 on the electronic visual display 611*a*. The 3D model can be rotated in 360 degree in one plane with synchronized or still background or no background scene or rotated independent of background scene in 360 degree in all planes. The user-controlled interactions can be performed with the 3D model 1801 from any projected angle of the rotated view. The rear view of the inclined transparent electronic visual display 611*a'* displays rear portion of the 3D-model of refrigerator 1801. The user can go around the electronic panel system 610 with the inclined transparent electronic visual display (611*a*,611*a'*) to visualize both front side and rear side of the displayed 3D-model 1801 representing real refrigerator at the same time just like real scenario.

Figure 19:
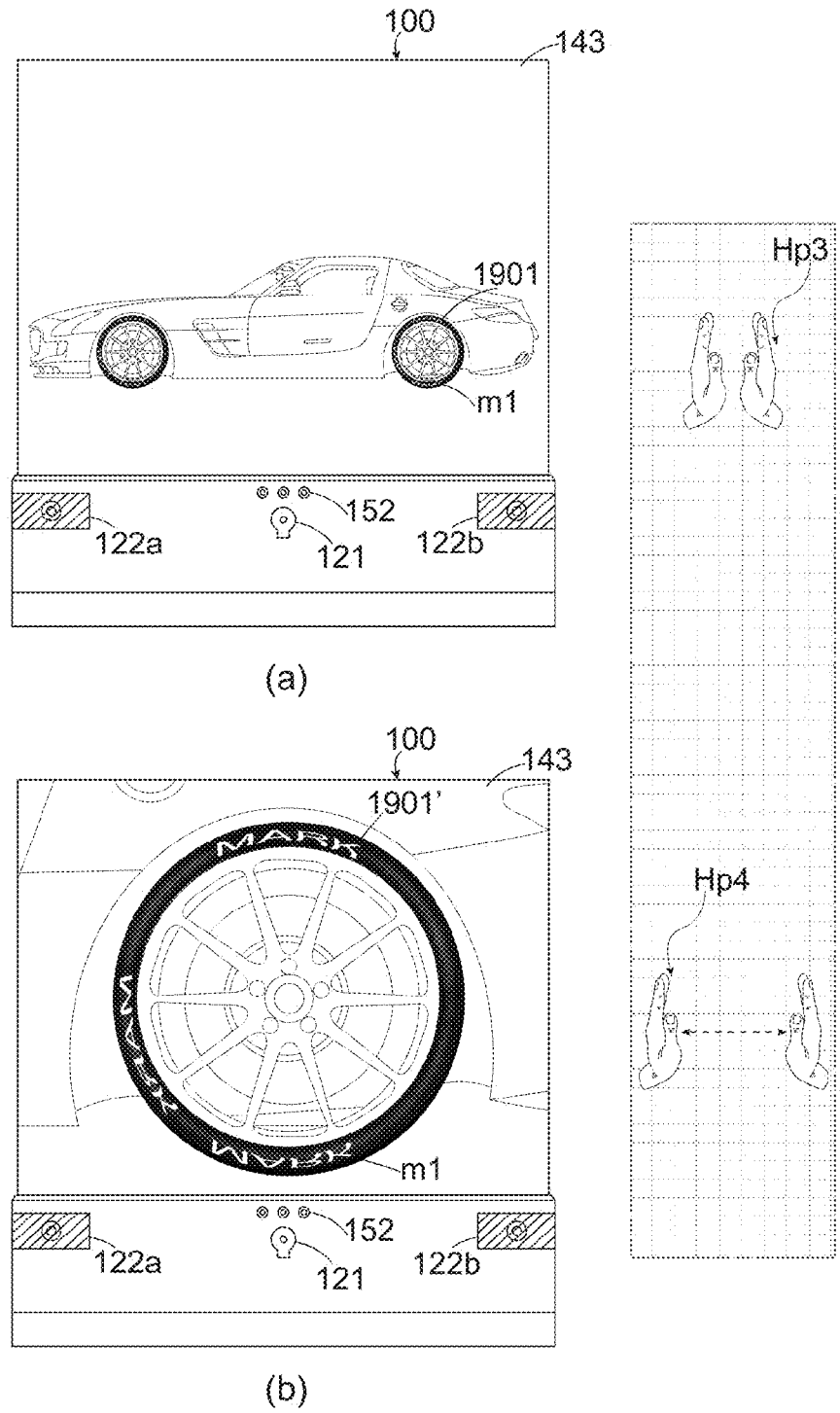
FIG. 19 illustrates, through illustrations (a)-(b) zooming interaction with a realistic 3D model representing a real car to visualize precise details using intuitive gesture command in an electronic panel system in one embodiment.

Referring now to FIG. 19, which illustrates zooming interaction with a realistic 3D model representing a real car to visualize precise details using intuitive gesture command in the electronic panel system 100. A user on providing an interaction command in the form of input for zooming in a wheel part 1901 portion of the realistic 3D model as shown in illustration (a) of FIG. 19, a corresponding view as user-controlled interaction response of zoomed portion of 3D model with wheel part 1901' is displayed in real-time, where mark regions such as text, logo, embossed marks m1 are distinctly visible without any blurring, as shown in illustration (b) of FIG. 19. The zooming in is realized when the user moves away the hands from position HP3 to position HP4, as shown in FIG. 19. The zoom out can be performed by moving the hands closer to each other HP3. The use of texture obtained from photographs and/or video aids in retaining the precise details of the mark region m1. Novel texturing methods as discussed in Patent No. 3840/DEL/2013, filed by the same applicant and inventors as of this application can be used for texturing the 3D model for retaining precise details. The 3D model displayed in—or during—each user-controlled interaction display external and/or internal surfaces of the 3D model textured using photographs and/video. The display of texture on the 3D model surfaces using photographs ranges from 10-100% of total surfaces, which corresponds to non-mono-colour surface and surfaces which show pattern or non-uniform texture on the real object.

Figure 20:
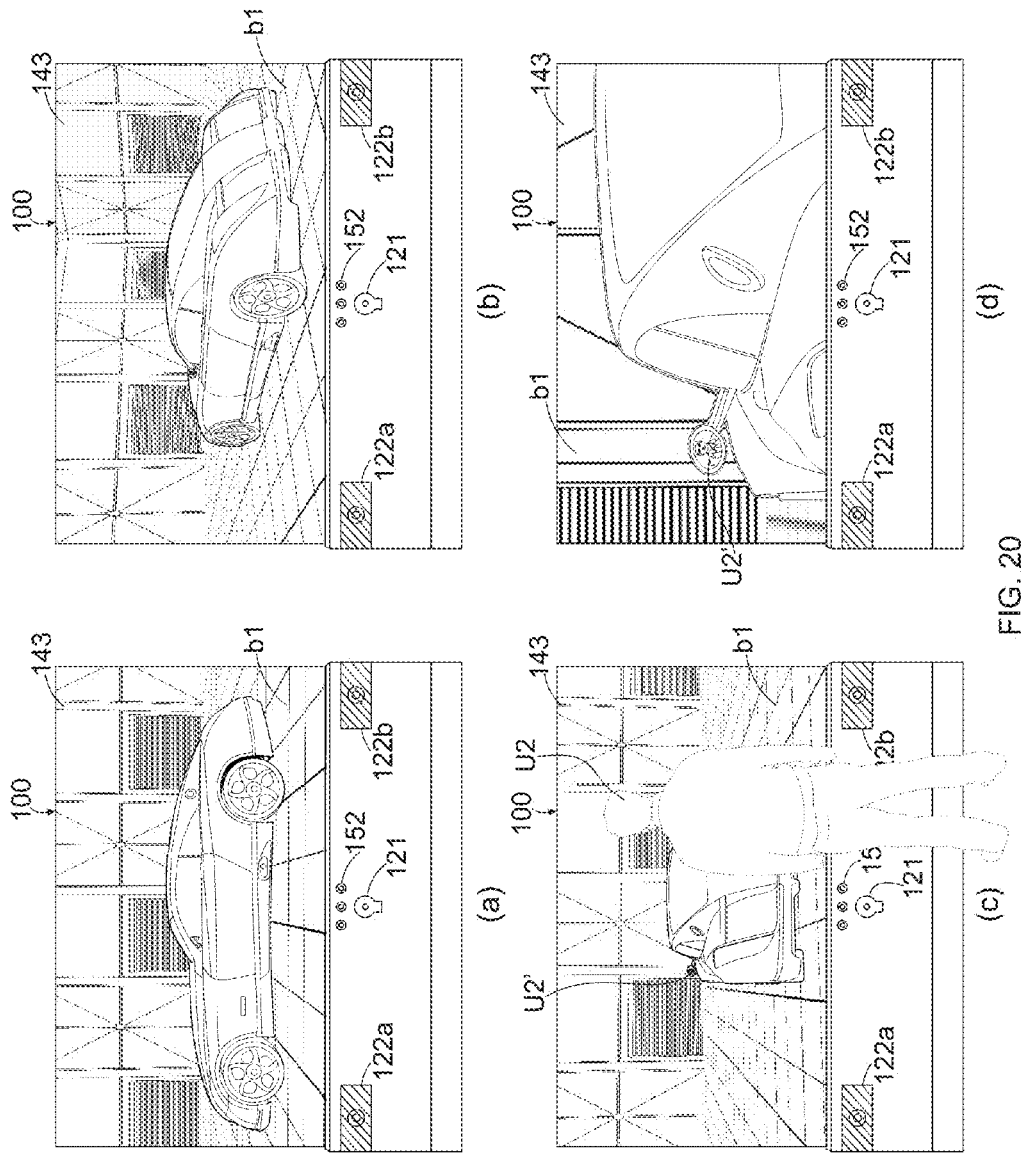
FIG. 20 illustrates, through illustrations (a)-(d) mirror effect depicting an example of environment mapping based interaction with a life-size 3D model of a car with a background scene in the electronic panel system.

FIG. 20 illustrates, through illustrations (a)-(d) mirror effect depicting an environment mapping based interaction with a life-size 3D model of a car with a synchronized background scene b1 in the electronic panel system 100 in one example. A user U2 on providing input on the GUI 143 for rotating 3D model of car with synchronized background scene b1, as shown illustrations (a)-(c), a corresponding view is displayed in real-time with real looking texture of the displayed 3D model. During the interaction for performing rotation, if any mirror portion comes in front of the user U2, a reflection U2' is automatically and instantaneously generated and displayed in the mirror portion in real-time as shown in illustration (c) of FIG. 20. The user can zoom the mirror portion providing an input for zoom-in to clearly visualize the reflection U2' as shown in illustration (d) of FIG. 20. The reflection U2' is automatically generated and displayed in real-time using video input 121*a* of the user U2 captured by the camera 121 whenever a mirror part is viewed or comes in field of view of the user U2.

Turning now to FIG. 23, another form of interactions with life-size 3D-model of the bike 301*a* using intuitive gesture in one example, is illustrated. The pressure mode 913 is first selected for invoking pressure view related interaction functionalities of user-controlled interaction unit 131 for visualizing pressure view to understand pressure required to operate movable external or internal parts. In illustration (a) of FIG. 23, pressure PR1 required to operate kick of the life-size 3D-model of bike 301*a* by an intuitive action of right leg movement from position LP1 to position LP2 mimicking action of application of kick, is shown. The intuitive action of right leg movement from position LP1 to position LP2 is interpreted by the sensor unit 152, and the input of intuitive gesture is conveyed to the user-controlled interaction unit 131 for identification and further processing of provided interaction command. The transmitting of user input 150*a* to the user-controlled interaction unit 131 takes place as explained previously in FIG. 1*c*. A corresponding interacting view of movement of kick part of the life-size 3D-model 301*a* of bike as per downwards movement of the leg in synchronized manner is displayed in one interactive 3D space 143*a* of the GUI 143. The pressure required to operate any movable sub-part of the 3D-model such as 3D-model of the bike (301*a*,301*b*), car (for operating brake clutch, kick, switch, choke etc of multi-part 3D-model is represented by texturing the movable sub-part/s of 3D-model in different colour. A SI Unit of pressure may be shown near a pressure bar 2301. Similarly, another product or object specific intuitive gesture of checking bike accelerator with synchronized sound output as in real scenario is shown in illustration (b) of FIG. 23, which is usually suitable for bikes or motorcycle only. The intuitive action of holding accelerator of bike, and moving hands from position HP5 to position HP6, and from position HP6 to position HP7, and vice-versa is interpreted by the sensor unit 152, and accordingly accelerator movement can be seen over the GUI 143 on the soft-copy display device 110 and corresponding engine sound is produced from the speakers (122a,122b). Symbols $P_0$ to $P_n$ represents low to high pressure.

Figure 24:
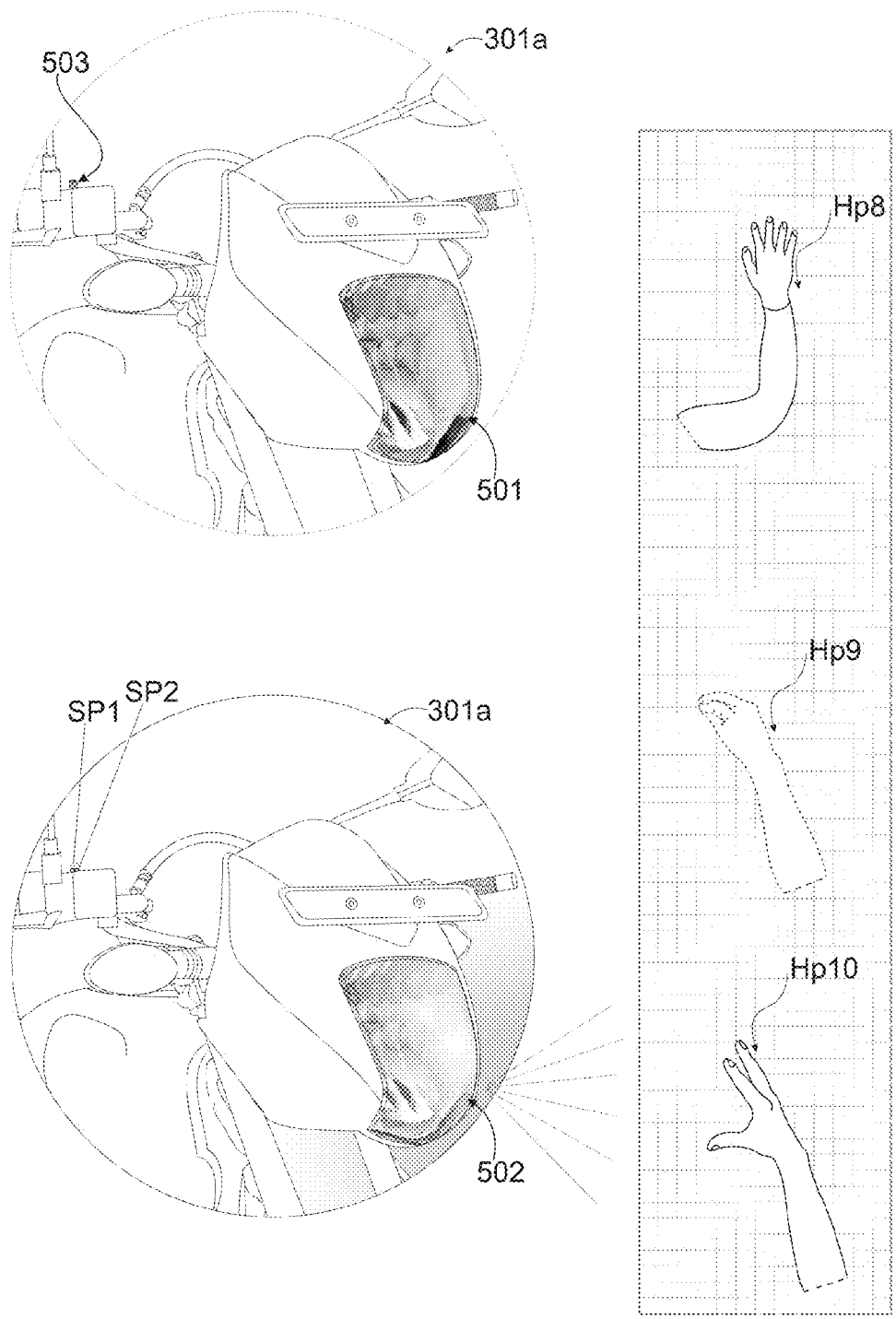
FIG. 24 illustrates in one example lighting effect in an extrusive interaction with life-size 3D-model of the bike using a bare hand intuitive lights ON/OFF gesture.

In FIG. 24, shows headlight part (501,502) of a life-size 3D-model of the bike 301a to depict lighting effect as per user choice in an extrusive interaction using single bare hand gesture input. User desiring to check lighting of head-light in off-mode 501 can provide input to perform interaction of pressing the switch 503 by pointing finger on the switch 503 to press it from position SP1 to position SP2 to turn on the head-light 502. Alternatively, an intuitive gesture, as shown in FIG. 24 to turn-on the lights 502 can also be used to turn on the lights directly without pointing to the light switch 503 as per user choice, while the 3D-model is displayed on the soft-copy display device 110 in the electronic panel system 100. Moving hands from position HP8 to position HP9, and from position HP9 to position HP10 in an intuitive gesture turn-on the lights 502, while moving back from position HP10 to position HP9 turns off the lights 501. Further, another alternative input medium is directly through a voice command to turn-on the head-light (501,502). Further, if the user desires not to speak or move his hands to turn-on the light can just press the switch 503 also shown in the touch screen 151 and simultaneously enquire about the head light (501,502) specification or any other product related information of the displayed 3D-model of the bike from the virtual product assistant 191. The use of gestures is flexible such that any gestures of single hand, both hands, fingers of hand, legs movement, or any static hand gesture without any movement can be pre-mapped to perform a particular function. Further, more than one gesture can be used to perform a user-controlled realistic interaction. Again further, as not all products are same in reality, and as one intuitive gesture for one product may not be intuitive for another product, therefore gestures can also be recognised by sensors varying from product to product to make use of the gestures an easy, more meaningful, flexible and intuitive while avoiding confusions, and decreasing any learning curve.

Figure 25:
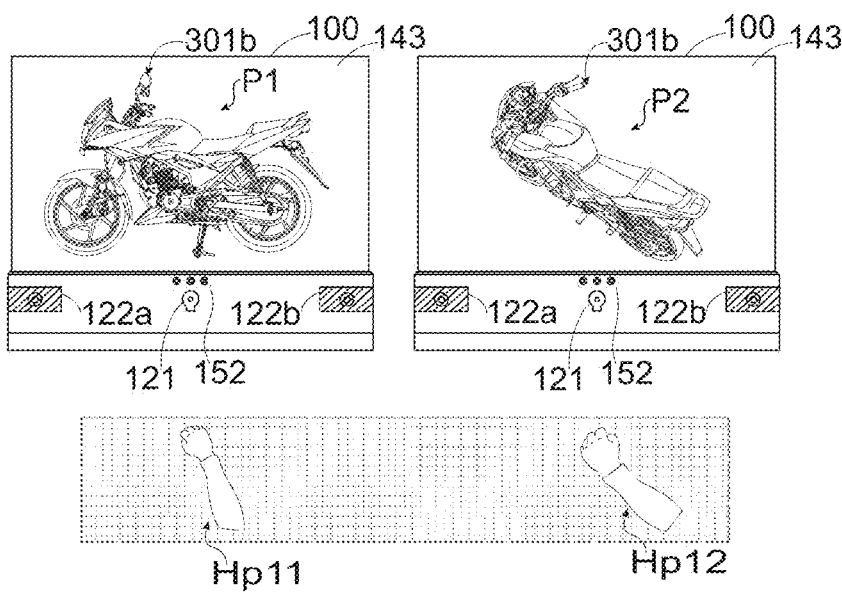
FIG. 25 illustrates another example of extrusive interaction for rotating life-size 3D-model of the bike in 360 degree in all angles using intuitive gesture.
Figure 25:
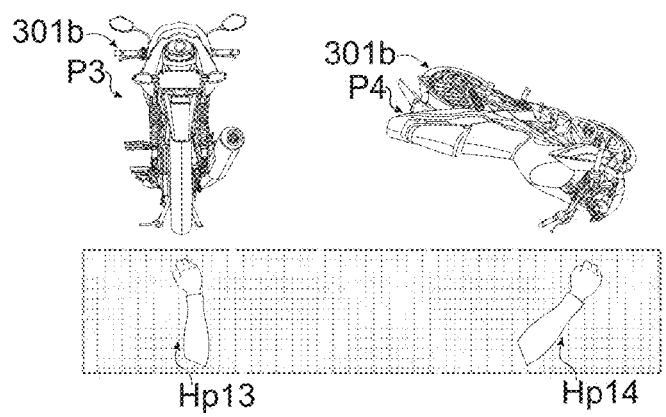
Figure 25:
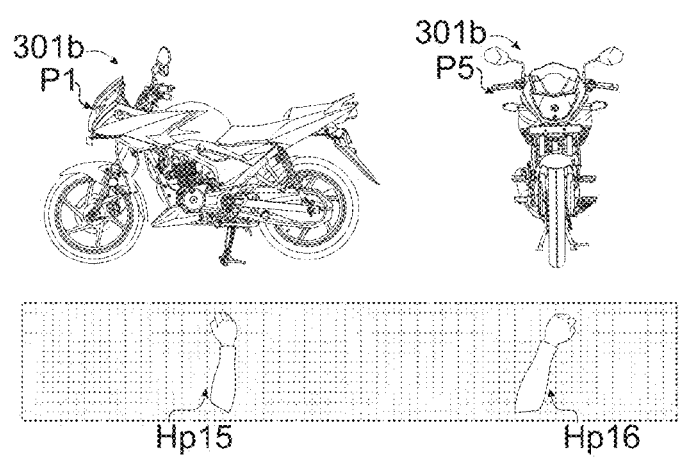

FIG. 25 illustrates another form of extrusive interaction for rotation in 360 degree in different planes with life-size 3D-model of the bike 301b using intuitive gesture in one example. A user standing in front of the electronic panel system 100 can display his hand for first recognition, and then grab control on the 3D object displayed on the soft-copy display device 110 by folding fingers of a single hand (just like pressing continuously lift click of mouse), and then moving the hand freely to rotate the 3D-model of the bike 301b in all possible angles (P1,P2,P3,P4,P5,P6) as per the hand movement (HP11,HP12,HP13,HP14,HP15,HP16) respectively. Variable gestures, that is two or more gestures for same action, multiple user-friendly user interfaces to interact with 3D model provides flexibility to user, and provides choices as user preference differs from user to user.

Figure 26:
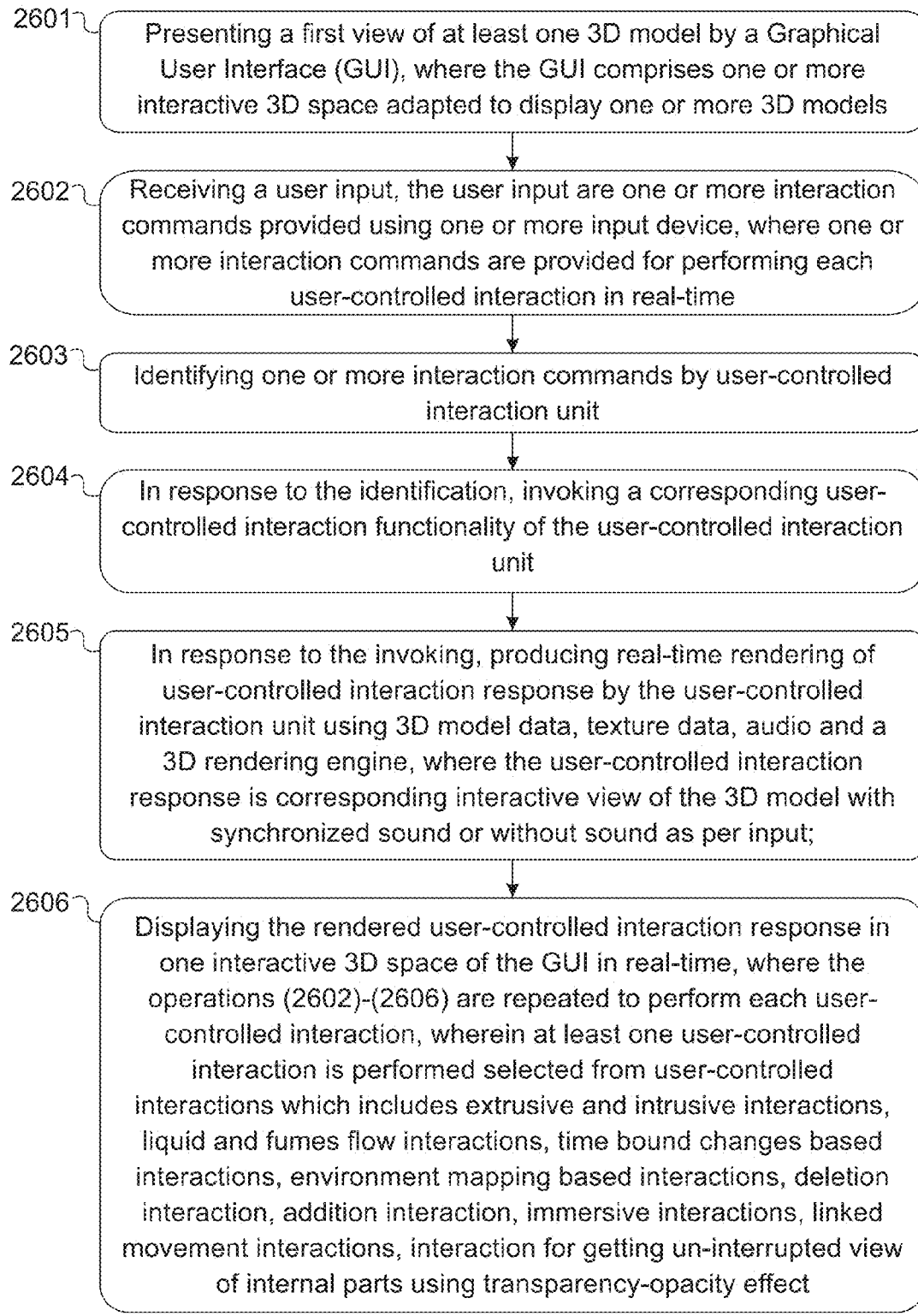
FIG. 26 illustrates a flow chart of a method for viewing and interacting with a 3D model of a real 3D object in one example.

FIG. 26 illustrates a flow chart of a method for viewing and interacting with a 3D computer model of a real 3D object in one example.

At step 2601, a first view of at least one 3D model is presented by a Graphical User Interface (GUI) 143, where the GUI 143 comprises one or more interactive 3D space 143a adapted to display one or more 3D models.

At step 2602, a user input is received. The user input is one or more interaction commands provided using one or more input device, where one or more interaction commands are provided for performing each user-controlled interaction in real-time. In one implementation, the related user-controlled interactions are grouped or categorized in separate view modes (302,805,910-918), where one or more user-controlled interactions can be performed in one mode such as performing extrusive and intrusive interactions in default mode 302 or by switching from one mode to another mode as illustrated in FIGS. 9c and 9d.

At step 2603, identifying one or more interaction commands, is carried out by user-controlled interaction unit 131.

At step 2604, in response to the identification, invoking a corresponding user-controlled interaction functionality of the user-controlled interaction unit 131 takes place.

At step 2605, in response to the invoking, real-time rendering of corresponding interactive view of the 3D model with synchronized sound output, as user-controlled interaction response is generated, using 3D model data 132a, texture data 132b, audio 132c, and a 3D rendering engine 134, by the user-controlled interaction unit 131. A user-controlled interaction support sub-system 133 is used by the user-controlled interaction unit 131 as per need for producing user-controlled interaction response. In one embodiment, one or more components or functionalities of the user-controlled interaction support sub-system 133 may be provided/coded in the user-controlled interaction unit 131.

At step 2606, the rendered user-controlled interaction response is displayed in one interactive 3D space 143a of the GUI 143 in real-time with synchronized sound output, in response to the input.

The steps 2602 to 2606 are repeated to perform each user-controlled interaction. Different interactions as given below can be grouped in particular mode. The user-controlled interactions with the 3D model can be performed from any projected angles of the 3D model during 360 rotation either in one plane or all planes. The user-controlled interactions with the 3D model can be performed with or without background environment, and if background environment is provided, the 3D model of real object is rotatable with still background scene or in synchronization to background scene. The user-controlled interaction functionalities are provided in the user-controlled interactions unit 131 for performing each user-controlled interaction. The user-controlled interactions includes extrusive and intrusive interactions, time bound changes based interactions, environment mapping based interactions, deletion interaction, addition interaction, immersive interactions, linked movement interactions, interaction for getting un-interrupted view of internal parts using transparency-opacity effect, inter-interactions, liquid and fumes flow interactions and engineering disintegration interactions. If the displayed 3D model comprises a surface which corresponds to functioning part such as light-emitting part in the real object, then a video may be used as texture on said surface such as light-emitting part surface of the 3D model to represent dynamic texture change on said surface using the texture data 132b of the database 132. This makes possible displaying lights in real-time rendering in an interaction resembling real light of vehicle lighting devices of real object.

For the purposes of this invention, and as described in this description and the appended claims, the user-controlled interactions types and the user-controlled interactions means as mentioned in the TABLE-I and TABLE-II given below.

TABLE I

User-Controlled Interactions

Figure 27:
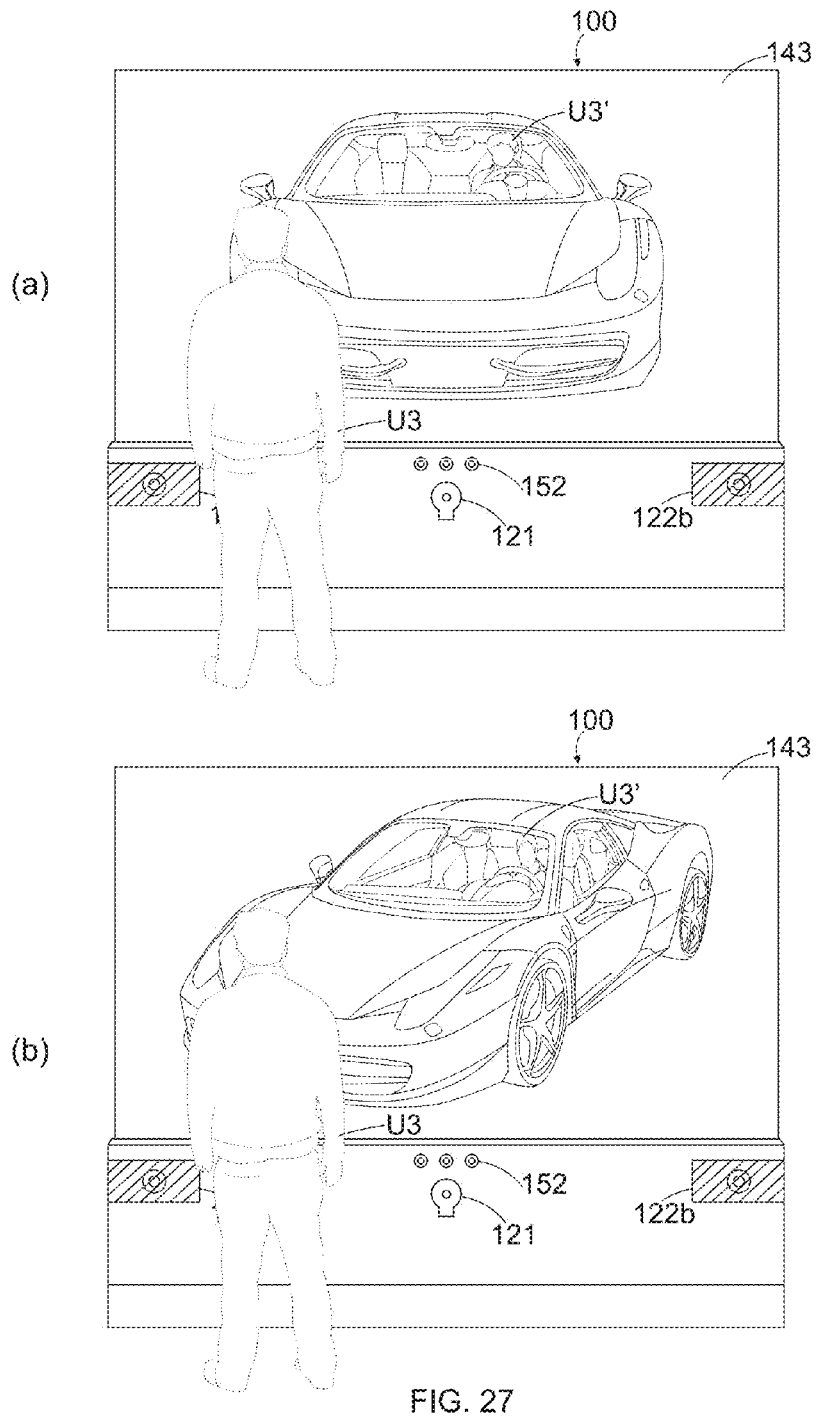
FIG. 27 illustrates another example of environment mapping based interactions with a life-size 3D model of a real car in one example.

| USER-CONTROLLED INTERACTIONS TYPE | USER-CONTROLLED INTERACTIONS |
|---|---|
| Extrusive and Intrusive Interactions | Rotating 3D model in 360 degree in all planes, where further user-controlled interactions can be performed with the 3D model from any point of view in any projected angle. For example as illustrated in FIG. 25.<br>Moving or operating external parts of 3D model of real object. This includes all types of movements such as sliding, turning, angular movement, opening or closing parts etc. in the 3D-model parts. For example as illustrated in FIG. 17.<br>Operating of electronic or digital parts of 3D-model having electronic display parts for understanding electronic or digital parts functioning such as operating a digital display changes the display in response as in reality or show/perform mechanical/hardware movement or operation according to input on digital display as in reality. For example as illustrated in FIG. 12b.<br>Lighting effects - Operating light-emitting parts of 3D-model to visualize the light-emitting parts in operative state, emitting light in a manner similar to that of real object. For example as illustrated in FIG. 24.<br>Folding motion interaction such as folding of roof of car, Airbag inflating and deflating etc. For example as illustrated in FIG. 11.<br>Interaction to view interior of the 3D model from any angle/plane as illustrated in FIG. 12a as one example.<br>Moving or operating internal parts of 3D model of real object. This includes all types of movements such as sliding, turning, angular movement, opening or closing parts etc. in the 3D-model's parts.<br>Disintegrating parts of 3D-model one by one to interact with interior and individual parts of the said 3d-model similar to disintegration as in reality such as disintegrating of mobile cover, then battery, SIM one by one in the 3D model of mobile.<br>Interaction for producing exploded view of the 3D model of real object, where disintegrated parts can also be seen from all angles/planes as illustrated in FIG. 16 in one example.<br>Interaction for zooming 3D model to view detailing such as illustrated in FIG. 19. |
| Time bound changes based interactions | Interaction for monitoring or visualizing time-bound changes observed on using or operating 3D-model or a part of the 3D-model for ascertaining object behavior after a desired duration represented by colour change in respective part after a time interval. For example as illustrated in FIG. 21 and FIG. 23. |
| Real Environment Mapping based Interactions | Interactions in which user or area in vicinity of user is captured, mapped and displayed in real-time such that 3D model displayed on the GUI 143, can be observed together with the mapped user or area in vicinity of user such as illustrated in FIG. 27 in one example.<br>Mirror effect which produces reflection of user body, body part, or live background scene in mirror part of 3D-model as illustrated in FIG. 20 in one example. |

TABLE II

User-Controlled Interactions

| USER-CONTROLLED INTERACTIONS TYPE | USER-CONTROLLED INTERACTIONS |
|---|---|
| Deletion Interactions | Removing a part from the 3D model as illustrated in FIG. 9a in one example. |
| Addition Interactions | Attaching or adding any accessory in the 3D model as illustrated in FIG. 9b in one example. |
| Immersive interactions | Interactions where users can visualize their own body performing user-controlled interactions with a 3D model on the soft-copy display device 110, which appears as if the users are interacting with real physical object as illustrated in FIG. 14. |
| Transparency-opacity effect | Interaction for getting un-interrupted view of accessible or inaccessible internal parts using transparency-opacity effect such as making some part/s transparent to view interior/internal portion through the transparent parts as illustrated in FIG. 13 in one example. |

TABLE II-continued

User-Controlled Interactions

| USER-CONTROLLED INTERACTIONS TYPE | USER-CONTROLLED INTERACTIONS |
|---|---|
| Linked-movement Interaction | When providing input for moving one part of 3D model, the part moves in response and additionally another linked part also moves consequently as in reality as illustrated in FIG. 10 in one example. |
| Inter-interactions | In inter-interactions user can exchange original parts of displayed 3D model with parts of different texture for visualizing aesthetics and making choices in real-time, as illustrated in FIG. 15 in one example. |
| Liquid And Fumes Flow Interaction | Interaction for visualizing liquid and fumes flow in the 3D model with real-like texture in real-time such as gases coming out of car exhaust pipe |
| Engineering Disintegration Interaction | Interaction to visualize a part which in reality can only be visualized by dismantling the part from the entire object such as viewing engine part by dismantling it from the 3D model of car as illustrated in FIG. 8 in one example. |

It is to be noted that during or after each user-controlled interaction mentioned above, the displayed 3D model or a 3D model's part can be viewed from any angle to get details by rotation in 360 in any plane/angles. User-controlled interaction can be performed with the 3D model/s as a standalone application or 3D model/s can be used and displayed as a component in another application. 3D model/s can be controlled and/or user-controlled interaction can be performed with the 3D model/s via host application implementing the method or interactive widgets within the interactive 3D space 143a. The surfaces of 3D model displayed during each user-controlled interaction are surfaces textured using artificial texture, images, real photographs and/or video, or their combination. Real photographs and/or video are preferably used as texture. Each with synchronized sound output, if any in reality. User-controlled interaction response in real-time is generated with synchronized sound output replicating real scenario. For example opening car door or refrigerator door in a user-controlled interaction also generates corresponding sound output in real-time. The 3D model can be displayed with or without any background scene. A background scene when displayed with the 3D model, the 3D model in a user-controlled interaction can be rotated in 360 degree in one plane with synchronized or still background, or the 3D model can be rotated independent of background scene in 360 degree in all planes. It is to be appreciated that the user-controlled interactions with a 3D model of real object reflect interactions as per characteristics, state and nature of the real object. The characteristics, state and nature of the object includes the real object properties such as single part object, multi-part object, digital or electronic devices, operation status such as object in opened state or closed state etc. By nature of the object, it means expected behaviour and the purpose of the object. One cannot expect in real setup to disintegrate a single part object or judge temperature view of seat part of car.

FIG. 27 illustrate, through illustrations (a)-(b), an example of environment mapping based interactions with a life 3D model of a real car. In illustration (a), a virtual user U3' is shown inside a 3D model of real car on the soft-copy display device 110, which appears as if the user is interacting with real car. A live video of a user U3 is captured by the camera 121, and processed by the user-controlled interactions unit 131 using the environment mapping based interactions module 131f on providing user input. A user-controlled interaction response is generated and displayed in real-time on the GUI 143 on the soft-copy display device 110 displaying the virtual user U3' inside a 3D model of real car. The user U3 can also rotate the 3D model of car, with the virtual user U3' sitting inside the 3D model of car as shown in illustration (b) of FIG. 27. Other user-controlled interactions can be performed with the virtual user U3' sitting inside the 3D model of car such as extrusive and intrusive interactions or checking music system functions as illustrated in FIG. 12b.

Figure 28:
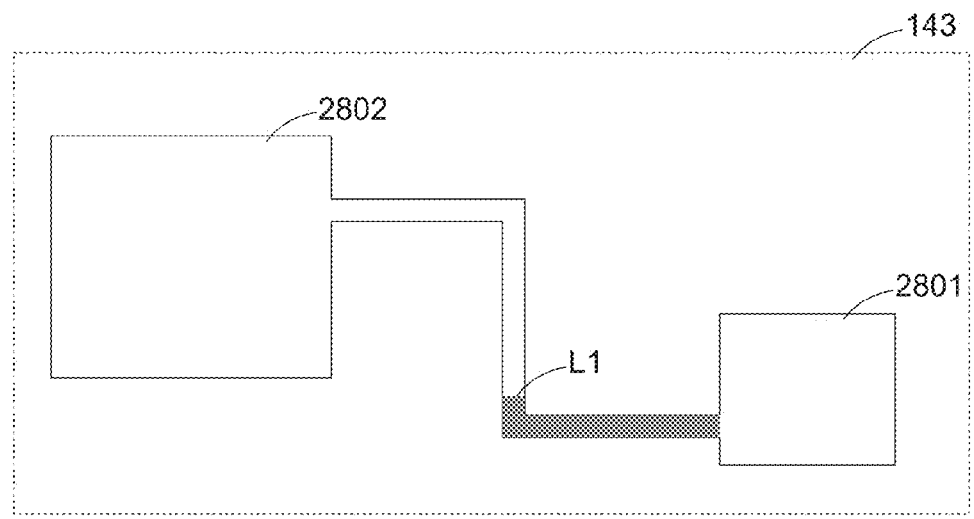
FIG. 28 illustrates in a schematic view, an example of liquid and fumes flow interaction.
Figure 28:
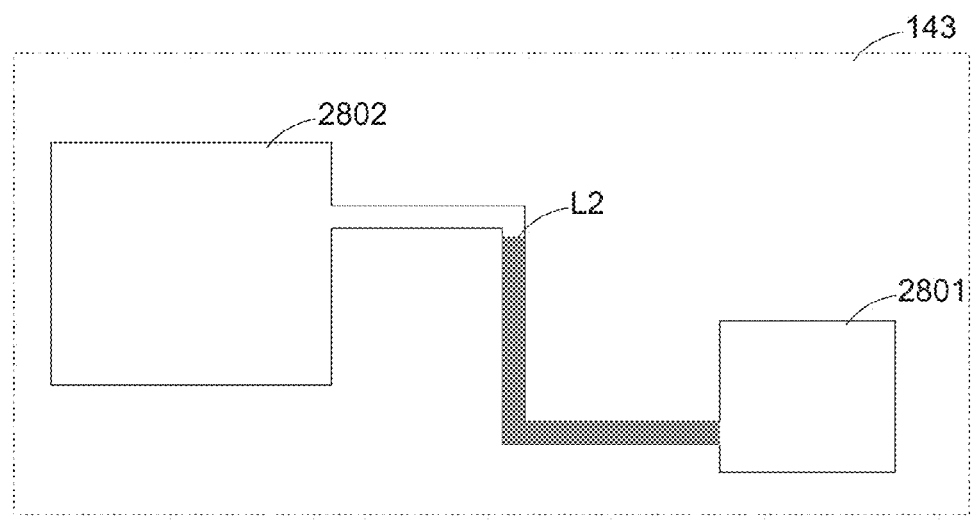

FIG. 28 illustrates, through illustrations (a)-(b) in a schematic view an example of liquid and fumes flow interaction. Illustration (a) shows fuel flow at level L1 from a fuel tank 2801 to a car engine 2802 on the GUI 143 of the electronic panel system 100. Illustration (b) shows fuel flow at level L2 from the fuel tank 2801 to the car engine 2802. The continuous fuel flow can be shown within the 3D model between the fuel tank 2801 to the car engine 2802 with real-like liquid flow in real-time by the electronic panel system 100 invoking functionality of liquid and fumes flow interactions module 131b of the user-controlled interactions unit 131. Similarly, real-like smoke can be simulated and displayed in real-time on providing user input such as smoke coming out from car exhaust pipe of the 3D model of car.

Figure 29:
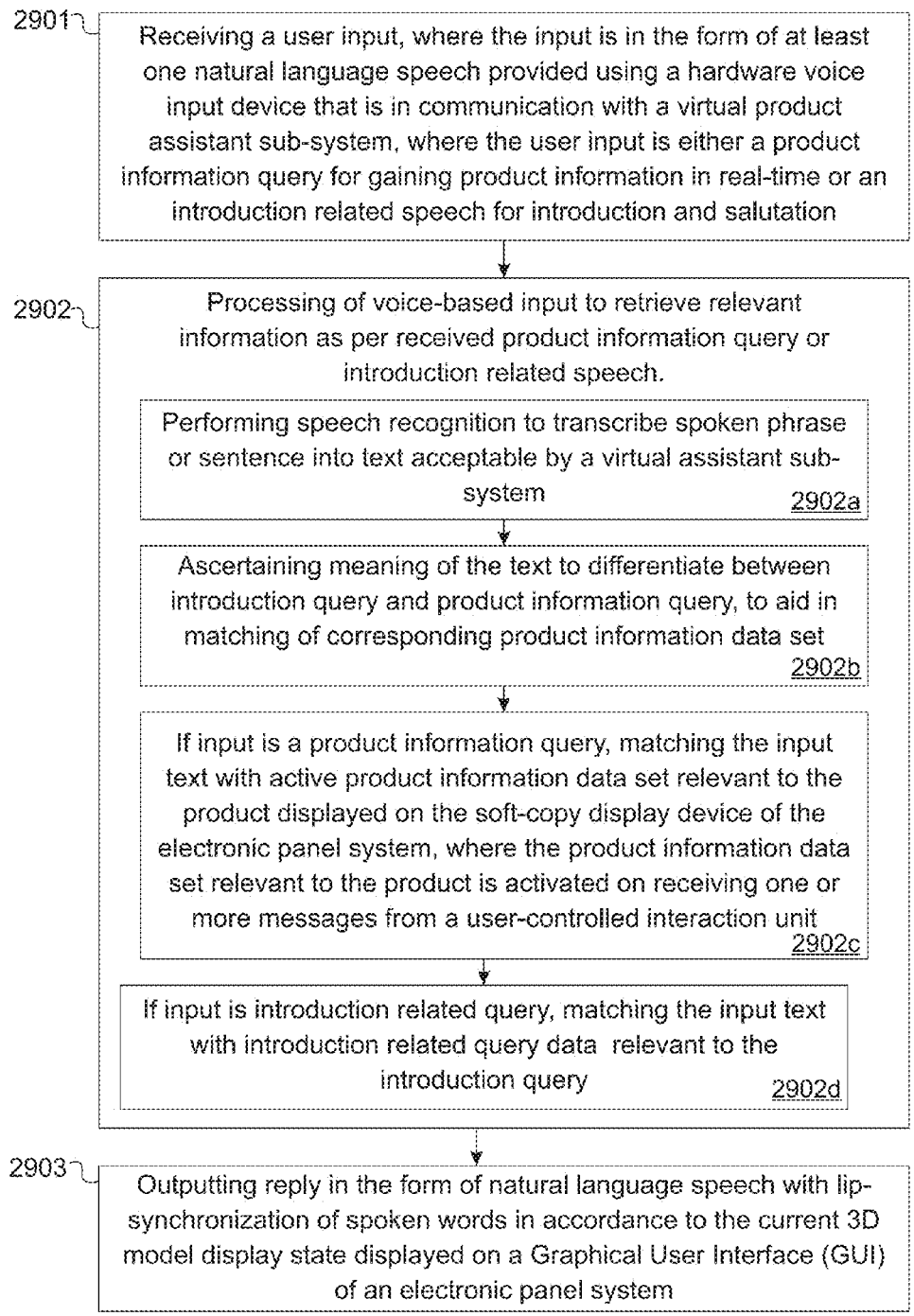
FIG. 29 illustrates a flow chart of a method for gaining product information in real-time by two-way voice-to-voice communication in natural language between a human user and a virtual product assistant according to one embodiment of the present invention.

FIG. 29 illustrates a flow chart of a method for gaining product information in real-time by two-way voice-to-voice communication in natural language between a human user and a virtual product assistant 191, where the product information is in synchronization to current 3D model representing real product displayed on the soft-copy display device 110. The operational flow or steps of the method for gaining product information may be executed by a system such as the virtual assistant sub-system 160 of FIG. 1e. Therefore, the description of the method steps may refer to one or more of the components of FIG. 1e. However, any such reference to components of FIG. 1e is for descriptive purposes only, and it is to be understood that the components of FIG. 1e are a non-limiting environment for the method of FIG. 29. At step 2901, a user input is received, where the input is in the form of at least one natural language speech provided using a hardware voice input device such as microphone 172 that is in communication with the virtual product assistant sub-system 160. The user voice input is either a product information query for gaining product information in real-time or an introduction related speech for introduction and salutation.

At step 2902, processing of voice-based input to retrieve relevant information as per received product information query or introduction related speech occurs. The processing of voice-based input involves:

performing speech recognition to transcribe spoken phrase or sentence into text acceptable by the virtual assistant sub-system 160 (step 2902*a*);

ascertaining meaning of the text to differentiate between introduction query and product information query, to aid in matching of corresponding product information data set (step 2902*b*);

if input is a product information query, matching the input text to active product information data set relevant to the product displayed on the soft-copy display device of the electronic panel system (step 2902*c*), where the product information data set relevant to the product is activated on receiving one or more messages from the user-controlled interaction unit 131 with regards to 3D model display state on the GUI 143; and if input is introduction related query, matching the input text to introduction related query data relevant to the introduction query (step 2902*d*).

At step 2903, reply is outputted in the form of natural language speech with lip-synchronization of spoken words in accordance to the current 3D model display state displayed on the GUI 143 of the electronic panel system. The lip-synchronization occurs dynamically in displayed virtual product assistant 191 using an image processor 183. The displayed virtual product assistant 191 may be an image or video or a 3D model. The output speech is customizable for pronunciation, masculine and feminine voice using a sound engine 186 during outputting reply in the form of natural language speech. Voice of different users can be understood using the voice recognition engine 185. The virtual product assistant sub-system 160 need not to be trained to recognize individual voice to decipher meaning of query asked. In one implementation, the communication may be started by the virtual product assistant 191, which can ask the user some introduction related information such as name of the user, house address, hobbies, product preferences etc. The virtual product assistant sub-system can provide all product related information such as working, durability, product features, specifications, products parts description, uses of products etc through medium of virtual product assistant speaking natural language such as English to gain active product information. The virtual product assistant can also assist to understand functionalities of the Panel system. The virtual product assistant can assist user in performing user-controlled interactions with the simulated 3D-model of the product, assist in searching, navigating through various products, in displaying of product, and aid in operating the panel system of the present invention.

It is appreciated that certain described features, structures, modules, components, units of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Any methods or processes described herein are machine-implemented or computer-implemented and are intended to be performed by specially constructed or configured machine such as the electronic panel system or the arrangement, specially configured computer, or other device and are not intended to be performed solely by humans without such machine assistance. Tangible results generated may include transformed graphics, user-controlled interaction effects or user-controlled interaction response as transformed view of 3D model with sound output, voice reply to user queries, or the arrangement or other machine-generated displays on soft-copy display devices such as computer monitors, electronic visual displays including specially designed displays, projection devices, audio-generating devices, and related media devices, and may include hardcopy printouts that are also machine-generated. Intuitive gesture control of machines is another tangible result. Although a variety of examples and other information have been used to explain various aspects within the scope of the appended claims, no limitations of the claims should be implied based on particular features or arrangement in such examples, as one ordinary skill would be able to use these examples to derive a wide variety of implementations. The present embodiments are, therefore, to be considered as merely illustrative and not restrictive, and the described features and steps are disclosed as examples of components of systems and methods that are deemed to be within the scope of the following claims.

We claim:

1. An electronic panel system for facilitating viewing and interacting with 3D computer graphics models of real objects comprising:

a soft-copy display device for displaying at least one 3D model of real object;

one or more processors;

instructions stored in a non-transitory computer readable storage medium executable by the one or more processors that upon such execution cause the one or more processors to perform operations comprising:

(a) providing a first view of at least one 3D model by a Graphical User Interface (GUI) with user-controlled interactions, using one or more processors, where the GUI comprises one or more interactive 3D space adapted to display one or more 3D models;

(b) receiving a user input, the user input are one or more interaction commands provided using one or more input device that is integrated with the electronic panel system, where one or more interaction command are provided for performing each user-controlled interaction in real-time;

(c) identifying one or more interaction commands, using one or more processors, by user-controlled interaction unit;

(d) in response to the identification, invoking a corresponding user-controlled interaction functionality of the user-controlled interaction unit, using one or more processors;

(e) in response to the invoking, producing real-time rendering of user-controlled interaction response using 3D model data and texture data, and a 3D rendering engine, using one or more processors, by the user-controlled interaction unit, where the user-controlled interaction response is corresponding interactive view of the 3D model with synchronized sound or without sound as per input;

(f) displaying the rendered user-controlled interaction response in one interactive 3D space of the GUI through the soft-copy display device in real-time, using one or more processors, in response to the input;

wherein the operations (b)-(f) are repeated to perform each user-controlled interaction;

wherein at least one user-controlled interaction is performed selected from user-controlled interactions which includes extrusive and intrusive interactions, liquid and fumes flow interactions, time bound changes based interactions, environment mapping based interactions, deletion interaction, addition interaction, immersive interactions, linked movement interactions, interaction for getting un-interrupted view of internal parts using transparency-opacity effect, inter-interactions, and engineering disintegration interactions; and
wherein the displayed rendered user-controlled interaction response is output result displaying effect of each performed user-controlled interaction according to the interaction command provided in the form of input.

2. The electronic panel system as claimed in claim 1, further comprising a camera for capturing video or image input for immersive interactions and environment mapping based interactions.

3. The electronic panel system as claimed in claim 1, further comprising one or more sound output devices for providing synchronized sound output during display of the rendered user-controlled interaction response.

4. The electronic panel system as claimed in claim 1, wherein the 3D model displayed is of variable size, preferably a life-size or near life-size 3D-model.

5. The electronic panel system as claimed in claim 1, wherein the soft-copy display device is selected from an electronic visual display, a see through display, a wearable display or a projection based display including holographic display.

6. The electronic panel system as claimed in claim 5, wherein the electronic visual display is one of: a non-inclined electronic visual display or an inclined transparent electronic visual display.

7. The electronic panel system as claimed in claim 6, wherein the inclined transparent electronic visual display is inclined at angle ranging from 20-75 degree, preferably 45 degree.

8. The electronic panel system as claimed in claim 1, wherein the input device includes either a touch screen, a sensor unit configured for receiving gesture input commands for performing user-controlled interactions, a touch sensitive electronic display, a voice input device, a pointing device, a keyboard or their combination.

9. The electronic panel system as claimed in claim 8, wherein the sensor unit is one of: an infrared-based sensor unit, a voice-based sensor unit for voice input or a camera-based sensor unit, or their combination.

10. The electronic panel system as claimed in claim 1, wherein in the operation (b) of receiving the user input for performing user-controlled interactions, each user-controlled interaction is directly performed with one or a set of interaction commands.

11. The electronic panel system as claimed in claim 1, wherein in the operation (b) of receiving the user input for performing user-controlled interactions, the related user-controlled interactions are grouped or categorized in separate view modes, where one or more user-controlled interactions is performed in one mode or by switching to another mode.

12. The electronic panel system as claimed in claim 1, wherein the 3D model is optionally a standalone application or a component in another or separate third-party application.

13. The electronic panel system as claimed in claim 1, the 3D model is controllable or interacted via host application or by direct user interaction with interactive 3D space through the input device/s.

14. The electronic panel system as claimed in claim 1, wherein the user-controlled interactions unit includes a extrusive interaction and intrusive interactions module for performing extrusive and intrusive interactions, a liquid and fumes flow interactions module for performing liquid and fumes flow interactions, an addition interaction module for performing addition interactions, a deletion interaction module for performing deletion interactions, a time-bound changes based interaction module for performing time-bound changes based interactions, an environment mapping based interaction module for performing environment mapping based interactions, a transparency-opacity effect module for performing interaction for getting un-interrupted view of internal parts using transparency-opacity effect, an immersive interaction module for performing immersive interactions, a linked movement interaction module for performing linked movement interactions, an inter-interaction module for performing inter-interactions, and an engineering disintegration interactions module for performing engineering disintegration interactions with the displayed 3D model.

15. The electronic panel system as claimed in claim 1, wherein the user-controlled interaction unit includes optionally a view modes generation module for generating display of the view modes.

16. The electronic panel system as claimed in claim 1, wherein in the operation (e) of producing real-time rendering of user-controlled interaction response, a user-controlled interaction support sub-system is used by the user-controlled interaction unit as per need for producing user-controlled interaction response, where the user-controlled interaction support sub-system includes functionalities for:
  producing sound as per user-controlled interaction;
  animation of the virtual product assistant when the virtual product assistant is displayed in the GUI using the 3D-rendering engine, or animation of one or more parts in the 3D model;
  providing functionality of operation of electronic or digital parts in the displayed 3D-model/s depending on the characteristics, state and nature of displayed object;
  decision making and prioritizing user-controlled interactions response;
  putting more than one 3D object/model in scene;
  generating surrounding or terrain around the 3D model;
  generating effect of dynamic lighting on the 3D model;
  providing visual effects of colour shades; and
  generating real-time simulation effect;
  where one or more components or functionalities of the user-controlled interaction support sub-system is optionally provided in the user-controlled interaction unit.

17. The electronic panel system as claimed in claim 1, wherein the displayed 3D model of the real 3D object is a 3D computer graphics model textured using real photographs and/or video.

18. The electronic panel system as claimed in claim 1, wherein the displayed 3D model of the real 3D object is a 3D computer graphics model textured using colour texture, images, preferably photographs and/or video, or their combination.

19. The electronic panel system as claimed in claim 1, wherein the 3D model displayed in- or during- each user-controlled interaction display external and/or internal surfaces of the 3D model textured using photographs and/or video, where the display of texture on the 3D model surfaces using photographs ranges from 10-100% of total surfaces, which corresponds to non-mono-colour surface and surfaces which show pattern or non-uniform texture on the real object.

20. The electronic panel system as claimed in claim 1, wherein the user-controlled interactions unit, the 3D-rendering engine, the user-controlled interaction support subsystem are executable on single computer or multiple computer, or computing systems having more than one computers connected through network.

21. The electronic panel system as claimed in claim 1, wherein if the displayed 3D model comprises a surface which corresponds to functioning part in the real object, then a video is usable as texture on said surface to represent dynamic texture change on said surface.

22. The electronic panel system as claimed in claim 1, wherein if the displayed 3D model comprises a surface which corresponds to a light-emitting part in the real object, then a video is used as texture on said light-emitting part surface of the 3D model to represent lighting as dynamic texture change.

23. An arrangement for facilitating viewing and real-time user-controlled interactions with a 3D computer graphics model representing a physical object, and for facilitating real-time two-way voice communication between a human user and a virtual product assistant for receiving product information, the arrangement comprising:

a first soft-copy display device for displaying at least one 3D model of real object;
one or more processors;
a camera for capturing video or image input;
instructions stored in a non-transitory computer readable storage medium executable by the one or more processors that upon such execution cause the one or more processors to perform operations comprising:
(a) providing a first view of at least one 3D model by a Graphical User Interface (GUI) with one or more user-controlled interactions, using one or more processors, where the GUI comprises one or more interactive 3D space adapted to display one or more 3D models, where a first message related to the presented first view is simultaneously passed to a virtual product assistant unit of the virtual product assistant sub-system;
(b) receiving a user input, the user input are one or more interaction commands provided using one or more input device that is integrated with the electronic panel system, where one or more interaction commands are provided for performing each user-controlled interaction in real-time, and where an updated message related to provided input is passed to the virtual product assistant unit on providing each interaction command by the user;
(c) identifying one or more interaction commands, using one or more processors, by user-controlled interaction unit;
(d) in response to the identification, invoking a corresponding user-controlled interaction functionality of the user-controlled interaction unit, using one or more processors;
(e) in response to the invoking, producing real-time rendering of user-controlled interaction response using 3D model data, and texture data and a 3D rendering engine, using one or more processors, by the user-controlled interaction unit, where the user-controlled interaction response comprises corresponding interactive view of the 3D model with synchronized sound or without sound as per the input;
(f) displaying the rendered user-controlled interaction response in one interactive 3D space of the GUI through the soft-copy display device in real-time, using one or more processors, in response to the user input;

wherein the operations (b)-(f) are repeated to perform each user-controlled interaction, and sending consequent updated messages by the user-controlled interaction unit to the virtual product assistant unit on providing each interaction command by the user;
wherein at least one user-controlled interaction is performed selected from user-controlled interactions which includes extrusive and intrusive interactions, liquid and fumes flow interactions, time bound changes based interactions, environment mapping based interactions, deletion interaction, addition interaction, immersive interactions, linked movement interactions, interaction for getting un-interrupted view of internal parts using transparency-opacity effect, inter-interactions, and engineering disintegration interactions;
wherein the displayed rendered user-controlled interaction response is output result displaying effect of each performed user-controlled interaction according to the interaction command provided in the form of input;
wherein the virtual product assistant sub-system comprises:
a second soft-copy display device for displaying virtual product assistant;
one or more processors;
instructions stored in a non-transitory computer readable storage system executable by the one or more processors that upon such execution cause the one or more processors to perform operations comprising:
receiving messages of one or more 3D model representing physical object displayed by the GUI on the first soft-copy display device of the electronic panel system, using one or more processors, by a virtual product assistant unit, where the first message is received on providing the first view of the 3D model, and consequent updated messages are received on providing each interaction command by the user;
activating corresponding product information data set in a database on receiving the first message, and continually updating the product information data set in accordance to the current 3D model display state on the GUI of the electronic panel system in response to received messages;
receiving a user input, the input is in the form of at least one natural language speech provided using a hardware voice input device that is in communication with the virtual product assistant sub-system, where the user voice input is either a product information query for gaining product information in real-time or an introduction related speech for introduction and salutation;
processing voice-based input to retrieve relevant information as per received product information query or introduction related speech;
outputting reply in the form of natural language speech with lip-synchronization of spoken words in accordance to the current 3D model display state displayed on the electronic panel system, wherein the lip-synchronization occurs dynamically in image, video of displayed virtual product assistant, using one or more processors, by an image processor; and
wherein the arrangement is arranged to provide real-time information related to displayed 3D model of real object based on user voice input using the voice input device.

24. The arrangement as claimed in claim 23, further comprising one or more sound output devices for providing synchronized sound output during display of the rendered user-controlled interaction response.

25. The arrangement as claimed in claim 23, wherein the 3D model displayed is of variable size, preferably a life-size or near life-size 3D-model.

26. The arrangement as claimed in claim 23, wherein extrusive and intrusive interactions are interactions performed on exterior and interior region of the 3D model including:
  moving or operating external parts of 3D model;
  operating of electronic or digital parts of 3D-model having electronic display parts for understanding electronic or digital parts functioning;
  operating light-emitting parts of 3D-model to visualize a light-emitting parts in operative state emitting light in a manner similar to that of real object;
  folding motion interaction;
  interaction to view interior of the 3D model from any angle/plane;
  moving or operating internal parts of the 3D model;
  disintegrating parts of 3D-model one by one to interact with interior and individual parts of the 3D model similar to disintegration of parts as in real object; and/or
  interaction for zooming 3D model to view minute detailing.

27. The arrangement as claimed in claim 23, wherein the deletion interaction is removing of a part from the 3D model on providing input, and where the addition interaction is attaching or adding any accessory in the 3D model on providing input.

28. The arrangement as claimed in claim 23, wherein the immersive interaction includes interaction where user can visualize on the first soft-copy display device, a virtual body of the user performing user-controlled interactions with the 3D model, which appears as if the user is interacting with real physical object.

29. The arrangement as claimed in claim 23, wherein the linked-movement interaction includes interaction where on providing input for moving one part of 3D model, said part moves in response and additionally another linked part of the 3D model also moves consequently emulating real scenario.

30. The arrangement as claimed in claim 23, wherein the inter-interaction includes interaction where user can exchange original parts of displayed 3D model with parts of different texture for visualizing aesthetics in real-time, where in inter-interactions, multiple texture stored in the database for same surface is used to represent change texture.

31. The arrangement as claimed in claim 23, wherein the liquid and fumes flow interaction includes interaction for visualizing liquid and fumes flow in real-time in the 3D model with texture emulating real liquid and fumes.

32. The arrangement as claimed in claim 23, wherein the engineering disintegration interaction includes interaction to visualize a part by dismantling the part from the entire 3D model emulating real scenario.

33. The arrangement as claimed in claim 23, wherein the first soft-copy display device is selected from an electronic visual display, a see through display and a projection based display including a holographic display.

34. The arrangement as claimed in claim 23, wherein the electronic visual display is one of: a non-inclined electronic visual display or an inclined transparent electronic visual display.

35. The arrangement as claimed in claim 23, wherein the second soft-copy display device for displaying virtual product assistant is one of: an electronic visual display or a cut-to shape electronic visual display which is cut-to the shape of the displayed virtual product assistant.

36. The arrangement as claimed in claim 23, wherein the input device includes either a touch screen, a sensor unit configured for receiving gesture input commands for performing user-controlled interactions, a touch sensitive electronic display, a voice input device, a pointing device, a keyboard or their combination.

37. The arrangement as claimed in claim 23, wherein the sensor unit is one of: an infrared-based sensor unit, a voice-based sensor unit for voice input or a camera-based sensor unit, or their combination.

38. The arrangement as claimed in claim 23, wherein in the operation (b) of receiving the user input for performing user-controlled interactions, each user-controlled interaction is directly performed with one or a set of interaction commands.

39. The arrangement as claimed in claim 23, wherein in the operation (b) of receiving the user input for performing user-controlled interactions, the related user-controlled interactions are grouped or categorized in separate view modes, where one or more user-controlled interactions is performed in one mode or by switching from one view mode to another view mode.

40. The arrangement as claimed in claim 23, wherein in the operation (e) of producing real-time rendering of user-controlled interaction response, a user-controlled interaction support sub-system is used by the user-controlled interaction unit as per need for producing user-controlled interaction response, where the user-controlled interaction support sub-system includes functionalities for:
  producing sound as per user-controlled interaction;
  animation of the virtual product assistant when the virtual product assistant is displayed in the GUI using the 3D-rendering engine, or animation of one or more parts in the 3D model;
  providing functionality of operation of electronic or digital parts in the displayed 3D-model/s depending on the characteristics, state and nature of displayed object;
  decision making and prioritizing user-controlled interactions response;
  putting more than one 3D object/model in scene;
  generating surrounding or terrain around the 3D model;
  generating effect of dynamic lighting on the 3D model;
  providing visual effects of colour shades; and
  generating real-time simulation effect;
  where one or more components or functionalities of the user-controlled interaction support sub-system is optionally provided in the user-controlled interaction unit.

41. The arrangement as claimed in claim 23, wherein in the operation of outputting reply in the form of natural language speech in the virtual product assistant sub-system, the output speech is customizable for pronunciation, masculine and feminine voice using a sound engine of the virtual product assistant unit.

42. The arrangement as claimed in claim 23, wherein the displayed 3D model of the real 3D object is a 3D computer graphics model textured using real photographs and/or video.

43. The arrangement as claimed in claim 23, wherein the displayed 3D model of the real 3D object is a 3D computer graphics model textured using artificial color texture, images, preferably photographs and/or video, or their combination.

44. The arrangement as claimed in claim 23, wherein the user-controlled interactions unit, the 3D-rendering engine, the user-controlled interaction support sub-system are executable on single computer or multiple computer, or computing systems having more than one computers connected through network.

45. The arrangement as claimed in claim 23, wherein the user-controlled interactions unit, the 3D-rendering engine, the user-controlled interaction support sub-system, and software components of the virtual assistant sub-system are designed to be executed single-threaded using one or more processors or multi-threaded using multiple processors.

46. The arrangement as claimed in claim 23, wherein the virtual product assistant is configurable for display on the GUI on the electronic panel system, where the output of the virtual product assistant is controlled by the user-controlled interaction unit in data connection with the virtual product assistant unit.

47. The arrangement as claimed in claim 23, wherein the texture data includes textures obtained from photographs, video, color or images, preferably pre-calibrated textures obtained from photographs and/or video.

48. The arrangement as claimed in claim 23, wherein if the displayed 3D model comprises a surface which corresponds to functioning part in the real object, then a video is optionally used as texture on said surface to represent dynamic texture change on said surface.

49. The arrangement as claimed in claim 23, wherein if the displayed 3D model comprises a surface which corresponds to light-emitting part in the real object, then a video is used as texture on said light-emitting part surface of the 3D model to represent lighting as dynamic texture change.

50. A method for viewing and performing user-controlled interactions with a 3D computer model of a real 3D object comprising:
   (a) providing a first view of at least one 3D model by a Graphical User Interface (GUI) with one or more user-controlled interactions, where the GUI comprises one or more interactive 3D space adapted to display one or more 3D models;
   (b) receiving a user input, the user input are one or more interaction commands provided using one or more input device, where each interaction command is provided for performing user-controlled interactions in real-time;
   (c) identifying one or more interaction commands, by user-controlled interaction unit;
   (d) in response to the identification, invoking a corresponding user-controlled interaction functionality of the user-controlled interaction unit;
   (e) in response to the invoking, producing real-time rendering of user-controlled interaction response using 3D model data, and texture data and a 3D rendering engine, by the user-controlled interaction unit, where the user-controlled interaction response is corresponding interactive view of the 3D model with synchronized sound or without sound as per the input;
   (f) displaying the rendered user-controlled interaction response in one interactive 3D space of the GUI in real-time, in response to the input;
   wherein the operations (b)-(f) are repeated to perform each user-controlled interaction;
   wherein the user-controlled interaction performed is one of the user-controlled interactions selected from extrusive and intrusive interactions, liquid and fumes flow interactions, time bound changes based interactions, environment mapping based interactions, deletion interaction, addition interaction, immersive interactions, linked movement interactions, interaction for getting un-interrupted view of internal parts using transparency-opacity effect, inter-interactions, and engineering disintegration interactions; and
   wherein the displayed rendered user-controlled interaction response is output result of each performed user-controlled interaction according to the interaction command provided in the form of input.

51. The method as claimed in claim 50, wherein the 3D model displayed is of variable size, preferably a life-size or near life-size 3D-model.

52. The method as claimed in claim 50, wherein input device includes either a touch screen, a sensor unit configured for receiving gesture input commands for performing user-controlled interactions, a touch sensitive electronic display, a voice input device, a pointing device, a keyboard or their combination.

53. The method as claimed in claim 50, wherein in the operation (b) of receiving the user input for performing user-controlled interactions, each user-controlled interaction is directly performed with one or a set of interaction commands.

54. The method as claimed in claim 50, wherein in the operation (b) of receiving the user input for performing user-controlled interactions, the related user-controlled interactions are grouped or categorized in separate view modes, where one or more user-controlled interactions is performed in one mode or by switching to another mode.

55. The method as claimed in claim 54, wherein the view modes includes default mode, deletion mode, addition mode, temperature mode, pressure mode, touch mode, transparency mode, disintegrate mode, inter-interaction mode, and immersive mode.

56. The method as claimed in claim 50, wherein the extrusive and intrusive interactions are interactions performed on exterior and interior region of the 3D model including:
   moving or operating external parts of 3D model;
   operating of electronic or digital parts of 3D-model having electronic display parts for understanding electronic or digital parts functioning;
   operating light-emitting parts of 3D-model to visualize the light-emitting parts in operative state emitting light in a manner similar to that of real object, where a video is used as texture on the light-emitting parts of 3D-model to display dynamic texture change to visualize the light-emitting parts in operative state;
   folding motion interaction;
   interaction to view interior of the 3D model from any angle/plane;
   moving or operating internal parts of the 3D model;
   disintegrating parts of 3D-model one by one to interact with interior and individual parts of the 3D model similar to disintegration of parts as in real object;
   interaction for producing exploded view of the 3D model, where disintegrated parts are viewable from all angles/planes; and/or
   interaction for zooming 3D model to view minute detailing.

57. The method as claimed in claim 50, wherein the deletion interaction is removing of a part from the 3D model on providing input, and where the addition interaction is attaching or adding any accessory in the 3D model on providing input.

58. The method as claimed in claim 50, wherein the immersive interaction includes interaction where user can visualize on the first soft-copy display device, a virtual body of the user performing user-controlled interactions with the 3D model, which appears as if the user is interacting with real physical object.

59. The method as claimed in claim 50, wherein the linked-movement interaction includes interaction where on providing input for moving one part of 3D model, said part moves in response and additionally another linked part of the 3D model also moves consequently emulating real scenario.

60. The method as claimed in claim 50, wherein the inter-interaction includes interaction where user is able to exchange original parts of displayed 3D model with parts of different texture for visualizing aesthetics in real-time.

61. The method as claimed in claim 50, wherein the liquid and fumes flow interaction includes interaction for visualizing liquid and fumes flow in the 3D model in real-time with texture emulating real liquid and fumes.

62. The method as claimed in claim 50, wherein the engineering disintegration interaction includes interaction to visualize a part by dismantling the part from the entire 3D model emulating real scenario, where the dismantled part/s retains 3D nature and is/are also displayed as 3D-model, and where the user-controlled interactions are performable with the individual dismantled part in the interactive 3D space of the GUI.

63. The method as claimed in claim 50, wherein in the operation (e) of producing real-time rendering of user-controlled interaction response, a user-controlled interaction support sub-system is used by the user-controlled interaction unit as per need for producing user-controlled interaction response, where the user-controlled interaction support sub-system includes functionalities for:
    producing sound as per user-controlled interaction;
    animation of the virtual product assistant when the virtual product assistant is displayed in the GUI using the 3D-rendering engine, or animation of one or more parts in the 3D model;
    providing functionality of operation of electronic or digital parts in the displayed 3D-model/s depending on the characteristics, state and nature of displayed object;
    decision making and prioritizing user-controlled interactions response;
    putting more than one 3D object/model in scene;
    generating surrounding or terrain around the 3D model;
    generating effect of dynamic lighting on the 3D model;
    providing visual effects of colour shades; and
    generating real-time simulation effect;
    where one or more components or functionalities of the user-controlled interaction support sub-system is optionally provided in the user-controlled interaction unit.

64. The method as claimed in claim 50, wherein the user-controlled interactions with the 3D model are performable from any projected angles of the 3D model during 360 rotation either in one plane or all planes with or without background environment, and if background environment is provided, the 3D model of real object is rotatable with still background scene or in synchronization to background scene.

65. The method as claimed in claim 50, wherein the 3D model displayed in—or during—each user-controlled interaction display external and/or internal surfaces of the 3D model textured using photographs and/video, where the display of texture on the 3D model surfaces using photographs ranges from 10-100% of total surfaces, which corresponds to non-mono-colour surface and surfaces which show pattern or non-uniform texture on the real object.

66. The method as claimed in claim 50, wherein the 3D model of the real 3D object is a 3D computer graphics model textured using artificial color texture, images, preferably photographs and/or video, or their combination.

67. The method as claimed in claim 50, the 3D model is interactive 3D model optionally configurable to be displayed over a web-page or as a host application running on a client computer, the client computer coupled to a server computer via a network.

68. A method for gaining product information in real-time by two-way voice-to-voice communication in natural language between a human user and a virtual assistant sub-system, where the product information is in synchronization to current 3D model representing real product displayed on a Graphical User Interface on the electronic panel system of claim 1, the method comprising:
    receiving a user input, the input is in the form of at least one natural language speech provided using a hardware voice input device that is in communication with the virtual product assistant sub-system, where the user voice input is either a product information query for gaining product information in real-time or an introduction related speech for introduction and salutation;
    processing voice-based input to retrieve relevant information as per received product information query or introduction related speech;
    outputting reply in the form of natural language speech with lip-synchronization of spoken words in accordance to the current 3D model display state displayed on the electronic panel system, wherein the lip-synchronization occurs dynamically in image, video of displayed virtual product assistant, using one or more processors, by an image processor; and
    Wherein during outputting reply in the form of natural language speech, the output speech is customizable for pronunciation, masculine and feminine voice using a sound engine of the virtual product assistant sub-system.

69. The method as claimed in claim 68, further comprising: receiving messages of one or more 3D model representing physical
    object displayed by the GUI in an electronic panel system, by the virtual product assistant unit, where a first message is received on presenting a first view of the 3D model, and consequent updated messages are received on providing each interaction command by the user;
    activating corresponding product information data set in a database on receiving the first message, and continually updating the product information data set in accordance to the current 3D model display state on the GUI of the electronic panel system in response to received messages.

70. The method as claimed in claim 68, wherein the step of processing voice-based input to retrieve relevant information further comprises:
    performing speech recognition to transcribe spoken phrase or sentence into text acceptable by said virtual assistant sub-system;
    ascertaining meaning of the text to differentiate between introduction query and product information query, and to aid in matching of corresponding product information data set;
    if input is a product information query, matching the input with active product information data set relevant to the product displayed on the soft-copy display device of the electronic panel system; and if input is introduction related query, matching the input with introduction related query data set relevant to the introduction query.

71. A display method for displaying a 3D model of physical object in an interactive 3D space, comprising the steps of:
providing a view of at least one 3D model in the interactive 3D space with one or more user-controlled interactions;
performing user-controlled interactions with the interactive 3D model by providing user input through one or more input device, wherein the user-controlled interactions includes extrusive and intrusive interactions, liquid and fumes flow interactions, time bound changes based interactions, environment mapping based interactions, deletion interaction, addition interaction, immersive interactions, linked movement interactions, interaction for getting un-interrupted view of internal parts using transparency-opacity effect, inter-interactions, and/or engineering disintegration interactions;
wherein effects of performed user-controlled interactions is/are displayed by real-time rendering with synchronized sound or without sound as per user input.

72. The method as claimed in claim 71, wherein the step of performing user-controlled interactions includes:
receiving user input, the user input is one or more interaction commands provided using one or more input device, where one or more interaction command are provided for performing each user-controlled interaction in real-time; and
producing real-time rendering of user-controlled interaction response using 3D model data, and texture data, where the user-controlled interaction response is corresponding interactive view of the 3D model with synchronized sound or without sound as per input.

73. The method as claimed in claim 71, wherein the input device includes either a touch screen, a sensor unit configured for receiving gesture input commands for performing user-controlled interactions including intuitive gesture in air, a touch sensitive electronic display, a voice input device, a pointing device, a keyboard or their combination.

74. The method as claimed in claim 71, wherein the intuitive gesture input includes intuitive gesture as per product or product category for zoom-in and zoom out, kick gesture, checking acceleration, for rotating 3D model in 360 degree all planes, turning light ON/OFF gesture.

* * * * *